(12) United States Patent
Handley et al.

(10) Patent No.: US 8,576,222 B2
(45) Date of Patent: *Nov. 5, 2013

(54) SYSTEMS AND METHODS FOR INTERFACING WITH A VIRTUAL OBJECT IN A HAPTIC VIRTUAL ENVIRONMENT

(75) Inventors: Joshua E. Handley, Silver Spring, MD (US); Marc Midura, Somerville, MA (US); Bradley A. Payne, Andover, MA (US); Walter A. Aviles, San Diego, CA (US); Thomas Harold Massie, Windham, NH (US); Walter C. Shannon, III, West Newtown, MA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,553

(22) Filed: Jan. 3, 2011

(65) Prior Publication Data

US 2011/0202856 A1 Aug. 18, 2011

Related U.S. Application Data

(63) Continuation of application No. 10/900,034, filed on Jul. 27, 2004, now Pat. No. 7,864,173, which is a continuation of application No. 09/352,066, filed on Jul. 14, 1999, now Pat. No. 6,792,398, which is a continuation-in-part of application No. 09/340,875, filed on Jun. 28, 1999, now Pat. No. 6,421,048.

(60) Provisional application No. 60/093,304, filed on Jul. 17, 1998.

(51) Int. Cl.
*G06T 15/00* (2011.01)
*G06T 17/00* (2006.01)

(52) U.S. Cl.
USPC .......................... 345/419; 345/420; 345/424

(58) Field of Classification Search
None
See application file for complete search history.

(56) References Cited

U.S. PATENT DOCUMENTS

| 2,475,484 A | 7/1949 | DeNise |
| 3,168,203 A | 2/1965 | Gallistel |

(Continued)

FOREIGN PATENT DOCUMENTS

| EP | 0364947 A2 | 4/1990 |
| EP | 0518648 A2 | 12/1992 |

(Continued)

OTHER PUBLICATIONS

S. Cotin, H. Delingette, J. M. Clement, V. Tassetti, J. Marescaux, and N. Ayache, H. U. Lemke, M. W. Vannier, K. Inamura, and A. G. Farman, "Volumetric deformable models for simulation of laparoscopic surgery", Proceedings of Computer Assisted Radiology (CAR'96), 1996.*

(Continued)

*Primary Examiner* — Daniel Hajnik

(57) ABSTRACT

A user of a modeling application modifies an initial virtual object using a sketch drawn on one or more construction planes. Typically, construction planes are connected by an axis that intersects the virtual object. The user can draw a sketch on each construction plane, and the modeling application interpolates a shape along the axis between the sketches to determine what material in the virtual object is to be removed from it. In this manner, material may be removed to create a recess or hole in the virtual object or otherwise to slice away material from the object. A user can use two or more axes and construction planes to produce complex shapes from the initial virtual object. A user can also select a portion of a virtual object and mirror the selected portion. Modifications that the user makes in the selected portion are made correspondingly in the mirrored portion.

20 Claims, 54 Drawing Sheets

(56) References Cited

U.S. PATENT DOCUMENTS

| | | | |
|---|---|---|---|
| 3,263,824 A | 8/1966 | Jones et al. |
| 3,449,008 A | 6/1969 | Colechia |
| 3,531,868 A | 10/1970 | Stevenson |
| 3,618,786 A | 11/1971 | Fick |
| 3,637,092 A | 1/1972 | George et al. |
| 3,846,826 A | 11/1974 | Mueller |
| 3,920,972 A | 11/1975 | Corwin, Jr. et al. |
| 3,944,798 A | 3/1976 | Eaton |
| 4,062,455 A | 12/1977 | Flatau |
| 4,150,803 A | 4/1979 | Fernandez |
| 4,216,467 A | 8/1980 | Colston |
| 4,302,138 A | 11/1981 | Zarudiansky et al. |
| 4,367,532 A | 1/1983 | Crum et al. |
| 4,420,808 A | 12/1983 | Diamond et al. |
| 4,521,685 A | 6/1985 | Rebman |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano et al. |
| 4,654,648 A | 3/1987 | Herrington et al. |
| 4,655,673 A | 4/1987 | Hawkes |
| 4,661,032 A | 4/1987 | Arai |
| 4,670,851 A | 6/1987 | Murakami et al. |
| 4,676,002 A | 6/1987 | Slocum |
| 4,680,519 A | 7/1987 | Chand et al. |
| 4,686,522 A | 8/1987 | Hernandez et al. |
| 4,703,443 A | 10/1987 | Moriyasu et al. |
| 4,729,098 A | 3/1988 | Cline et al. |
| 4,769,763 A | 9/1988 | Trieb et al. |
| 4,791,934 A | 12/1988 | Brunnett |
| 4,795,296 A | 1/1989 | Jau |
| 4,800,721 A | 1/1989 | Cemenska et al. |
| 4,819,195 A | 4/1989 | Bell et al. |
| 4,823,634 A | 4/1989 | Culver |
| 4,837,734 A | 6/1989 | Ichikawa et al. |
| 4,839,838 A | 6/1989 | LaBiche et al. |
| 4,853,874 A | 8/1989 | Iwamoto et al. |
| 4,868,761 A | 9/1989 | Hayashi |
| 4,868,766 A | 9/1989 | Oosterholt |
| 4,888,538 A | 12/1989 | Dimitrov et al. |
| 4,893,981 A | 1/1990 | Yoshinada et al. |
| 4,901,253 A | 2/1990 | Iwano et al. |
| 4,907,970 A | 3/1990 | Meenen, Jr. |
| 4,907,973 A | 3/1990 | Hon |
| 4,942,538 A | 7/1990 | Yuan et al. |
| 4,945,305 A | 7/1990 | Blood |
| 4,945,501 A | 7/1990 | Bell et al. |
| 4,961,138 A | 10/1990 | Gorniak |
| 4,973,111 A | 11/1990 | Haacke et al. |
| 4,973,215 A | 11/1990 | Karlen et al. |
| 4,982,504 A | 1/1991 | Soderberg et al. |
| 4,988,981 A | 1/1991 | Zimmerman et al. |
| 5,004,391 A | 4/1991 | Burdea |
| 5,007,300 A | 4/1991 | Siva et al. |
| 5,018,922 A | 5/1991 | Yoshinada et al. |
| 5,019,761 A | 5/1991 | Kraft |
| 5,027,292 A | 6/1991 | Rossignac et al. |
| 5,038,089 A | 8/1991 | Szakaly |
| 5,040,306 A | 8/1991 | McMurtry et al. |
| 5,044,956 A | 9/1991 | Behensky et al. |
| 5,053,975 A | 10/1991 | Tsuchihashi et al. |
| 5,072,361 A | 12/1991 | Davis et al. |
| 5,088,046 A | 2/1992 | McMurtry et al. |
| 5,088,055 A | 2/1992 | Oyama et al. |
| 5,103,404 A | 4/1992 | McIntosh |
| 5,105,367 A | 4/1992 | Tsuchihashi et al. |
| 5,116,051 A | 5/1992 | Moncrief et al. |
| 5,116,180 A | 5/1992 | Fung et al. |
| 5,130,632 A | 7/1992 | Ezawa et al. |
| 5,131,844 A | 7/1992 | Marinaccio et al. |
| 5,142,931 A | 9/1992 | Menahem |
| 5,143,505 A | 9/1992 | Burdea et al. |
| 5,184,319 A | 2/1993 | Kramer |
| 5,185,561 A | 2/1993 | Good et al. |
| 5,189,806 A | 3/1993 | McMurtry et al. |
| 5,193,963 A | 3/1993 | McAffee et al. |
| 5,204,824 A | 4/1993 | Fujimaki et al. |
| 5,220,260 A | 6/1993 | Schuler |
| 5,223,776 A | 6/1993 | Radke et al. |
| 5,237,647 A | 8/1993 | Roberts et al. |
| 5,239,246 A | 8/1993 | Kim |
| 5,255,211 A | 10/1993 | Redmond |
| 5,264,768 A | 11/1993 | Gregory et al. |
| 5,265,197 A | 11/1993 | Kondo |
| 5,266,875 A | 11/1993 | Slotine et al. |
| 5,273,038 A | 12/1993 | Beavin |
| 5,304,884 A | 4/1994 | Kitajima et al. |
| 5,321,622 A | 6/1994 | Snead et al. |
| 5,333,257 A | 7/1994 | Merrill et al. |
| 5,354,162 A | 10/1994 | Burdea et al. |
| 5,382,885 A | 1/1995 | Salcudean et al. |
| 5,388,199 A | 2/1995 | Kakazu et al. |
| 5,389,865 A | 2/1995 | Jacobus et al. |
| 5,396,265 A | 3/1995 | Ulrich et al. |
| 5,414,337 A | 5/1995 | Schuler |
| 5,428,715 A | 6/1995 | Suzuki |
| 5,429,140 A | 7/1995 | Burdea et al. |
| 5,438,529 A | 8/1995 | Rosenberg et al. |
| 5,446,834 A | 8/1995 | Deering |
| 5,455,902 A | 10/1995 | Ellson et al. |
| 5,459,382 A | 10/1995 | Jacobus et al. |
| 5,479,593 A | 12/1995 | Brewer et al. |
| 5,481,470 A | 1/1996 | Snead et al. |
| 5,482,051 A | 1/1996 | Reddy et al. |
| 5,487,012 A | 1/1996 | Topholm et al. |
| 5,489,830 A | 2/1996 | Fernandez |
| 5,497,452 A | 3/1996 | Shimizu et al. |
| 5,506,785 A | 4/1996 | Blank et al. |
| 5,515,078 A | 5/1996 | Greschler et al. |
| 5,548,694 A * | 8/1996 | Frisken Gibson ............ 345/424 |
| 5,555,894 A | 9/1996 | Doyama et al. |
| 5,559,412 A | 9/1996 | Schuler |
| 5,561,747 A | 10/1996 | Crocker et al. |
| 5,561,748 A | 10/1996 | Niu et al. |
| 5,576,727 A | 11/1996 | Rosenberg et al. |
| 5,587,937 A | 12/1996 | Massie et al. |
| 5,589,854 A | 12/1996 | Tsai et al. |
| D377,932 S | 2/1997 | Schena et al. |
| 5,623,582 A | 4/1997 | Rosenberg |
| 5,623,642 A | 4/1997 | Katz et al. |
| 5,625,576 A | 4/1997 | Massie et al. |
| 5,629,594 A | 5/1997 | Jacobus et al. |
| 5,630,034 A * | 5/1997 | Oikawa et al. ................ 345/424 |
| 5,633,951 A | 5/1997 | Moshfeghi |
| 5,642,469 A | 6/1997 | Hannaford et al. |
| 5,649,076 A | 7/1997 | Nishizaka et al. |
| 5,659,493 A | 8/1997 | Kiridena et al. |
| 5,666,138 A | 9/1997 | Culver |
| 5,691,898 A | 11/1997 | Rosenberg et al. |
| 5,694,013 A | 12/1997 | Stewart et al. |
| 5,701,140 A | 12/1997 | Rosenberg et al. |
| 5,704,791 A | 1/1998 | Gillio |
| 5,721,566 A | 2/1998 | Rosenberg et al. |
| 5,724,264 A | 3/1998 | Rosenberg et al. |
| 5,731,804 A | 3/1998 | Rosenberg |
| 5,734,373 A | 3/1998 | Rosenberg et al. |
| 5,737,505 A | 4/1998 | Shaw et al. |
| 5,739,811 A | 4/1998 | Rosenberg et al. |
| 5,742,278 A | 4/1998 | Chen et al. |
| 5,751,289 A | 5/1998 | Myers |
| 5,754,023 A | 5/1998 | Roston et al. |
| 5,766,016 A | 6/1998 | Sinclair et al. |
| 5,767,839 A | 6/1998 | Rosenberg |
| 5,769,640 A | 6/1998 | Jacobus et al. |
| 5,774,130 A | 6/1998 | Horikawa et al. |
| 5,784,542 A | 7/1998 | Ohm et al. |
| 5,790,108 A | 8/1998 | Salcudean et al. |
| 5,798,752 A | 8/1998 | Buxton et al. |
| 5,800,177 A | 9/1998 | Gillio |
| 5,800,178 A | 9/1998 | Gillio |
| 5,800,179 A | 9/1998 | Bailey |
| 5,802,353 A | 9/1998 | Avila et al. |
| 5,803,738 A | 9/1998 | Latham |
| 5,805,140 A | 9/1998 | Rosenberg et al. |

(56) References Cited

U.S. PATENT DOCUMENTS

| | | | |
|---|---|---|---|
| 5,808,616 | A | 9/1998 | Shimizu |
| 5,815,154 | A | 9/1998 | Hirschtick et al. |
| 5,821,920 | A | 10/1998 | Rosenberg et al. |
| 5,825,308 | A | 10/1998 | Rosenberg |
| 5,828,197 | A | 10/1998 | Martin et al. |
| 5,831,408 | A | 11/1998 | Jacobus et al. |
| 5,844,392 | A | 12/1998 | Peurach et al. |
| 5,847,956 | A | 12/1998 | Bronfeld et al. |
| 5,859,934 | A | 1/1999 | Green |
| 5,872,438 | A | 2/1999 | Roston |
| 5,873,106 | A | 2/1999 | Joseph |
| 5,880,714 | A | 3/1999 | Rosenberg et al. |
| 5,881,178 | A | 3/1999 | Tsykalov et al. |
| 5,882,206 | A | 3/1999 | Gillio |
| 5,889,670 | A | 3/1999 | Schuler et al. |
| 5,898,599 | A | 4/1999 | Massie et al. |
| 5,903,270 | A | 5/1999 | Gentry et al. |
| 5,903,886 | A | 5/1999 | Heimlich et al. |
| 5,907,487 | A | 5/1999 | Rosenberg et al. |
| 5,913,727 | A | 6/1999 | Ahdoot |
| 5,929,607 | A | 7/1999 | Rosenberg et al. |
| 5,929,846 | A | 7/1999 | Rosenberg et al. |
| 5,956,484 | A | 9/1999 | Rosenberg et al. |
| 5,963,212 | A | 10/1999 | Bakalash et al. |
| 5,973,678 | A | 10/1999 | Stewart et al. |
| 5,988,862 | A | 11/1999 | Kacyra et al. |
| 5,999,187 | A | 12/1999 | Dehmlow et al. |
| 6,040,840 | A | 3/2000 | Koshiba et al. |
| 6,046,726 | A | 4/2000 | Keyson |
| 6,061,004 | A | 5/2000 | Rosenberg |
| 6,064,394 | A | 5/2000 | Morrison |
| 6,084,587 | A | 7/2000 | Tarr et al. |
| 6,111,577 | A | 8/2000 | Zilles et al. |
| 6,115,046 | A | 9/2000 | Chen et al. |
| 6,120,171 | A | 9/2000 | Shaikh |
| 6,131,097 | A | 10/2000 | Peurach et al. |
| 6,191,796 | B1 | 2/2001 | Tarr |
| 6,211,848 | B1 | 4/2001 | Plesniak et al. |
| 6,219,032 | B1 | 4/2001 | Rosenberg et al. |
| 6,226,003 | B1 | 5/2001 | Akeley |
| 6,308,144 | B1 | 10/2001 | Bronfeld et al. |
| 6,337,678 | B1 | 1/2002 | Fish |
| 6,342,880 | B2 | 1/2002 | Rosenberg et al. |
| 6,369,834 | B1 | 4/2002 | Zilles et al. |
| 6,384,822 | B1 | 5/2002 | Bilodeau et al. |
| 6,417,638 | B1 | 7/2002 | Guy et al. |
| 6,421,048 | B1 | 7/2002 | Shih et al. |
| 6,448,977 | B1 | 9/2002 | Braun et al. |
| 6,552,722 | B1 | 4/2003 | Shih et al. |
| 6,570,564 | B1 | 5/2003 | Sowizral et al. |
| 6,608,631 | B1 | 8/2003 | Milliron |
| 6,628,280 | B2 | 9/2003 | Perry et al. |
| 6,671,651 | B2 | 12/2003 | Goodwin et al. |
| 6,703,550 | B2 | 3/2004 | Chu |
| 6,704,694 | B1 | 3/2004 | Basdogan et al. |
| 6,707,458 | B1 | 3/2004 | Leather et al. |
| 6,773,408 | B1 | 8/2004 | Acker et al. |
| 6,792,398 | B1 | 9/2004 | Handley et al. |
| 6,803,928 | B2 | 10/2004 | Bimber et al. |
| 6,809,738 | B2 | 10/2004 | Hubrecht et al. |
| 6,822,635 | B2 | 11/2004 | Shahoian et al. |
| 6,831,640 | B2 | 12/2004 | Shih et al. |
| 7,050,955 | B1 | 5/2006 | Carmel et al. |
| 7,102,635 | B2 | 9/2006 | Shih et al. |
| 7,208,671 | B2 | 4/2007 | Chu |
| 7,225,404 | B1 | 5/2007 | Zilles et al. |
| 7,259,761 | B2 | 8/2007 | Shih et al. |
| 7,319,466 | B1 | 1/2008 | Tarr et al. |
| 7,432,910 | B2 | 10/2008 | Shahoian |
| 7,800,609 | B2 | 9/2010 | Tarr et al. |
| 7,864,173 | B2 | 1/2011 | Handley et al. |
| 2001/0045941 | A1* | 11/2001 | Rosenberg et al. ........ 345/161 |
| 2002/0075283 | A1 | 6/2002 | Payne |
| 2002/0089500 | A1 | 7/2002 | Jennings et al. |
| 2002/0130820 | A1 | 9/2002 | Sullivan |
| 2002/0154132 | A1 | 10/2002 | Dumesny et al. |
| 2002/0158842 | A1 | 10/2002 | Guy et al. |
| 2003/0117411 | A1 | 6/2003 | Fujiwara et al. |
| 2003/0128208 | A1 | 7/2003 | Shih et al. |
| 2003/0191554 | A1 | 10/2003 | Russell et al. |
| 2005/0060130 | A1 | 3/2005 | Shapiro et al. |
| 2005/0062738 | A1 | 3/2005 | Handley et al. |
| 2005/0168460 | A1 | 8/2005 | Razdan et al. |
| 2006/0202953 | A1 | 9/2006 | Pryor et al. |

FOREIGN PATENT DOCUMENTS

| | | |
|---|---|---|
| EP | 0915434 A2 | 5/1999 |
| GB | 2389764 A | 12/2003 |
| GB | 2410351 A | 7/2005 |
| JP | 62-148434 A | 7/1987 |
| JP | 63-149416 A | 6/1988 |
| JP | 63-177497 A | 7/1988 |
| JP | 3-137722 A | 6/1991 |
| JP | 63-09244 A | 11/1994 |
| WO | WO-9502801 A1 | 1/1995 |
| WO | WO-9616397 A1 | 5/1996 |
| WO | WO-9622591 A1 | 7/1996 |
| WO | WO-9642078 A1 | 12/1996 |
| WO | WO-9706410 A1 | 2/1997 |
| WO | WO-9712337 A1 | 4/1997 |
| WO | WO-9712357 A1 | 4/1997 |
| WO | WO-9719440 A1 | 5/1997 |
| WO | WO-9721160 A2 | 6/1997 |
| WO | WO-9744775 A1 | 11/1997 |
| WO | WO-9806024 A1 | 2/1998 |
| WO | WO-9826342 A2 | 6/1998 |
| WO | WO-9830951 A2 | 7/1998 |
| WO | WO-9858308 A1 | 12/1998 |
| WO | WO-9858323 A2 | 12/1998 |
| WO | WO-9910872 A1 | 3/1999 |

OTHER PUBLICATIONS

"Mastering Windows 3.1 Special Edition", by Robert Cowart, Chapter 11, 1993 SYBEX Inc.

Official Action from Japanese Patent Office, Application No. 7-510838 dated Dec. 22, 2009.

Open Inventor 2.1 Performance Tips, released Apr. 1996, p. 4, 6 and 8.

Open Inventor 4.0 Release Notes, released Apr. 2003, p. 5.

Seeger et al. "Controlling Force Feedback Over a Network" published as part of the Proceedings of the Second Phantom Users Group Workshop, Dec. 1997.

"Mastering Windows 3.1 Special Edition", by Robert Cowart, Chapter 11, 1993 SYBEX Inc.

Barequet, G., Shapiro, D., and Tal, A. 1996. History consideration in reconstructing polyhedral surfaces from parallel slices. In Proceedings of the 7th Conference on Visualization '96 (San Francisco, California, United States, Oct. 28-29, 1996).

Lynn Eggli, Ching-yao Hsu, Beat D Bruderlin, Gershon Elber, Inferring 3D models from freehand sketches and constraints, Computer-Aided Design, vol. 29, Issue 2, Solid Modelling, Feb. 1997, pp. 101-112.

Adachi, "Touch and Trace on the Free-Form Surface of Virtual Object," Proceedings of IEEE Virtual Reality Annual International Symposium, Sep. 18-22, 1993, Seattle WA, pp. 162-168.

Agrawala et al., "3D Painting on Scanned Surfaces", Stanford University, 1995, pp. 145-150.

Alejandre, "What is a Tessellation?" The Math Forum, Drexel University, printed Jul. 29, 2003, http://mathforum.org/sum95/suzanne/whattess.html, 4 pgs.

Altmann, "About Nonuniform Rational B-Splines—NURBS," Worcester Polytechnic Institute, printed Jul. 29, 2003, http://www.cs.wpi.edu/--matt/courses/cs563/talks/nurbs.html, 6 pgs.

Arraich, "Quick Mask," http://www.arraich.com/ref/aatool.sub.--quick.sub.--mask6.htm, 3 pgs., .COPYRGT. 2000-2004 Jay Arraich.

Atkinson et al., "Computing with Feeling" Comput. & Graphics, vol. 2, 1977, pp. 97-103.

(56) References Cited

OTHER PUBLICATIONS

Avila et al., "A Haptic Interaction Method for Volume Visualization," GE Corporate Research & Development, Schenectady, NY, pp. 1-9 (1996).
Barr, "Global and Local Deformations of Solid Primitives"; Computer Graphics; vol. 18, No. 3, pp. 21-30 (Jul. 1984).
Bentley, "Rendering Cubic Bezier Patches," Worcester Polytechnic Institute, printed Nov. 17, 2003, http://www.cs.wpi.edu/.about.matt/courses/cs563/talks/surface/bez.sub.--s- urf.html, 10 pgs.
Bergamasco, "Design of Hand Force Feedback Systems for Glove-like Advanced Interfaces", IEEE, Sep. 1992, pp. 286-293.
Birn, "Tutorial: NURBS Head Modeling," printed Jul. 29, 2003, http://www.3drender.com/jbirn/ea/HeadModel.html, 5 pgs.
Blinn, "Simulation of Wrinkled Surfaces," Computer Graphics, vol. 12-3, Aug. 1978, pp. 286-292.
Brooks et al., "Project GROPE—Haptic Displays for Scientific Visualization," Computer Graphics, vol. 24, No. 4, Aug. 1990, pp. 177-185.
Burdea, "Force and Touch Feedback for Virtual Reality," John Wiley and Sons, Inc., New York, New York, pp. 190-193 (1996).
Colgate et al., "Factors Affecting the Z-Width of a Haptic Display," published by IEEE Computer Society Press, Los Alamitos, California, in Proceedings: 1994 IEEE International Conference on Robotics and Automation, held May 8-13, 1994 in San Diego, California, vol. 4, 1994, pp. 3205-3210.
Colgate et al., "Implementation of Stiff Virtual Walls in Force Reflecting Interfaces," IEEE Virtual Reality Annual International Symposium (Seattle, WA), pp. 202-208 (Sep. 18-22, 1993).
Colgate et al., "Issues in the Haptic Display of Tool Use," published by IEEE Computer Society Press, Los Alamitos, California, in Proceedings: 1995 IEEE/RSJ International Conference on Intelligent Robots and Systems—Human Robot Interaction and Cooperative Robots, held Aug. 5-9, 1995 in Pittsburgh, Pennsylvania, 1995, pp. 140-145.
Decaudin, "Geometric Deformation by Merging a 3D-Object with a Simple Shape," Graphics Interface '96 Proceedings (Toronto, Canada), 6 pgs. (May 21-24, 1996).
Dworkin et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.
Elhajj et al., "Supermedia-Enhanced Internet-Based Telerobotics," Proceedings of the IEEE, vol. 91, No. 3, pp. 396-421 (Mar. 2003).
Farin, "NURBS," printed Nov. 17, 2003, www.eros.cagd.eas.asu.edu/.about.farin/rbook/toc.html, 2 pgs.
Feldman, "Texture Mapping," http://www.geocities.com/SiliconValley/2151/tmap.html (22pgs.), .COPYRGT. 1997 Mark Feldman.
Fisher et al., "Pixel Values," http://www/dai.ed.ac.uk/HIPR2/value.htm (1 pg.), .COPYRGT. 2003 R. Fisher, S. Perkins, A. Walker and E. Wolfart.
Foskey et al, "ArtNova: Touch-Enabled 3D Model Design," Proceedings of IEEE Virtual Reality 2002, Mar. 24-28, 2002, Orlando, Florida pp. 119-126.
Galyean, "Sculpting: An Interactive Volumetric Modeling Technique," Computer Graphics (SIGGRAPH '91 Las Vegas), vol. 25, No. 4, pp. 267-274 (Jul. 1991).
Gu et al., "Global Conformal Surface Parameterization," Eurographics Symposium on Geometry Processing (2003), 12 pgs.
Hashimoto et al., "Dynamic Force Simulator for Force Feedback Human-Machine Interaction", IEEE, Sep. 1993, pp. 209-215.
Hirata et al., "3-Dimensional Interface Device for Virtual Work Space," Proceedings of the 1992 IEEE, Jul. 7-10, 1992, pp. 889-896.
Hirota et al., "Development of Surface Display," Proceedings of the Virtual Reality Annual International Symposium (Seattle), pp. 256-262 (Sep. 18-23, 1993).
Hirota et al., "Providing Force Feedback in Virtual Environments", IEEE, Sep. 1995, pp. 22-30.
Howe et al., "Task Performance with a Dextrous Teleoperated Hand System," Telemanipulator Technology, Nov. 1992, Proceedings of SPIE, vol. 1833, pp. 1-9.

Immersion Corporation, "Impulse Engine 2000," http://www.immerse.com/WWWpages/IE2000pg.htm, 2 pages (1997).
Immersion Corporation, "Laparoscopic Impulse Engine.quadrature.: A New Force Feedback Surgical Simulation Tool", Immersion Corporation, 1995. http://www.immerse.com/wwwpages/lapIEpg.htm.
Immersion Corporation, "The Impulse Engine.quadrature.", 1 page, Immersion Corporation, 1996.
Immersion Corporation, "Virtual Laparoscopic Interface", Immersion Corporation, 1995, 1 pg.
Inoue et al., "Parallel Manipulator," Proceedings of 3rd Robotics Research: The Third International Symposium, Faugeras & Giralt, eds., MIT Press 1986.
Ishii et al., "A 3D Interface Device with Force Feedback: A Virtual Work Space for Pick-and-Place Tasks", IEEE, Sep. 1993, pp. 331-335.
Iwata, "Artificial Reality with Force-feedback: Development of Desktop Virtual Space with Compact Master Manipulator," Computer Graphics (SIGGRAPH '90 Dallas), vol. 24, No. 4, pp. 165-170 (Aug. 1990).
Iwata, "Pen-based Haptic Virtual Environment," Proceedings of IEEE Virtual Reality Annual International Symposium, (Sep. 18-22, 1993, Seattle, WA), pp. 287-292.
Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T 1Z4, Canada, Oct. 19, 1993, pp. 1-27.
Komerska et al., "Haptic Interface for Center-of-Workspace Interaction: Demonstration Paper," Haptics Interfaces for Virtual Environments and Teleoperator Systems (2002), pp. 352-353.
Kotoku et al., "A Force Display Algorithm for Virtual Environments," Sice, pp. 347-355, 1992.
Lenzmeier, "Color Depth and Color Spaces," http://www.csbsju.edu/itservices/teaching/c.sub.--space/colors.htm (3 pgs.), Oct. 16, 2006.
Lewis, "Electronic Pen With Its Own Eraser", Personal Computers, Jul. 1995, p. C8.
Luo et al., "Networked Intelligent Robots Through the Internet: Issues and Opportunities," Proceedings of the IEEE, vol. 91, No. 3, pp. 371-382 (Mar. 2003).
Marcus et al., "EXOS Research on Master Controllers for Robotic devices," Fifth Annual Workshop on Space Operations Applications and Research (SOAR '91) pp. 238-245, Jul. 1991.
Massie, "Design of a Three Degree of Freedom Force-Reflecting Haptic Interface", Massachusetts Institute of Technology; Bachelor of Science in Electrical Science and Engineering Thesis, May 1993, pp. 1-38.
Massie, "Initial Haptic Explorations with the Phantom: Virtual Touch Through Point Interaction", Massachusetts Institute of Technology Master of Science Thesis, Feb. 1996, pp. 1-49.
McAffee et al, "Teleoperator Subsystem/Telerobot Demonstrator," Force Reflecting Hand Controller Equipment Manual, Jet Propulsion Laboratory, Jan. 1988.
Miller et al., "The Design of 3D Haptic Widgets," Proceedings of the 1999 Symposium on Interactive 3D Graphics Conference Proceedings, (1999) pp. 1-6.
Millman et al., "A System for the Implementation and Kinesthetic Display of Virtual Environments," Telemanipulator Technology, Proceedings of 1992 Spie, vol. 1833, pp. 49-56.
Minsky et al., "Feeling and Seeing: Issues in Force Display," Computer Graphics, vol. 24, No. 2, Mar. 1990, pp. 235-270.
Minsky, "Computational Haptics: The Sandpaper System for Synthesizing Texture for a Force-Feedback Display," Massachusetts Institute of Technology Ph.D. Thesis, Jun. 1995, pp. 1-217.
Morgenbesser, "Force Shading for Shape Perception in Haptic Virtual Environments", Massachusetts Institute of Technology Master of Engineering Thesis, Sep. 1995, pp. 1-77.
Nagel, "A Closer Look: Photoshop's New Paint Engine, p. 2 of 3," Mar. 7, 2002, http://www.creativemac.com/2002/03.sub.--mar/features/ps7dynamics1.- htm (6 pgs.).
Nagel, "A Closer Look: Photoshop's New Paint Engine, p. 3 of 3" Mar. 7, 2002, http://www.creativemac.com/2002/03.sub.--mar/features/ps7dynamics1.- htm (5 pgs.

(56) References Cited

OTHER PUBLICATIONS

Nagel, "A Closer Look: Photoshop's New Paint Engine," Mar. 7, 2002, http://www.creativemac.com/2002/03.sub.--mar/features/ps7dynamics1.htm (5 pgs.).

O'Rourke, "Comp.Graphics.Algorithms Frequently Asked Questions, Section 5. 3D Computations," http://www.exaflop.org/docs/cgafaq/cga5.html (13 pgs.), .COPYRGT. 1998 Joseph O'Rourke.

Oboe, "Force-Reflecting Teleoperation Over the Internet: The JBIT Project," Proceedings of the IEEE, vol. 91, No. 3, pp. 449-462 (Mar. 2003).

Payne et al., "Distance Field Manipulation of Surface Models," IEEE Computer Graphics & Applications, pp. 65-71 (Jan. 1992).

Porter et al., "Compositing Digital Images," Computer Graphics, vol. 18, No. 3, Jul. 1984, pp. 253-259.

Rea, "Digital Photography and Electronic Imaging Glossary," Version 7.5.2 (Aug. 2000), 40 pgs.

Rogers, "An Introduction to NURBS," Morgan Kaufmann Publishers, (2000), pp. 1-4.

Safaric et al., "Control of Robot Arm with Virtual Environment via the Internet," Proceedings of the IEEE, vol. 91, No. 3, pp. 422-429 (Mar. 2003).

Salcudean et al., "On the Emulation of Stiff Walls and Static Friction with a Magnetically Levitated Input/Output Device," Dynamic Systems and Control: vol. 1, DSC-vol. 55-1, 1994, pp. 303-309.

Salisbury et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for ComputingMachinery (ACM) and published by the ACM in Proceedings: 1995 Symposium on Interactive 3D Graphics, Monterey, California, Apr. 9-12, 1995, pp. 123-130.

SensAble Devices, Inc., "Phantom Haptic Interface," 1995, Cambridge, MA (4 pgs).

SensAble Technologies, Inc., "Phantom Haptic Interface," 1996, Cambridge, MA (6 pgs).

Sharman, "The Marching Cubes Algorithm," http://www.exaflop.org/docs/marchcubes/ind.html (6 pgs.), 1999.

Shimoga, "A Survey of Perceptual Feedback Issues in Dextrous Telemanipulation: Part I. Finger Force Feedback" published by IEEE Neural Networks Council in IEEE Virtual Reality Annual International Symposium, held Sep. 18-22, 1993 in Seattle,Washington, 1993, pp. 263-270.

Snow et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Sorkine, et. al, "Bounded-distortion Piecewise Mesh Parameterization," Proceedings of the Conference on Visualization 2002, Boston, Massachusetts, pp. 355-362.

Sutter et al., "Response to Reflected-Force Feefback to Fingers in Teleoperations," Proc. of the NASA Conference on Space Telerobotics, pp. 65-74, NASA JPL, Jan. 1989.

Swarup, "Haptic Interaction with Deformable Objects Using Real-time Dynamic Simulation", Massachusetts Institute of Technology, Sep. 1995, pp. 1-83.

Tan et al., "Virtual Environments for Internet-Based Robots--I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

Tanie et al., "Force Display Algorithms", 1993 IEEE International Conference on Robotics and Automation, May 2-7, 1993, Atlanta Georgia, USA, 1993, pp. 60-78.

Terzopoulos et al.; "Elastically Deformable Models"; Computer Graphics, vol. 21, No. 4, pp. 205-214 (Jul. 1987).

Wang et al., "Volume Sculpting", 1995 Symposium on Interactive 3D Graphics, Monterey, California, pp. 151-156.

Weisstein, "Conformal Mapping," Wolfram Research, printed Nov. 11, 2003, http://mathworld.wolfram.com/ConformalMapping.html, 7 pgs.

Yoshikawa et al., "Construction of Virtual World Using Dynamics Modules and Interaction Modules," Proceedings of the 1996 IEEE International Conference on Robotics and Automation (Minneapolis, MN), pp. 2358-2364 (Apr. 1996).

Zilles et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human RobotInteraction and Cooperative Robots, held Aug. 5-9, 1995 in Pittsburgh, Pennsylvania, 1995, pp. 146-151.

Zilles, "Haptic Rendering with the Toolhandle Haptic Interface," Massachusetts Institute of Technology Master of Science Thesis, May 1995, pp. 1-46.

Powerful Photoshop Layers: Layer Effects Settings, http://www/webreference.com/graphics/column32/5.html (5 pgs.), Aug. 18, 2000.

Raindrop Geomagic, Inc. product description for "Geomagic Shape," Nov. 26, 2003 printout, http://www.geomagic.com/products/shape, 2 pgs.

Raindrop Geomagic, Inc. product description for "Geomagic Studio," http://www.macdac.com/raindrop/studio.htm (4 pgs.), .COPYRGT. 2005 MACDAC.

Sensable Technologies, "Feature Overview," Nov. 25, 2003 printout, http://www.sensable.com/products/3ddesign/freeform/overview.asp, 5 pgs.

Sensable Technologies, "Feature Overview: Emboss with Wrapped Image," Nov. 25, 2003 printout, http://www.sensable.com/products/3ddesign/freeform/emboss.sub.--with.sub.- --wrap.asp, 1 pg.

Sensable Technologies, "Free Form Concept System," Jan. 20, 2004 printout, http://www.sensable.com/products/3ddesign/concept/index.asp, 2 pgs.

Surfaces,' Avid Technology, printed Nov. 6, 2003, http://www.iro.umontreal.ca/.about.roys/softimage/html/model/surfs.html, chapter 11, 22 pgs.

"Tensor Product Spline Surfaces," printed Nov. 17, 2003, http://www.ibiblio.org/e-notes/Splines/Inter.htm, 3 pgs.

"3-D Animation Workshop," printed Jul. 29, 2003, http://webreference.com/3d/, Lessons 39, 64-69, and 72; 79 pgs.

"Curves," Avid Technology, printed Nov. 6, 2003, http://www.iro.umontreal.ca/.about.roys/softimage/html/model/curves.html, chapter 10, 19 pgs.

"Fundamentals of NURBS Modeling," Avid Technology, printed Nov. 6, 2003, http://www.iro.umontreal.ca/.about.roys/softimage/html/model/nurbs.sub.--- basics.html, chapter 9, 7 pgs.

"How to use Postscript Art as a Stencil in Photoshop," Swanson Tech Support, Photoshop Techniques 004, 4pgs.

"Lesson 12: Blur, Sharpen & Smudge," http://iit.bloomu.edu/vthc/Photoshop/enhancing/blurring.htm, 3 pgs, .COPYRGT. 2002 Bloomsburg University Virtual Training Help Center.

"Lesson 14: Selection Tools," http://iit.bloomu.edu/vthc/Photoshop/BLENDING/selectiontools.htm, 7 pgs, .COPYRGT. 2002 Bloomsburg University Virtual Training Help Center.

"Lesson 18: Opacity," http://iit.bloomu.edu/vthc/Photoshop/SpecialEffects/opacity.htm, 2 pgs, .COPYRGT. 2002 Bloomsburg University Virtual Training Help Center.

"Lesson 22: Vector Shapes," http://iit.bloomu.edu/vthc/Photoshop/DRAWING/vectorshapes.htm (5 pgs.), .COPYRGT. 2002 Bloomsburg University Virtual Training Help Center.

"Lesson 23: Gradients," http://iit.bloomu.edu/vthc/Photoshop/DRAWING/gradients.htm (7 pgs.), .COPYRGT. 2002 Bloomsburg University Virtual Training Help Center.

"Lesson 19: Color Selection ," http://iit.bloomu.edu/vthc/Photoshop/DRAWING/colorpicker.htm (4 pgs.), .COPYRGT. 2002 Bloomsburg University Virtual Training Help Center.

"Lesson 4: Layers," http://iit.bloomu.edu/vthc/Photoshop/Basics/layers.htm (2 pgs.), .COPYRGT. 2002 Bloomsburg University Virtual Training Help Center.

"Lesson 7: Color Balance ," http://iit.bloomu.edu/vthc/Photoshop/enhancing/colorbalance.htm (3 pgs.), .COPYRGT. 2002 Bloomsburg University Virtual Training Help Center.

(56) References Cited

OTHER PUBLICATIONS

"Lesson 8: Brightness & Contrast," http://iit.bloomu.edu/vthc/Photoshop/enhancing/brightness&contrast.htm (2 pgs.), .COPYRGT. 2002 Bloomsburg University Virtual Training Help Center.

"Points, Nets, Patches . . . " printed Nov. 17, 2003, http://www.people.nnov.ru/fractal/splines/nets.htm, 2 pgs.

"Touch-Enabled 3D Model Design," Department of Computer Science, University of North Carolina at Chapel Hill (Feb. 2002 ), 2 pgs.

Gibson, "Beyond Volume Rendering: Visualization, Haptic Exploration, and Physical Modeling of Voxel-based Objects," 1995, Mitsubishi Electric Research Laboratories, Inc., Technical Report 95-04, 6.sup.th Eurographics Workshop on Visualization inScientific Computing, pp. 1-14 (1995).

US 5,903,456, 05/1999, Schena et al. (withdrawn)

* cited by examiner

SYSTEMS AND METHODS FOR INTERFACING WITH A VIRTUAL OBJECT IN A HAPTIC VIRTUAL ENVIRONMENT

CROSS-REFERENCE TO RELATED APPLICATION

This application is a continuation of U.S. patent application Ser. No. 10/900,034, filed Jul. 27, 2004, the entire contents of which are incorporated herein by reference; U.S. patent application Ser. No. 10/900,034 is a continuation of U.S. patent application Ser. No. 09/352,066, issued on Sep. 14, 2004 as U.S. Pat. No. 6,792,398, the entire contents of which are incorporated herein by reference; U.S. patent application Ser. No. 09/352,066 is a continuation-in-part of U.S. patent application Ser. No. 09/340,875, issued on Jul. 16, 2002 as U.S. Pat. No. 6,421,048, incorporated herein by reference, which claims priority to U.S. Provisional Patent Application Ser. No. 60/093,304, filed Jul. 17, 1998, also incorporated herein by reference.

FIELD OF INVENTION

The invention relates generally to a method and apparatus for interacting with virtual objects in a haptic virtual reality environment, and more specifically to a method and apparatus for modifying virtual objects in a haptic virtual reality environment.

BACKGROUND OF INVENTION

Computers have been long used to design objects in a computerized environment. Examples are CAD (computer-aided design) systems that are used in the design of mechanical parts, such as parts used in an assembly process. For example, a designer may use a CAD system to design parts for an automobile, which are then produced and used in an automobile assembly line. Such CAD systems require significant training and understanding in using the computerized design system. CAD systems are typically difficult to use and lack the freedom and expressiveness of traditional noncomputerized drawing, sketching, and model-making procedures.

One traditional noncomputerized approach is the blue foam technique. In this approach, a two-dimensional (2-D) cardboard template is made and attached to one side of a block of blue foam material. The designer uses a hot wire to trace out the shape of the template throughout the blue foam block and then removes the excess foam.

Another noncomputerized approach involves modeling the object from clay using a traditional sculpting approach based on hand tools and hand sculpting techniques to add, remove, and shape the clay.

These approaches suffer from traditional limitations such as the time needed to hand design templates, and the difficulty or inability to recover from mistakes or return to a previous stage of design. Objects created using traditional physical modeling methods cannot be directly incorporated or used in modern digital CAD and computer-aided manufacturing (CAM) processes. In addition, blue foam and clay approaches cannot be combined readily in the same model.

A more modern approach uses a virtual reality technique to model objects in a computerized virtual environment. Virtual Reality (VR) is an artificial environment constructed by a computer which permits the user to interact with that environment as if the user were actually immersed in the environment. Early VR devices permitted the user to see three-dimensional (3-D) depictions of an artificial environment and to move within that environment. The reality of the VR environment is enhanced by the ability of a user to manipulate virtual objects within the virtual environment using hand motions and gestures. A user may use a virtual tool to manipulate and/or modify a computerized model or virtual object in the virtual environment.

Virtual reality techniques often do not provide for a realistic feeling of sculpting by the user. The user cannot feel when virtual tools touch or modify the virtual object. Moreover, in some cases, the virtual tool may pass through the virtual object without any impediment, thereby severely degrading the realism of the experience and the user's ability to finely control the modification.

SUMMARY OF INVENTION

Thus, there is a need for a 3-D computerized modeling system that overcomes the problems of CAD techniques and traditional noncomputerized modeling techniques. One object of the present invention is to provide a computerized 3-D virtual reality modeling system that provides the ease and expressiveness of traditional sketching, drawing, and hand model-making approaches as well as integration into the digital design and manufacturing process offered by CAD/CAM techniques Being able to feel the virtual object allows the user to resolve visual ambiguities, such as a shape that may appear either concave or convex as perceived by an observer. The user may rely on haptic feedback when modifying the object such as scratching a slight groove in the object, which the user then deepens or expands while receiving feedback through the tool on the shape and current depth of the groove. Feedback also allows the designer to monitor and modulate the cutting rate or amount of change induced by the virtual tool. Haptic feedback also helps the user navigate around and on the surface of the object; that is, using the feel of the object to know where the virtual tool is on the object.

The invention also relates to a method for modifying a virtual object in a haptic virtual environment, including sensing a location of a user in real space; determining a virtual tool comprising discrete points for use by the user in the haptic virtual environment; producing a mirrored virtual object by mirroring an initial portion of the virtual object to generate two mirrored portions; determining the locations of the discrete points of the virtual tool relative to a selected one of the two mirrored portions of the mirrored virtual object; calculating an interaction force based on the locations of the discrete points of the virtual tool and the location of the selected portion of the mirrored virtual object; and modifying the selected portion of the mirrored virtual object based on the locations of the discrete points of the virtual tool and the location of the selected portion of the mirrored virtual object.

BRIEF DESCRIPTIONS OF THE DRAWINGS

The invention is pointed out with particularity in the appended claims. The above and further advantages of this invention may be better understood by referring to the following description taken in conjunction with the accompanying drawings, in which:

FIG. 1 depicts a functional block diagram of a system for one embodiment of the invention, including a haptic interface device, modeling application, and graphics display;

FIG. 2A provides a pictorial view of a virtual environment including a virtual object and a virtual tool, for one embodiment of the invention;

FIG. 2B provides a pictorial view of a virtual tool contacting the virtual surface of a virtual object in connection with a haptic interface location within the virtual object, for the embodiment of the invention shown in FIG. 2A;

Figures 14A, 14B, 14C:
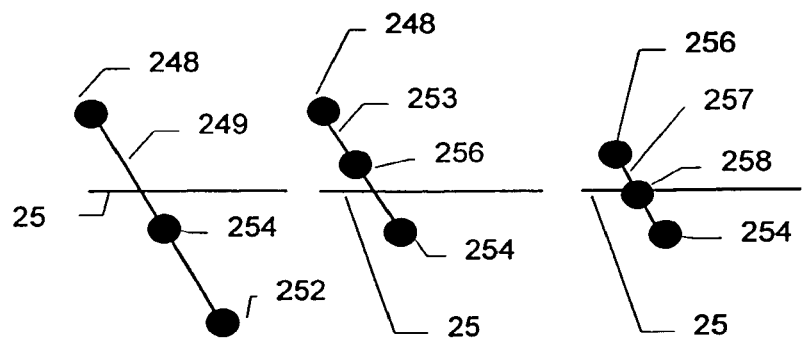
Figure 15:
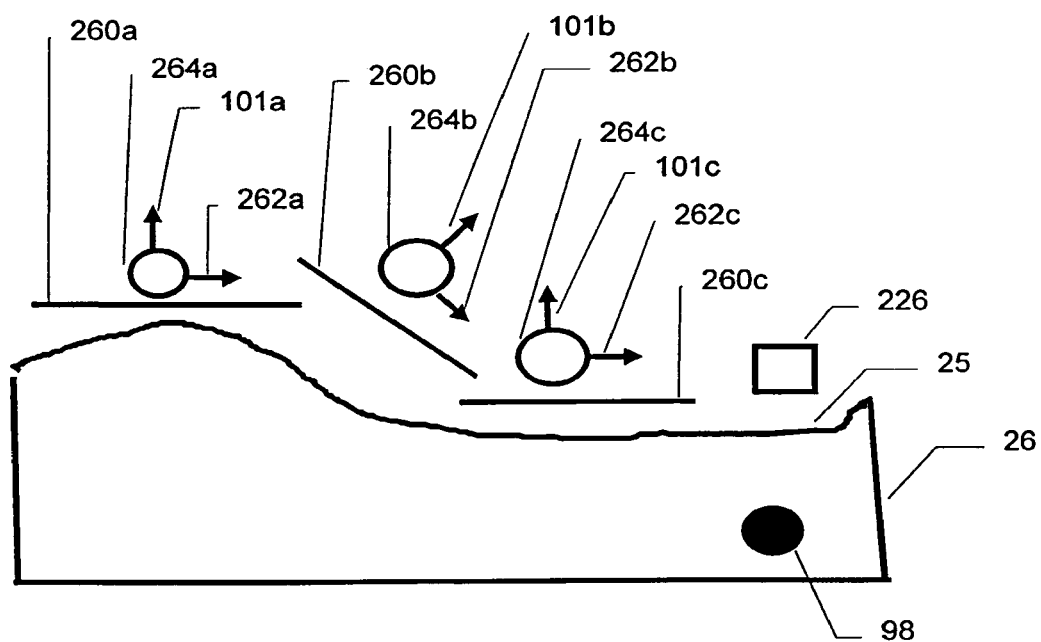
Figure 16A:
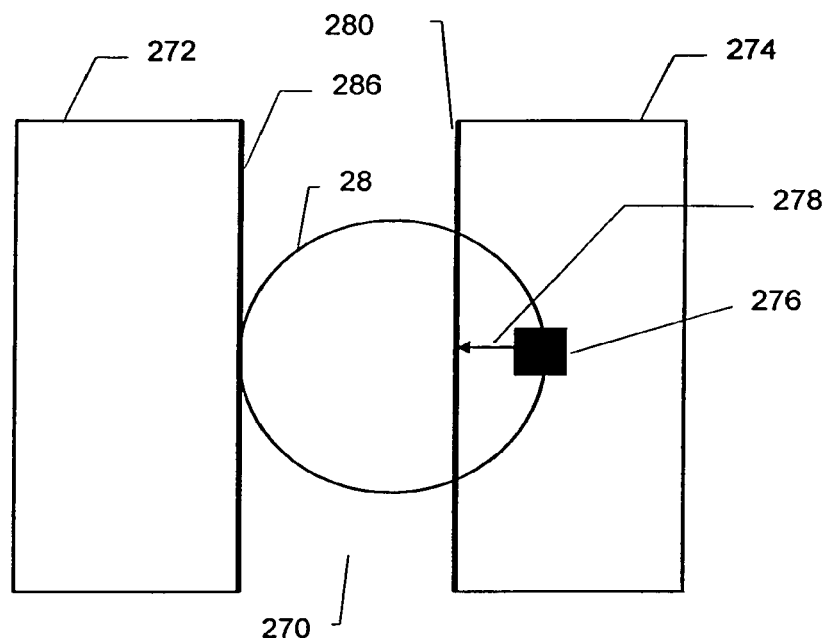
Figure 16B:
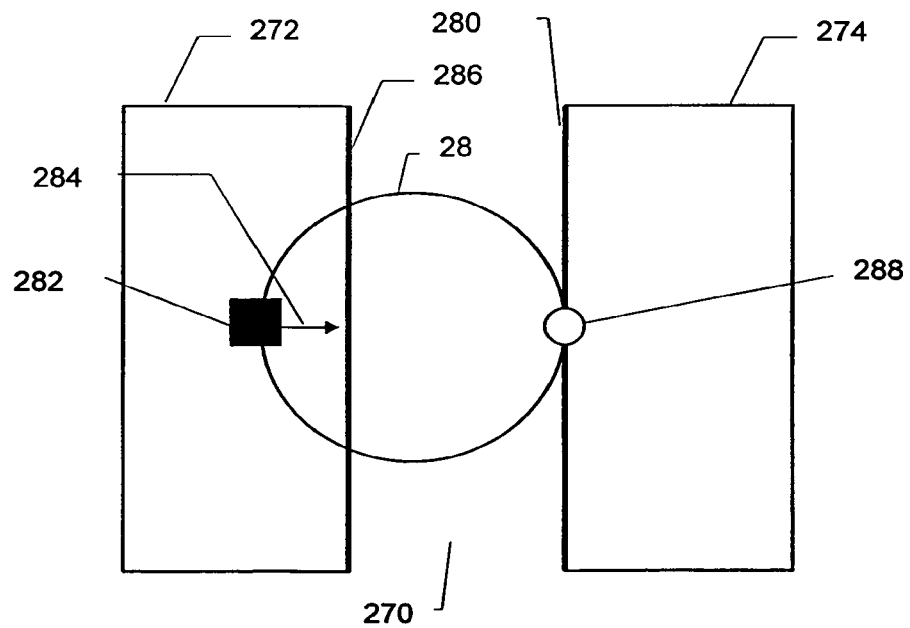

FIGS. 14A, 14B, and 14C illustrates pictorial views of a virtual surface and the endpoints of a segment that intersects the a virtual surface of a virtual object for one embodiment of the invention;

FIG. 15 illustrates a pictorial view of previous surface contact points, tangency planes, and resulting surface contact point for one embodiment of the invention;

FIGS. 16A and 16B show a pictorial view of a spherical virtual tool in a channel formed between two virtual objects and;

FIGS. 17A-17E show pictorial views of a virtual tool encountering a surface and moving along the surface constrained by a constraint plane.

Figure 18:
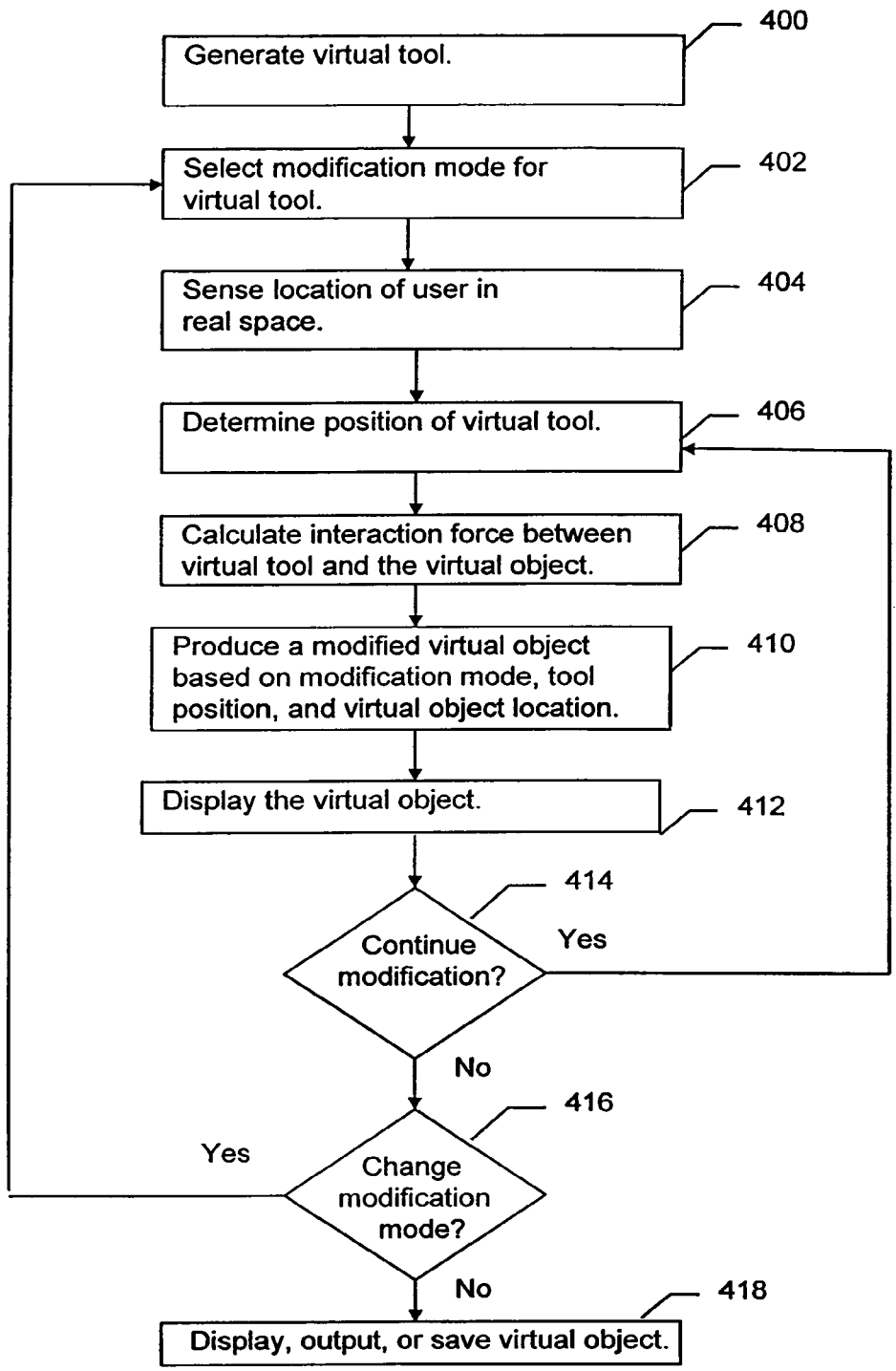
Figure 19A:
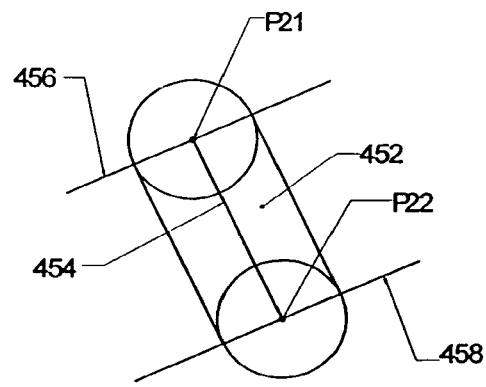
Figure 19B:
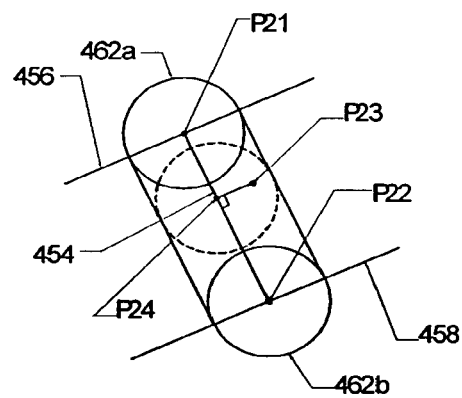
Figure 20:
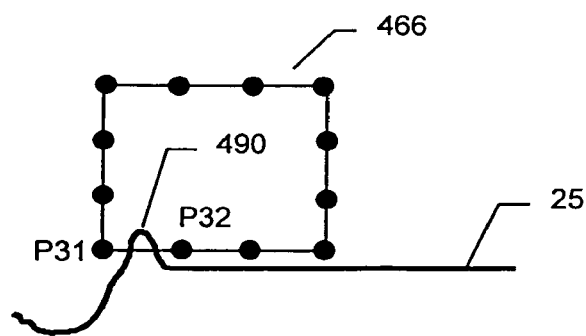
Figure 21:
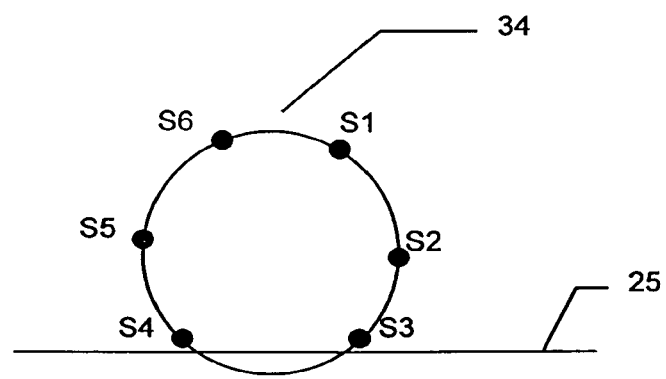
Figure 22:
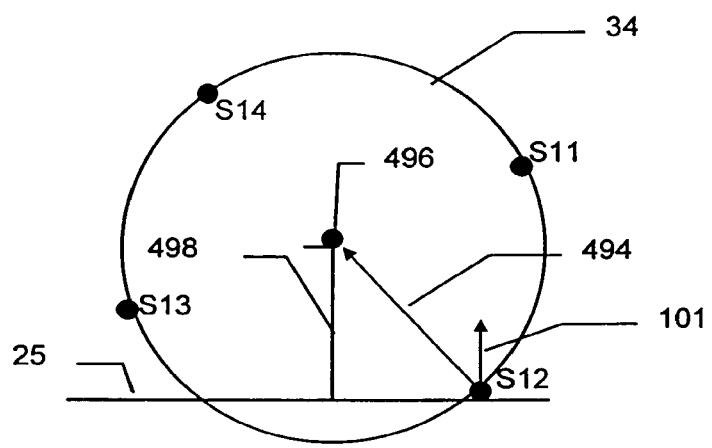
Figure 24:
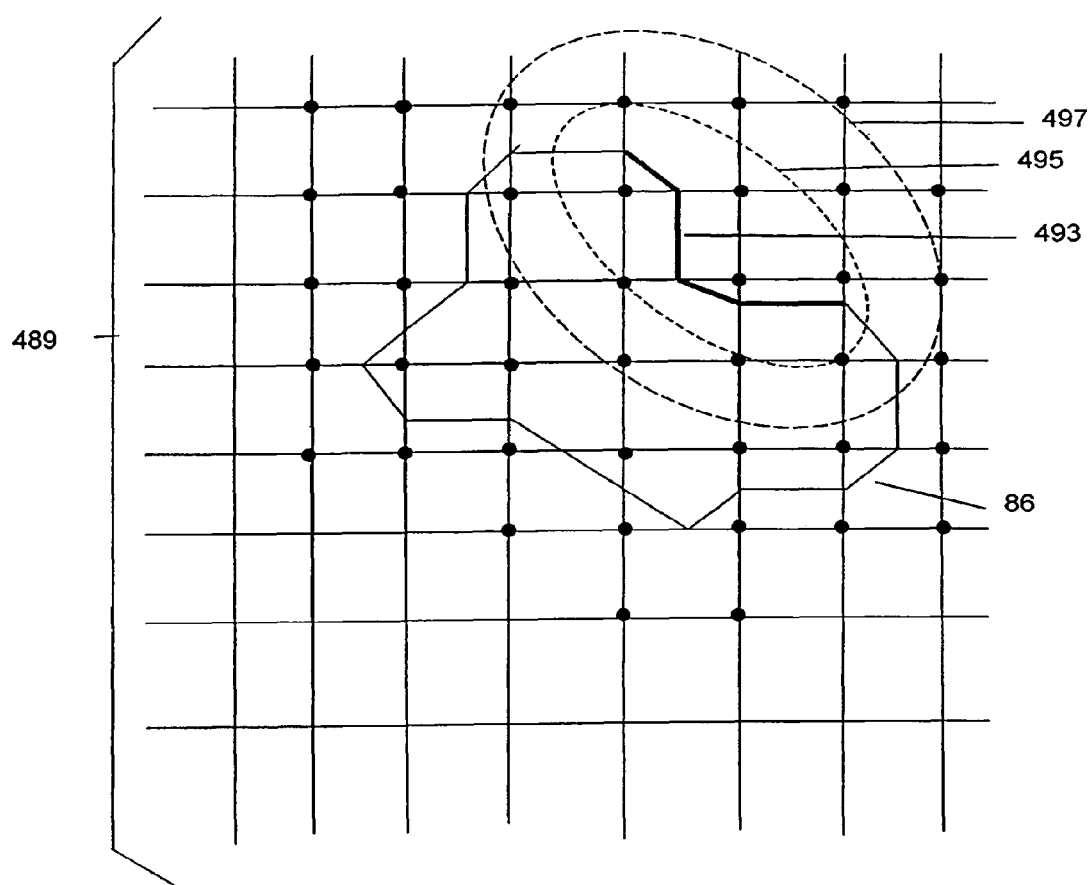
Figure 25:
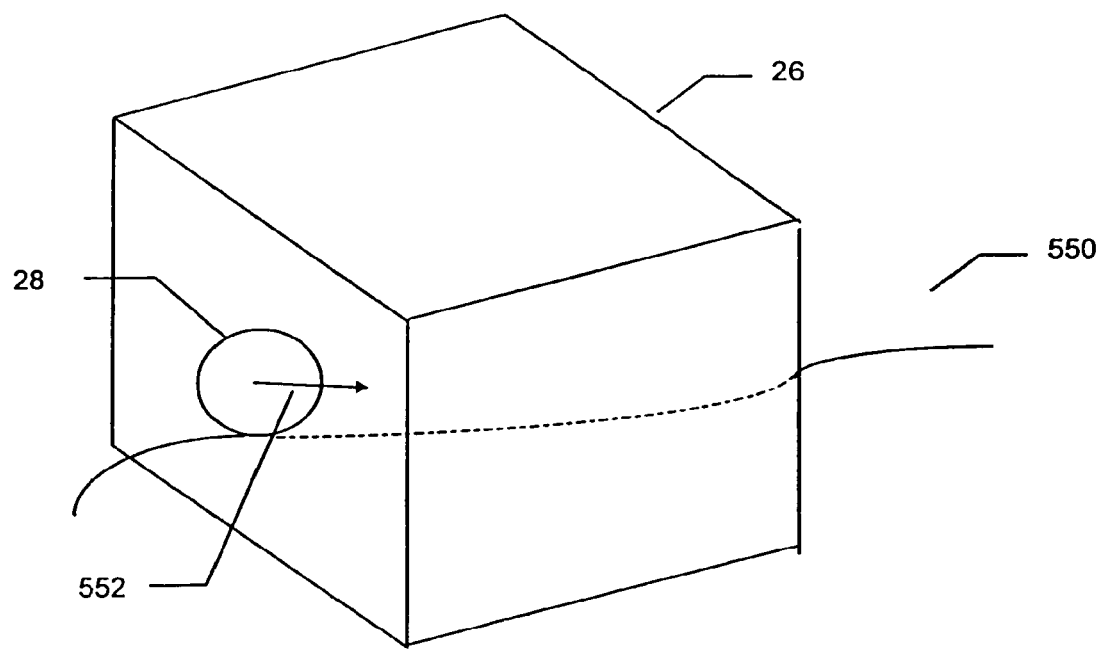
Figure 26:
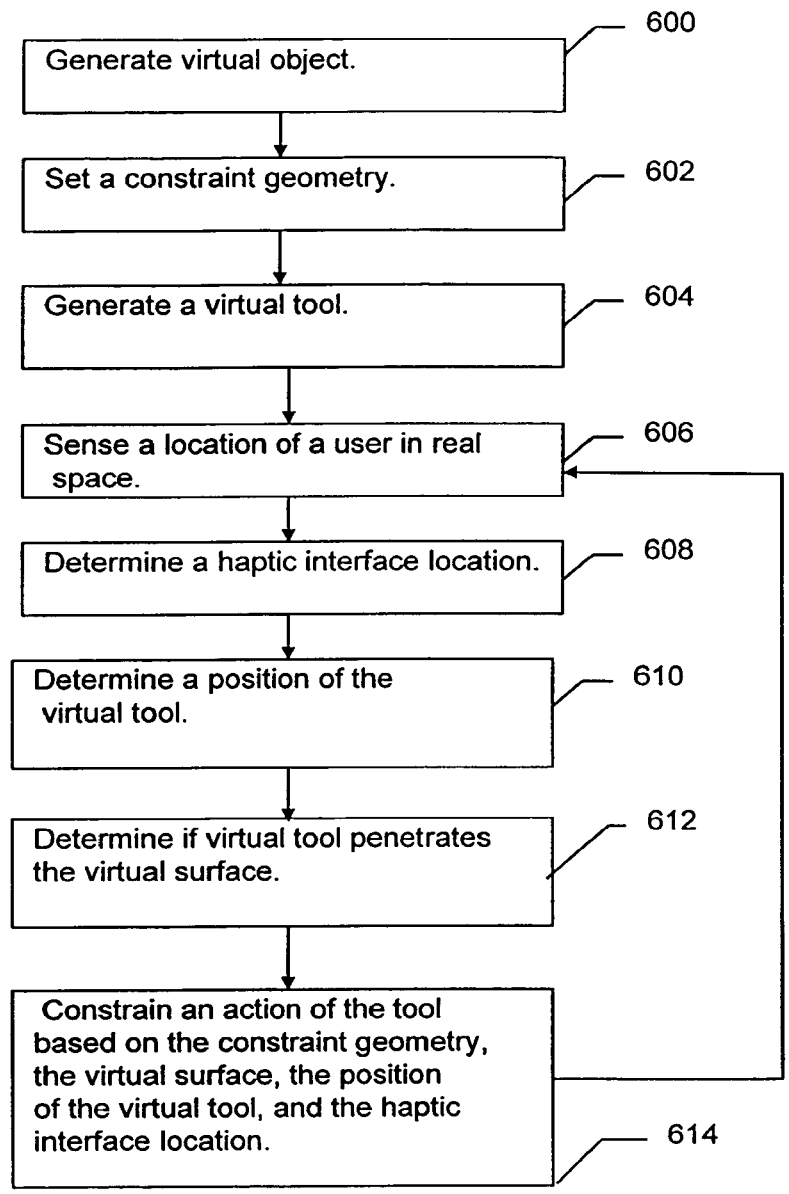
Figure 27:
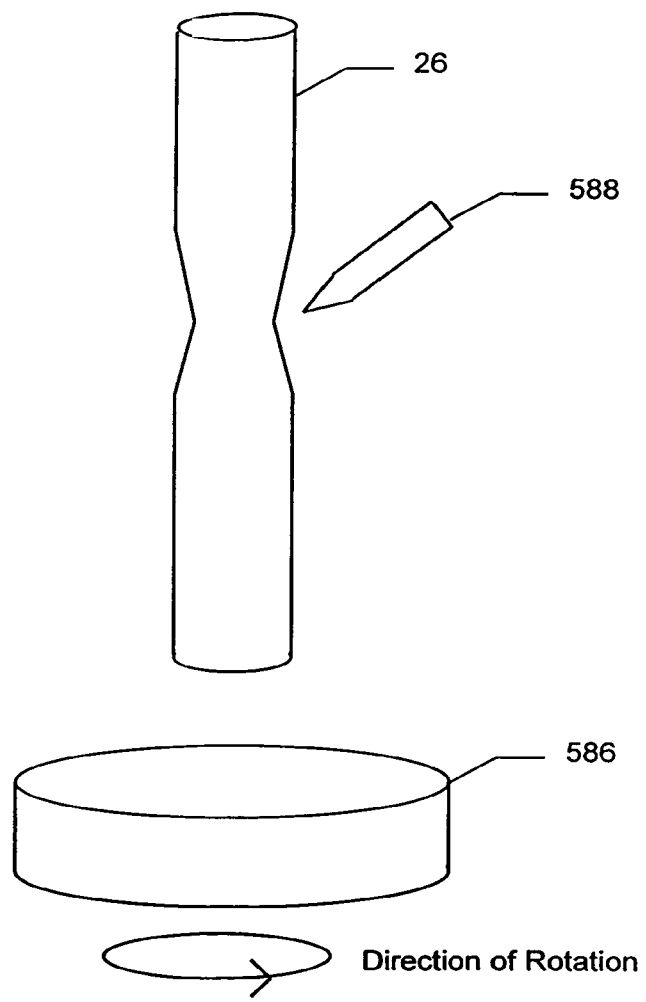

FIG. 18 illustrates a flowchart of the modification process occurring between a virtual tool and virtual object, for one embodiment of the invention;

FIG. 19A provides a pictorial view of a swept area based on a removal line between two points, for one embodiment of the invention;

FIG. 19B provides a pictorial view of endpoints, a desired point, a projected point, endpoint planes, and a projected plane, for the embodiment of the invention illustrated in FIG. 19A;

FIG. 20 provides a pictorial view of a cube near a virtual surface of a virtual object with a protruding feature of the virtual surface penetrating between two points of the cube;

FIG. 21 provides a pictorial view of a sphere penetrating a virtual surface between two points of the sphere;

FIG. 22 provides a pictorial view of a sphere represented by multiple points penetrating a virtual surface, as well as illustrating a calculated distance between the origin of the sphere and the virtual surface;

FIG. 23A-23D illustrates pictorial views of a virtual tool with outrigger constructs including arms and outriggers connected to the handle of the virtual tool;

FIG. 24 illustrates a pictorial view of a painted area of the surface of a virtual object and a corresponding selection volume;

FIG. 25 illustrates a pictorial view of a virtual tool moving through a virtual object, constrained by the geometric constraint of a curved line;

FIG. 26 illustrates a flowchart of the process of setting a geometric constraint and using the geometric constraint to constrain the movement of a virtual tool; and FIG. 27 illustrates a pictorial view of a virtual lathing tool and a virtual object rotating in virtual space under the control of a control wheel.

Figure 28A:
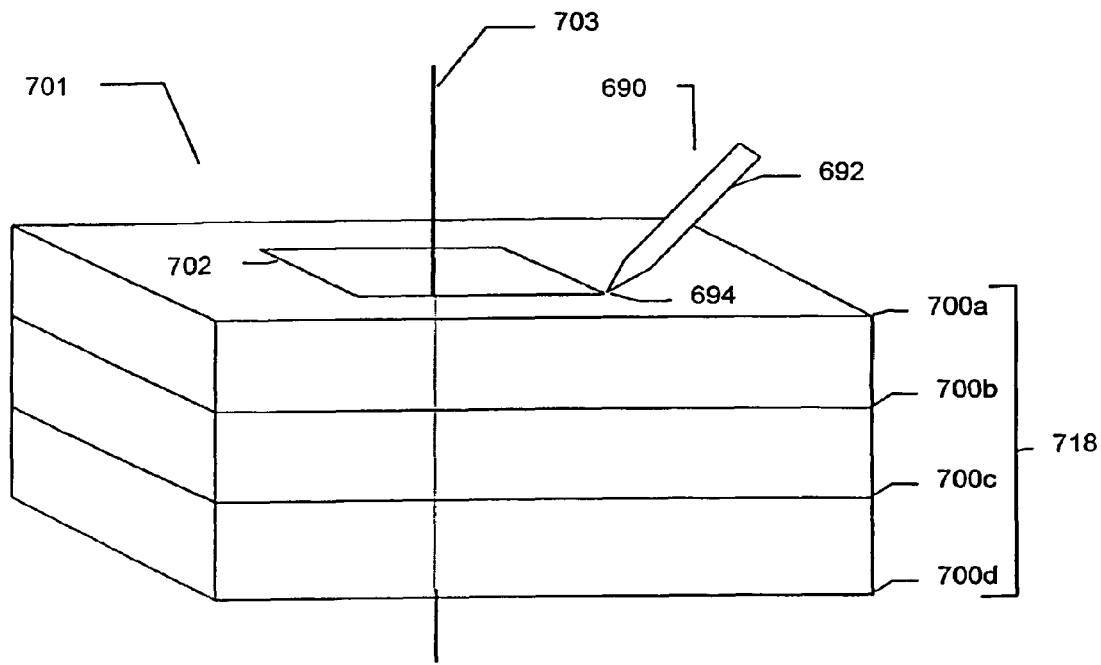
Figure 28B:
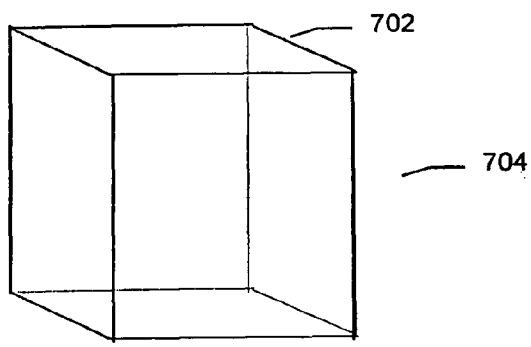
Figure 28C:
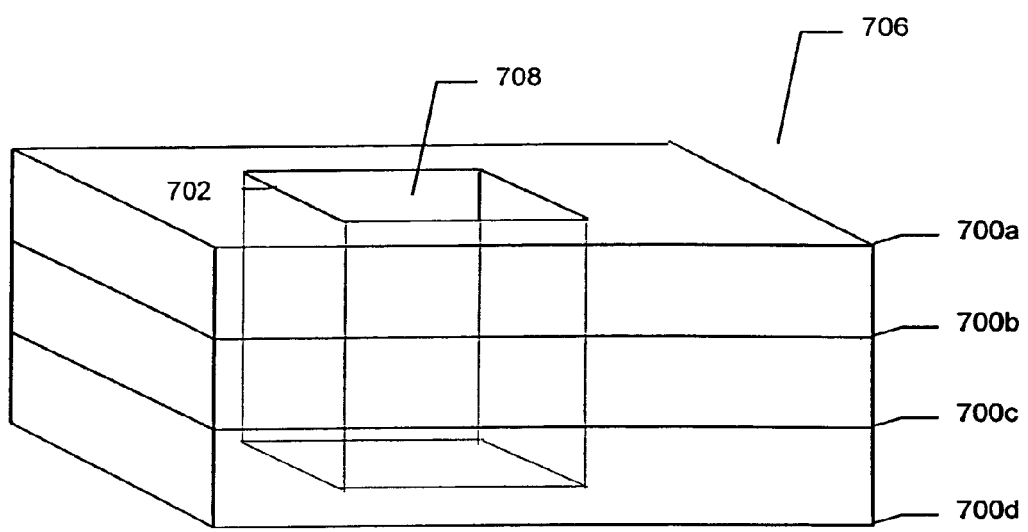

FIG. 28A illustrates a pictorial view of an initial block of virtual material overlaid by construction planes aligned along an axis and a sketch on the top surface of one construction plane for one embodiment of the invention;

FIG. 28B illustrates a pictorial view of a resulting block of material based on the sketch for the embodiment of the invention depicted in FIG. 28A;

FIG. 28C illustrates a pictorial view of another approach to obtaining a resulting block of material based on the sketch for the embodiment of the invention depicted in FIG. 28A.

Figure 29A:
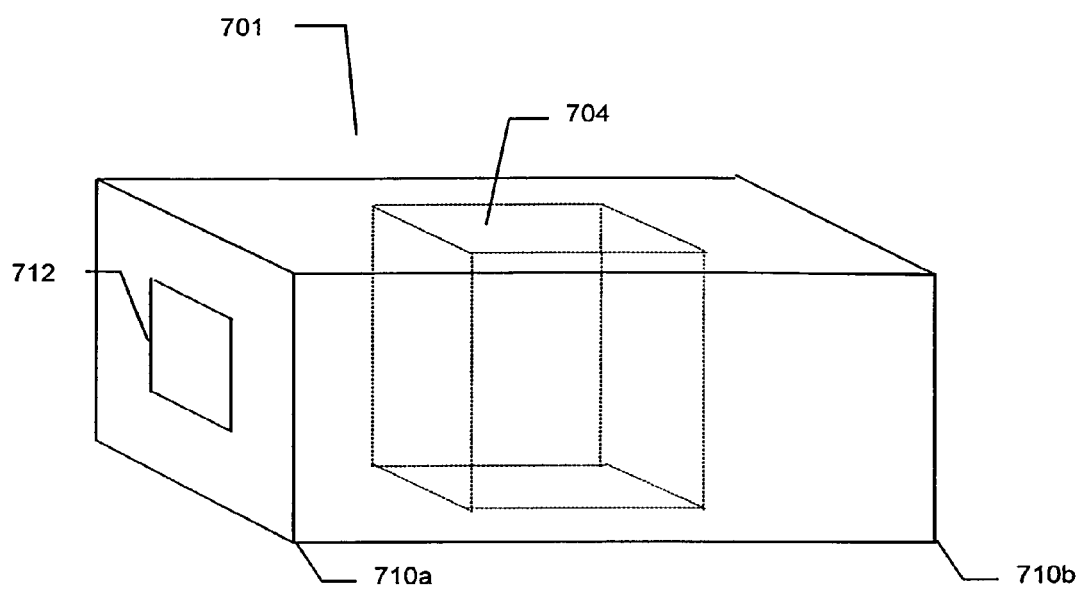
Figure 29B:
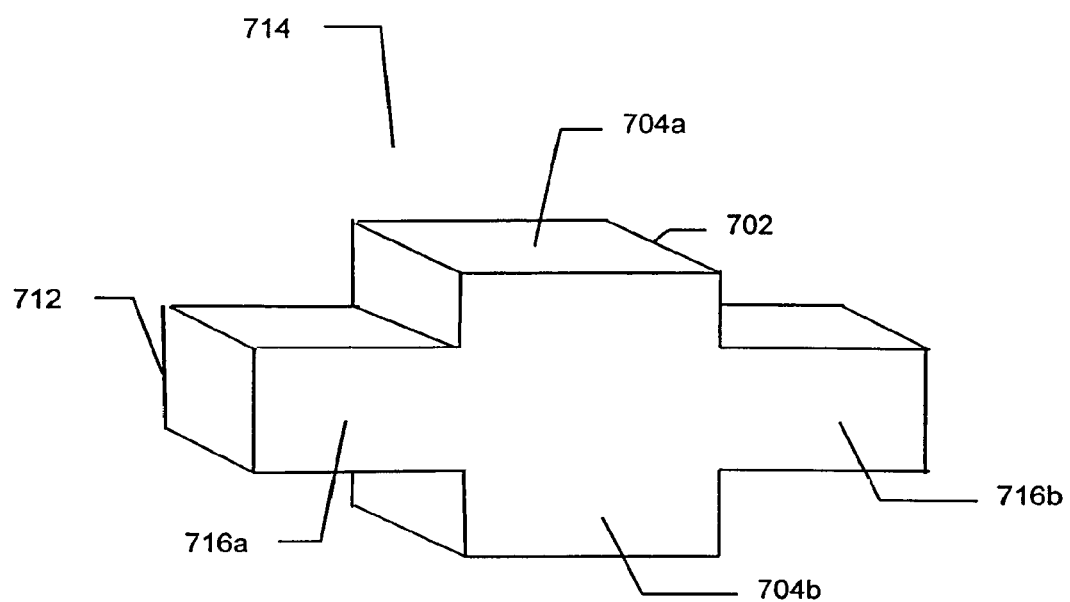
Figure 30:
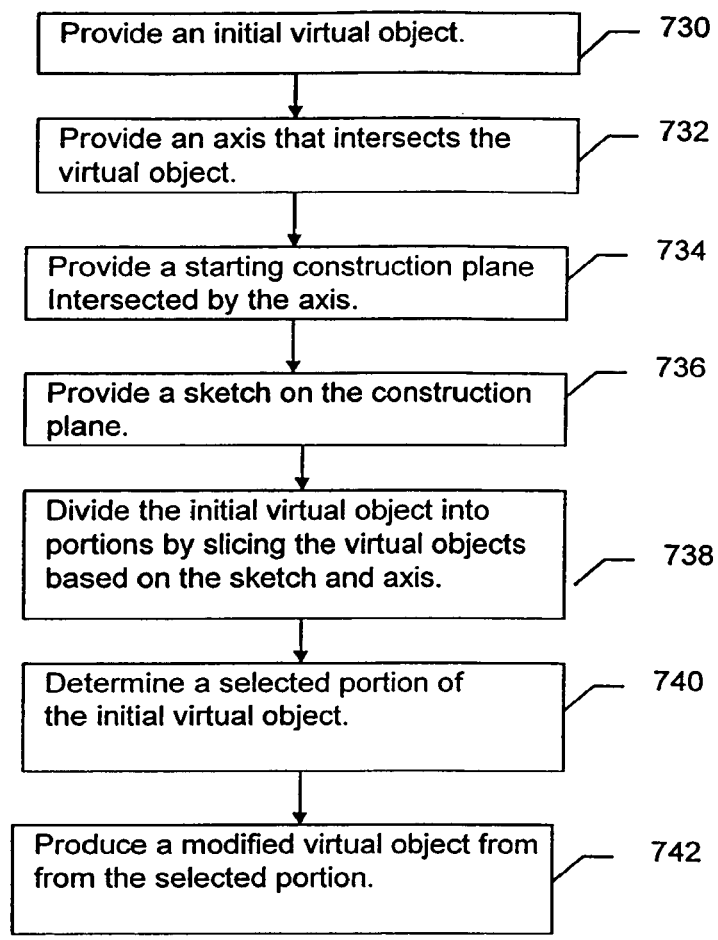
Figure 31:
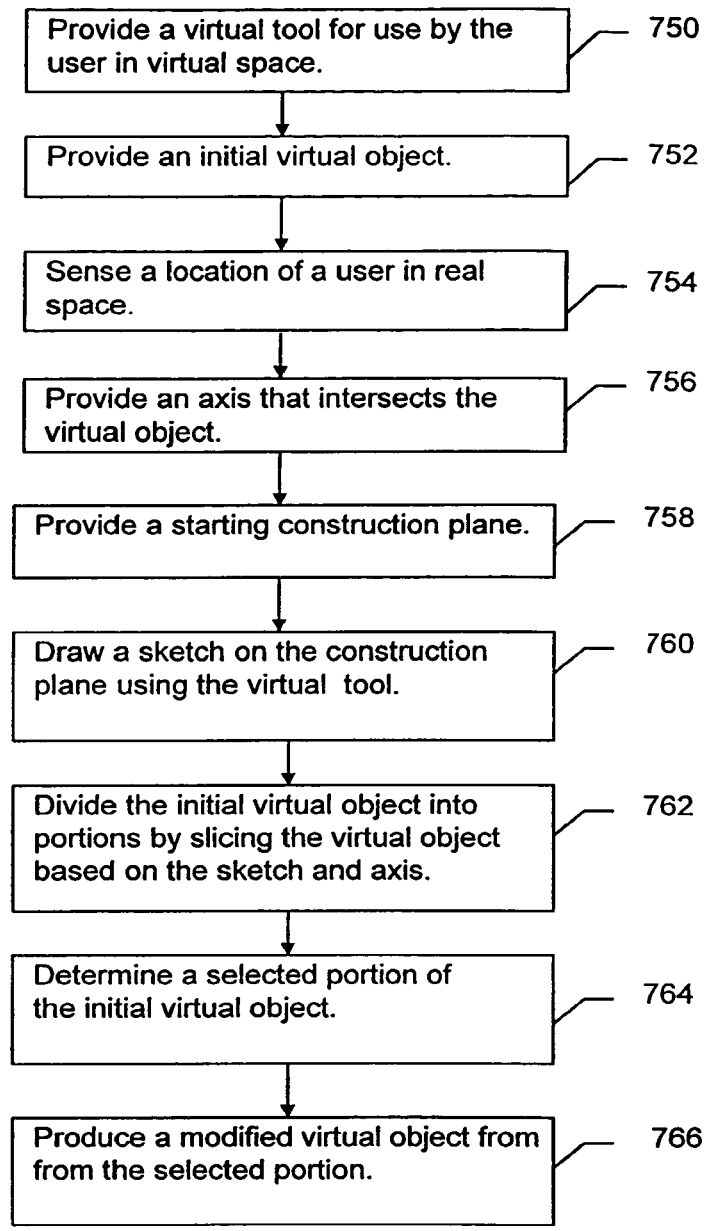
Figure 32A:
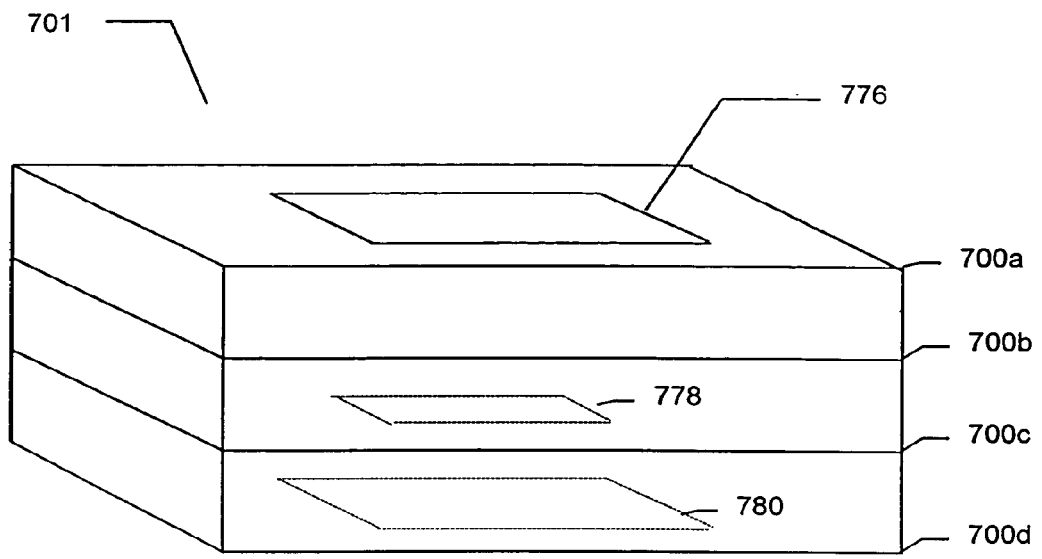
Figure 32B:
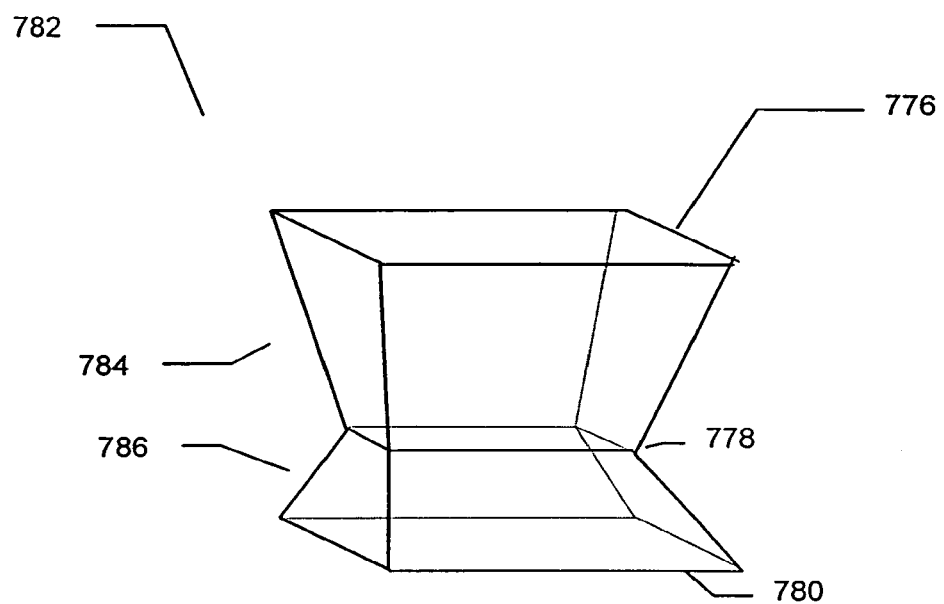
Figure 33A:
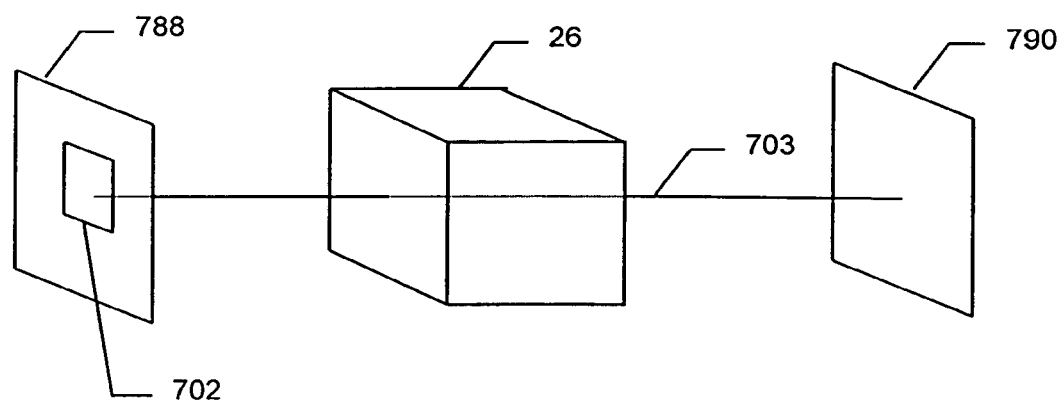
Figure 33B:
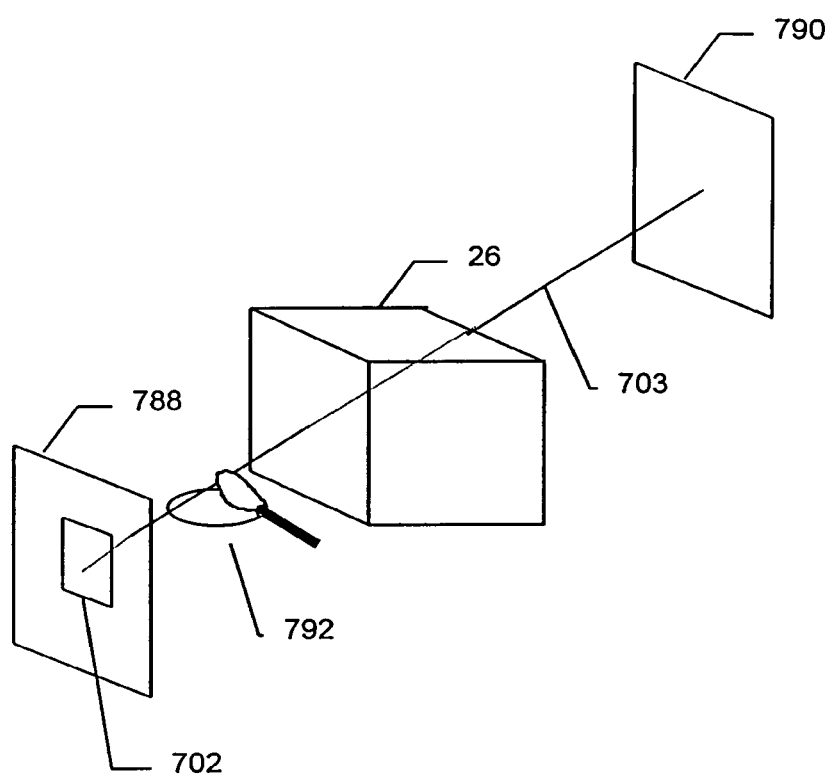
Figure 34A:
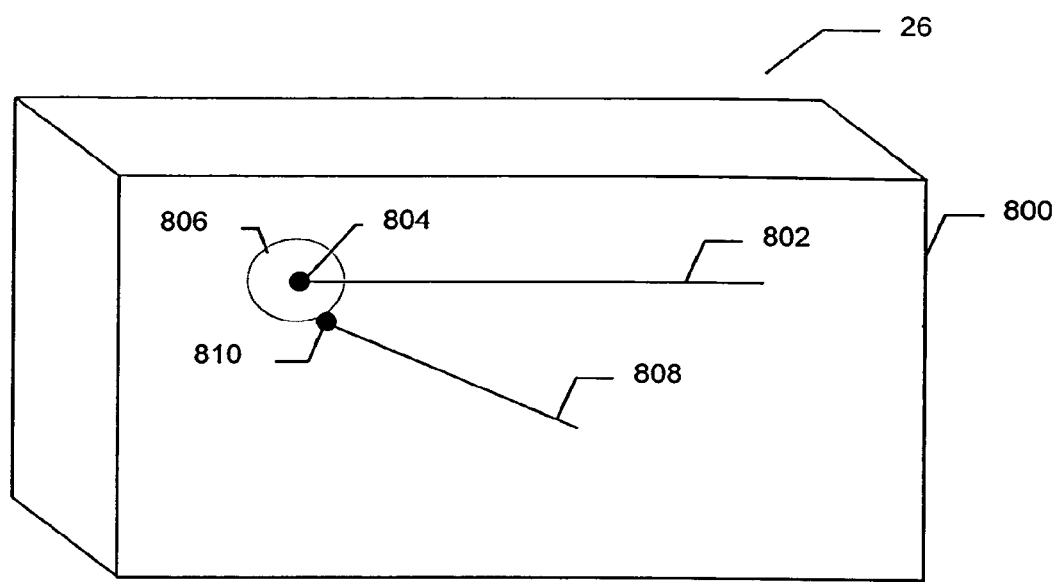
Figure 34B:
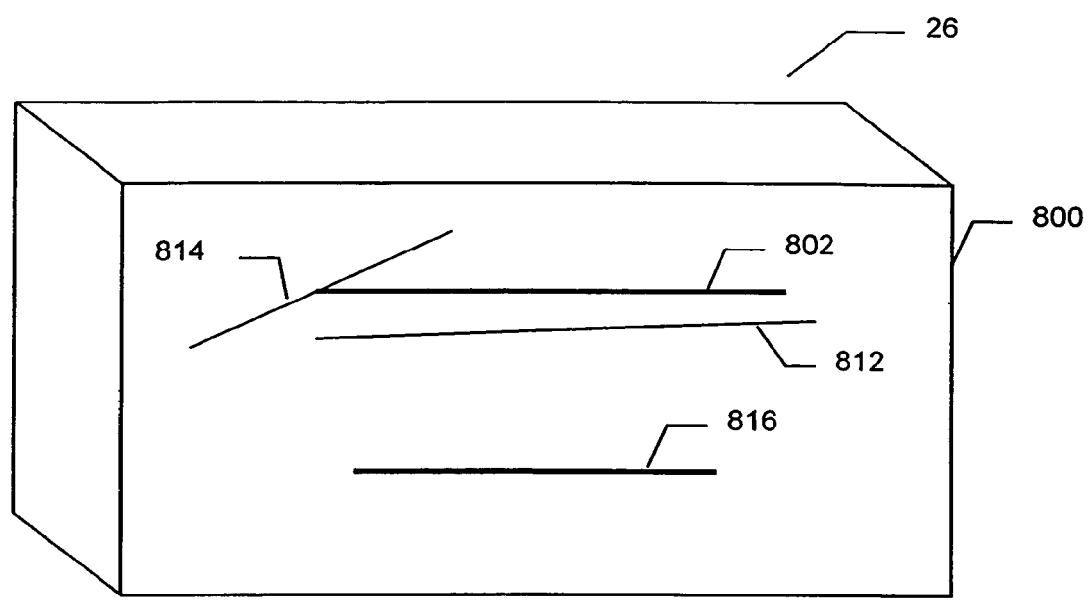
Figure 34C:
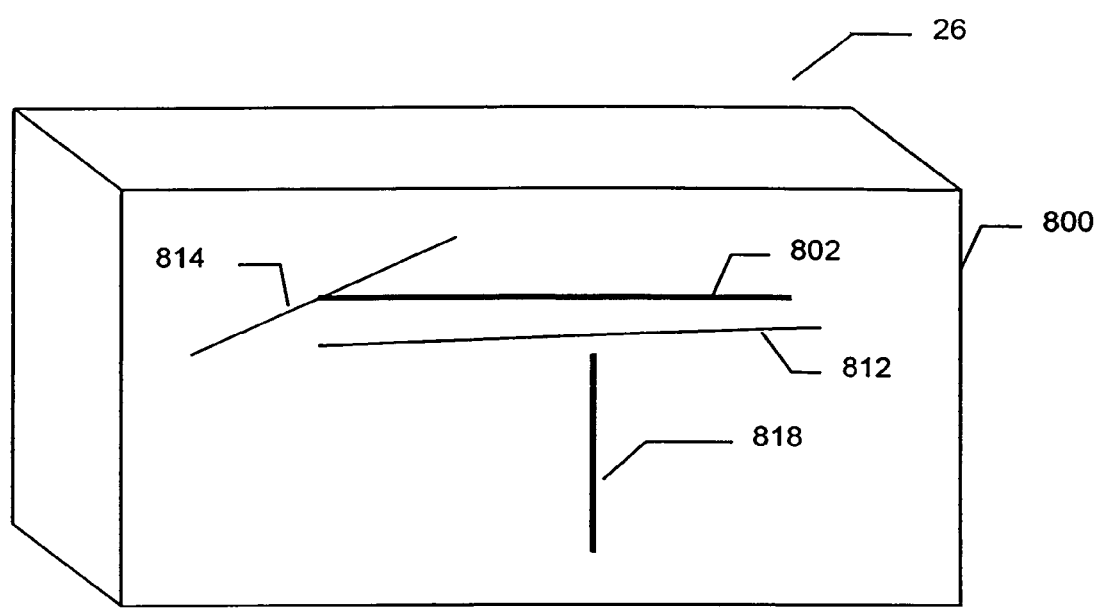
Figure 34D:
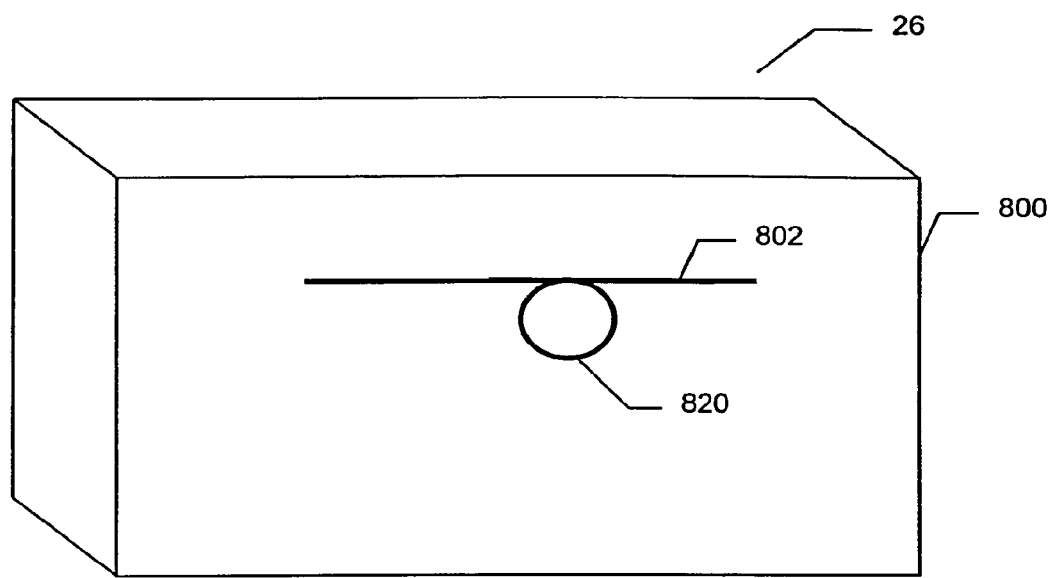
Figure 35:
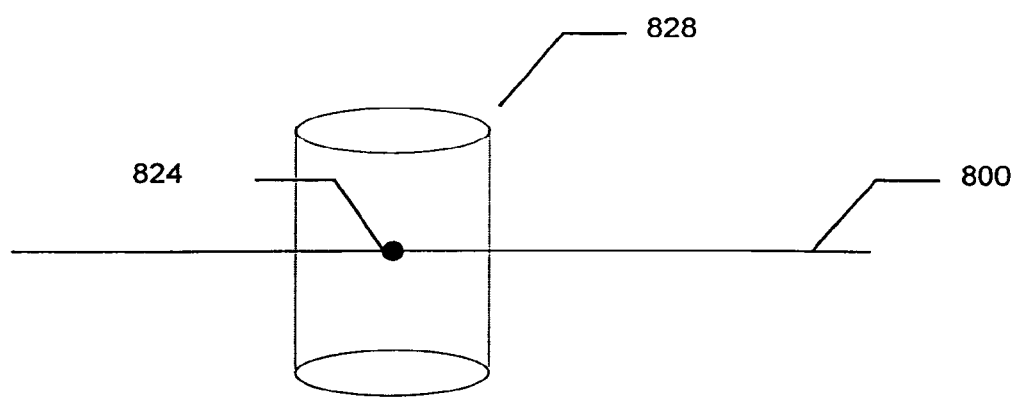
Figure 36:
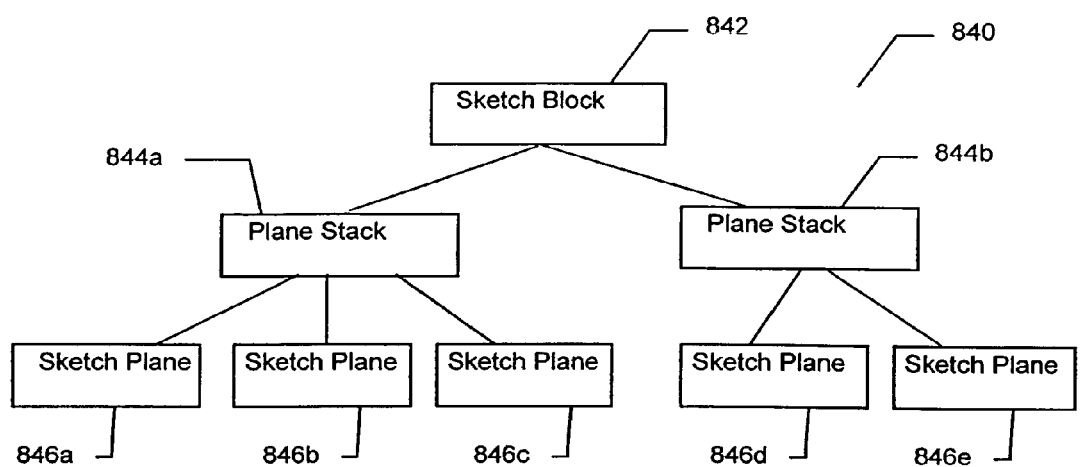
Figure 37:
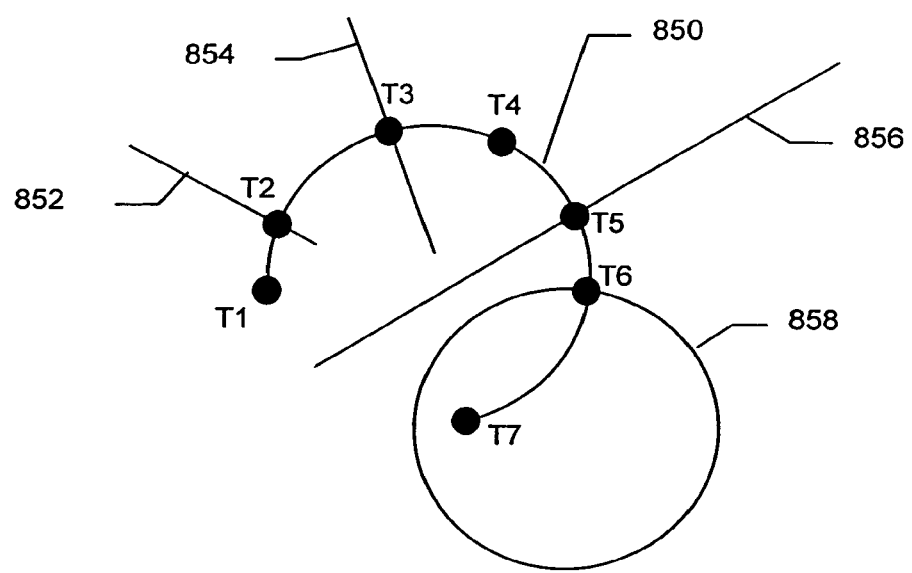
Figure 38:
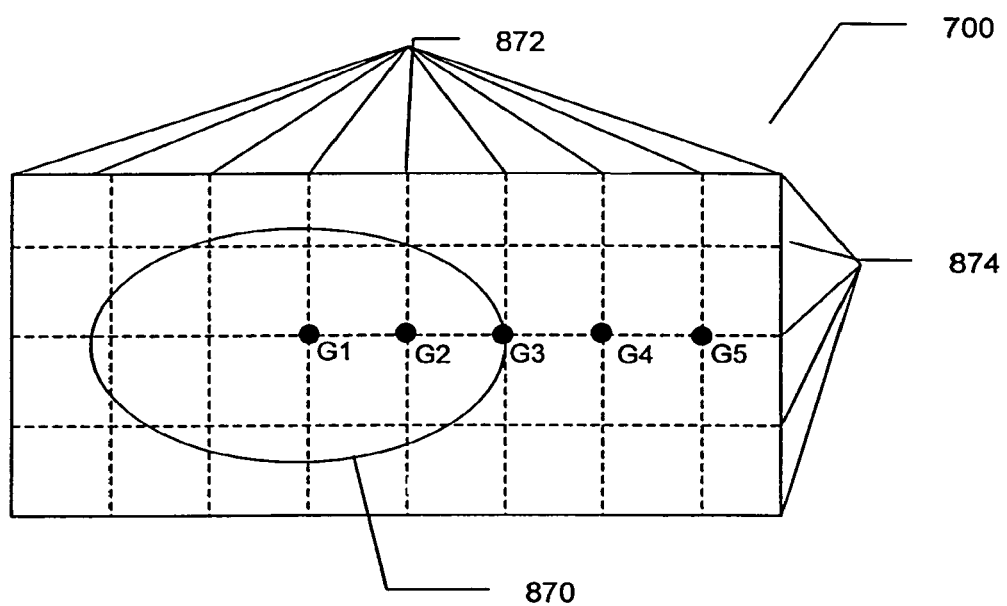
Figure 39:
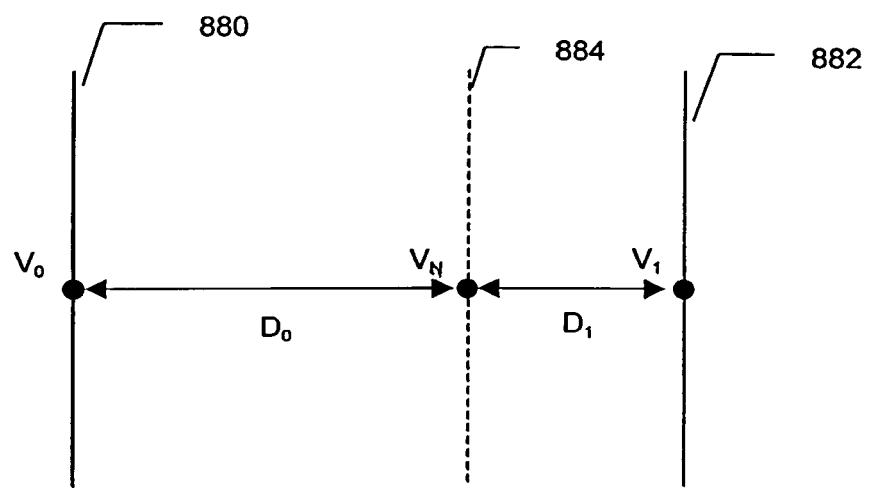

FIG. 29A illustrates a pictorial view of the cut block of FIG. 28B overlaid with a potential material of the virtual environment, along with a starting construction plane, ending construction plane, and a sketch on the starting plane;

FIG. 29B illustrates a pictorial view of a union block of material for the embodiment of the invention depicted in FIG. 29A;

FIG. 30 illustrates a flowchart of the process of producing a modified virtual object from an initial virtual object without requiring any force feedback interaction for one embodiment of the invention;

FIG. 31 illustrates a flowchart showing the process of a producing a modified virtual object from an initial virtual object in a haptic virtual environment while providing force feedback to the user for one embodiment of the invention;

FIG. 32A illustrates a pictorial view of an initial virtual object with sketches on several construction planes for one embodiment of the invention;

FIG. 32B illustrates a pictorial view of modified virtual object created by an interpolation process between the sketches shown in the embodiment for FIG. 32A;

FIG. 33A illustrates a pictorial view of a virtual object with construction planes connected by an axis for one embodiment of the invention;

FIG. 33B illustrates a pictorial view of the axis that intersects the virtual object at a different angle for the embodiment show in FIG. 33A;

FIG. 34A illustrates a pictorial view of virtual object with a point constraint on a sketch on a construction plane for one embodiment of the invention;

FIG. 34B illustrates a pictorial view of a virtual object with a sketch plane showing a parallel line constraint for one embodiment;

FIG. 34C illustrates a pictorial view of virtual object with a sketch plane showing a perpendicular line constraint for one embodiment;

FIG. 34D illustrates a pictorial view of virtual object with a sketch plane showing a circle constraint for one embodiment;

FIG. 35 illustrates a pictorial view of snap-to area for a point, for one embodiment of the invention;

FIG. 36 illustrates a block diagram of a scene graph, including a sketch block node, plane stack nodes, and sketch plane nodes;

FIG. 37 illustrates a pictorial view of an open curve to be trimmed;

FIG. 38 illustrates a pictorial representation of a sketch plane showing a grid with a closed outline, vertical grid lines and horizontal grid lines;

FIG. 39 illustrates a pictorial representation showing the interpolation process between a point $V_0$ on a sketch plane and a point $V_1$ on a sketch plane resulting in a new point $V_N$, on an intermediate plane;

DETAILED DESCRIPTION OF THE INVENTION

The description includes headings and subheadings that aid in organizing the text, but are not meant to be limiting in any way. Topics discussed under a heading or subheading may also be described elsewhere throughout the specification.

Figure 1:
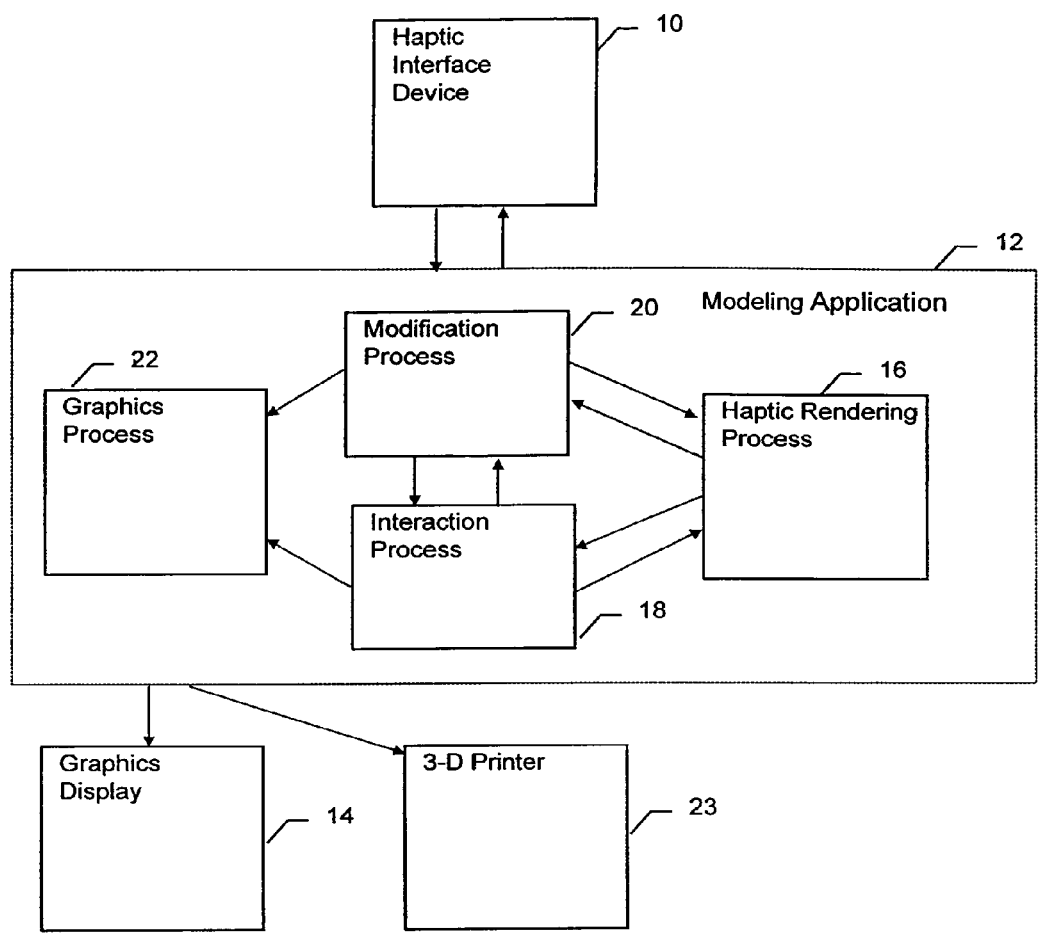

FIG. 1 shows a system for one embodiment of the invention, including a haptic interface device 10, modeling application 12, and graphics display 14 in electrical communication with each other. The modeling application 12 includes a haptic rendering process 16, a virtual tool and object interaction process 18, a virtual object modification process 20, a graphics process 22, and a 3-D printer 23 all in electrical communication with each other.

Generally, a user of the system uses the haptic interface device 10 to interact with the virtual object 26 (see FIG. 2) receiving force feedback produced by the haptic rendering process 16 and viewing graphics rendered by the graphics process 22 on a graphic display 14.

The user may also output the virtual object 26, or a surface representation of it, to a 3-D printer 23 to produce an actual 3-D physical model of the virtual object 26. In one embodiment, the 3-D printer is a stereolithography machine.

Software Process

In one embodiment, a "process", as referred to in FIG. 1, is a software process executing on a hardware microprocessor. All the processes may execute on one microprocessor, or in other embodiments, one or more processes may execute on different microprocessors, which are linked by buses, cables, local networks, wide area networks, or global computer networks, such as the Internet.

The modeling application 12 is viewed in FIG. 1 as a software application executing on one computer system. In another embodiment, the modeling application 12 executes on one or more computer systems connected by a communications device, such as a bus, cable, or network connection. In an alternate embodiment, the modeling application is a hardware device, such as an ASIC (application specific integrated circuit), and one or more processes of the application are implemented on one or more ASIC devices. In a further embodiment, the modeling application 12 is implemented as one or more objects, which may execute on one or more computer systems. In one embodiment, the modeling application 12 runs on a dual 300 MHz Intel® Pentium® 2 computer running Microsoft® Windows NT™ 4.0 using an Open GL accelerated graphics card.

The modeling application 12 is not required to include a haptic rendering process 16, an interaction process 18, a modification process 20, and a graphics process 22. In one embodiment, the functions of the modeling application 12 are implemented by a different number of processes. In one embodiment, the modeling application 12 includes the haptic rendering process 16 and the graphics process 22.

In one embodiment, the invention is implemented using an object-oriented approach. The haptic rendering process 16 and other processes are implemented as software objects. In another embodiment, the virtual object 26 and the virtual tool 28 are implemented as software objects and perform one or more of the functions of the haptic rendering process 16. In one embodiment, the virtual tool 28 is a software object that performs such functions as determining if contact has occurred with a virtual object 26 and determining the surface direction vector 101, as will be discussed later.

In one embodiment, the virtual object 26 and the virtual tool 28 are implemented as software objects in the C++ programming language. In other embodiments, the virtual object 26 and virtual tool 28 are implemented using an object-oriented programming language other than C++.

In one embodiment, the modeling application is a computer program stored on a computer readable storage media, such as a CD disc, diskette, tape, or other media. In another embodiment, the modeling application is a computer program distributed over a computer-readable propagated signal, such as a program distributed over the Internet.

Haptic Interface Device

In one embodiment, the system includes a haptic interface system, as shown in FIG. 1, including the haptic interface device 10 and the haptic rendering process 16 which generates a virtual object of the virtual environment to be "touched" and determines the results of the interaction (discussed in more detail below). The haptic interface device 10 is a tactile or force-feedback device which provides the touch sensations of interacting with virtual objects 26 to a user of the system. Some haptic interface devices 10 consist of an electro-mechanical linkage which can exert a controllable force on a user's hand. See, for example, U.S. Pat. No. 5,625,576 issued to Thomas H. Massie and J. Kenneth Salisbury, Jr., the disclosure of which is herein incorporated by reference in its entirety. As used herein, "haptic rendering" refers to the creation of a virtual environment with which a user can interact through the sense of touch. The term "haptic rendering process" 16 refers to the computer program which generates the haptic aspects of the virtual environment and determines the forces to be applied to a user through a haptic interface. The haptic rendering process 16 generates haptic representations of virtual objects in the virtual environment.

Overview Of Device, Virtual Object And User Interaction

Figure 2A:
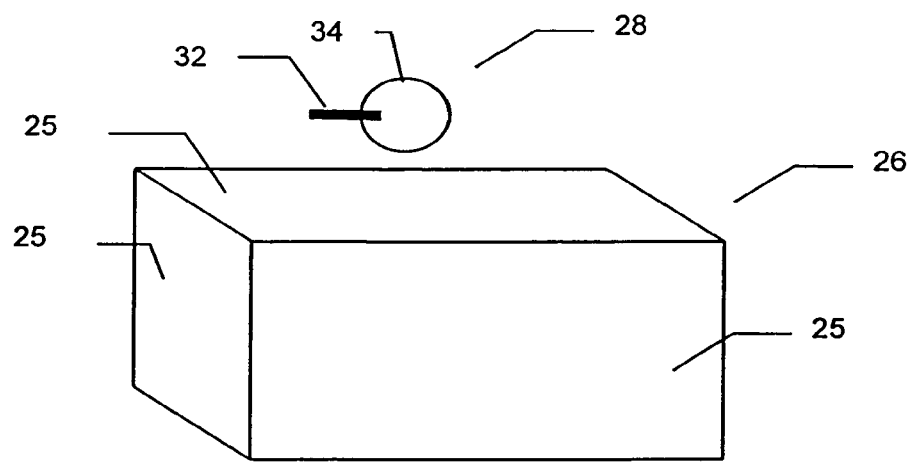

FIG. 2A shows a haptic virtual environment including a virtual object 26 and a virtual tool 28. The virtual object 26 of the embodiment shown in FIG. 1 is depicted as a 3-D (three dimensional) block of material typically "floating" in the virtual space of the virtual environment. The virtual object 26 has a virtual surface 25 that represents the "skin" of the virtual object 26. The virtual tool 28 is represented in FIG. 2A as a sphere 34 with a rod or "handle" 32 connected to it.

In one embodiment, the user uses a haptic interface device 10 in real space to grasp or manipulate the handle 32 of the virtual tool 28 in virtual space. In one embodiment, the location of this handle with respect to the virtual tool 28 can be changed interactively by the user. As used herein, a "haptic virtual environment" refers to a computer-generated virtual environment that can be explored by a user through the sense of touch. In one embodiment, the haptic virtual environment contains a virtual object 26 that is model of a real world object that a user is creating in the virtual environment. In another embodiment, the haptic virtual environment incorporates two or more virtual objects 26 that are linked to each other, such as in a hierarchical arrangement. It should be understood that the interaction and/or modification methods described herein may be readily extended to apply to two or more virtual objects 26 linked or associated in a haptic virtual environment.

Figure 2B:
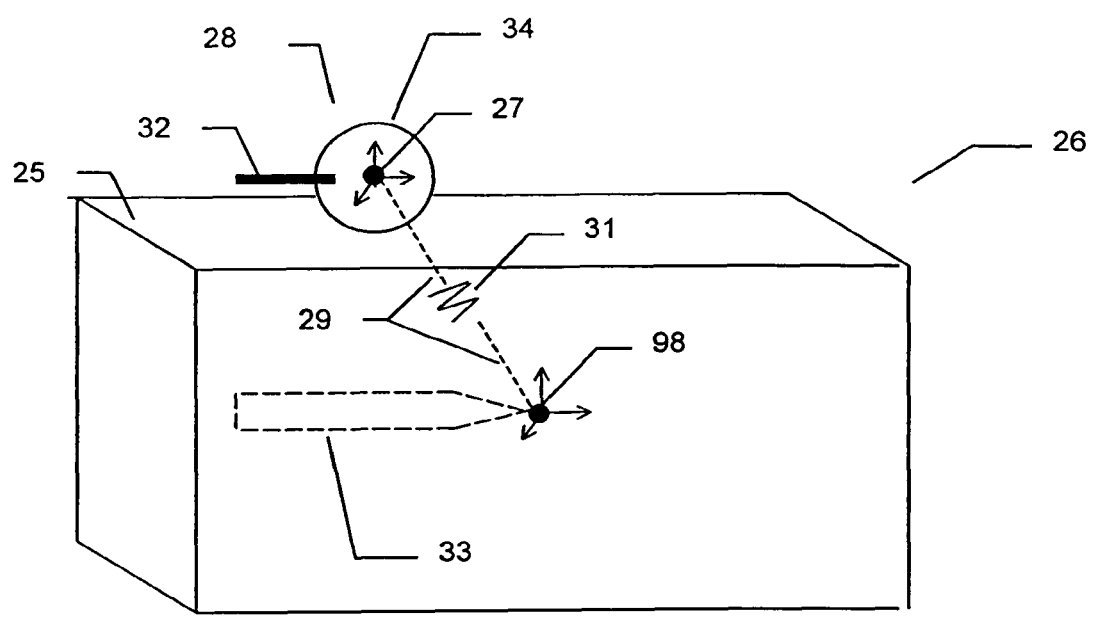

FIG. 2B illustrates a virtual tool 28 contacting the virtual surface 25 of a virtual object 26. The user guides the virtual tool 28 using the haptic interface device 10, represented, in this embodiment, by a stylus 33 in FIG. 2B. The position and orientation of the tip of the stylus 33 indicate the haptic interface location 98. Note that, although the user may be manipulating a literal stylus in some embodiments, the haptic interface location 98 could be controlled by a user interacting with any number of differently shaped elements such as a thimble, a yoke, or a ball. The tip of the virtual stylus 33 is indicated by the haptic interface location 98. In one embodiment, the haptic rendering process 16 tracks the haptic interface location 98, but does not otherwise track the shape or location of the entire haptic interface device 10.

The haptic rendering process 16 attempts to move the virtual tool 28 so that the origin 27 of the virtual tool 28 matches the haptic interface location 98. However, unless the haptic rendering process 16 is using the virtual tool 28 to remove material from the virtual object 26, then the haptic rendering process 16 typically does not allow the virtual tool 28 to penetrate the virtual object 26. Thus, as shown in FIG. 2B, the user has attempted to move the virtual tool 28 into the virtual object 26, which is indicated by the haptic interface location 98 within the virtual object 26. The haptic rendering process 16 calculates a resistance to the movement of the virtual tool 28 into the virtual object 26. This calculation is based on a connection 29 between the tool origin 27 and the haptic interface location 98, as will be discussed in more detail later. In one embodiment, the connection 29 includes a virtual spring 31. In one embodiment, the connection 29 includes a virtual dash-pot. Thus, if the user attempts to move the virtual tool 28 further into the virtual object 26, the haptic rendering process 16 calculates an increasing resistance force that is fed back to the user through the haptic interface device 10 based on the virtual spring 31.

In one embodiment, the user is allowed to move the virtual tool 28 through the virtual object 26 without resistance while removing material. In this case, the user selects a transparent or translucent mode, and the virtual tool 28 appears translucent. The haptic rendering process 16 allows the user to move the virtual tool 28 through the virtual object 26 without constraint or resistance.

Description Of Virtual Tool And Modification Options

As already described, the user interacts with the virtual object 26 in the virtual environment through a virtual tool 28. The user may select any shape for the tool 28. The shape of the tool 28, along with other characteristics, such as interaction mode, determine the interaction with the virtual object 26. In one embodiment, the tool 28 may be represented as a series of discrete points in virtual space which outline a three-dimensional shape of the tool 28. The virtual tool 28 is modeled as a set of discrete points for the purposes of haptic interaction and collision detection with the virtual object 26. In another embodiment, the points of the virtual tool 28 are created by an algebraic equation or any other continuous or piecewise mathematical method suitable for determining a 3-D shape in a virtual environment. In another embodiment, the tool 28 can be represented directly by continuous or piecewise mathematical equations, rather than by discrete points. The virtual tool 28 may take on any of a number of shapes that may be useful for a user when using a virtual tool 28 to create a virtual object 26 in the virtual environment. Typical shapes may include a sphere or cylinder. In another embodiment, the user selects one or more interaction modes for the virtual tool 28, such as a sandpaper mode, which causes the tool 28 to remove material gradually from the virtual object 26, much like using real sandpaper to smooth the shape of a block of wood in the real world.

Creating And Manipulating The Virtual Object

Figure 3:
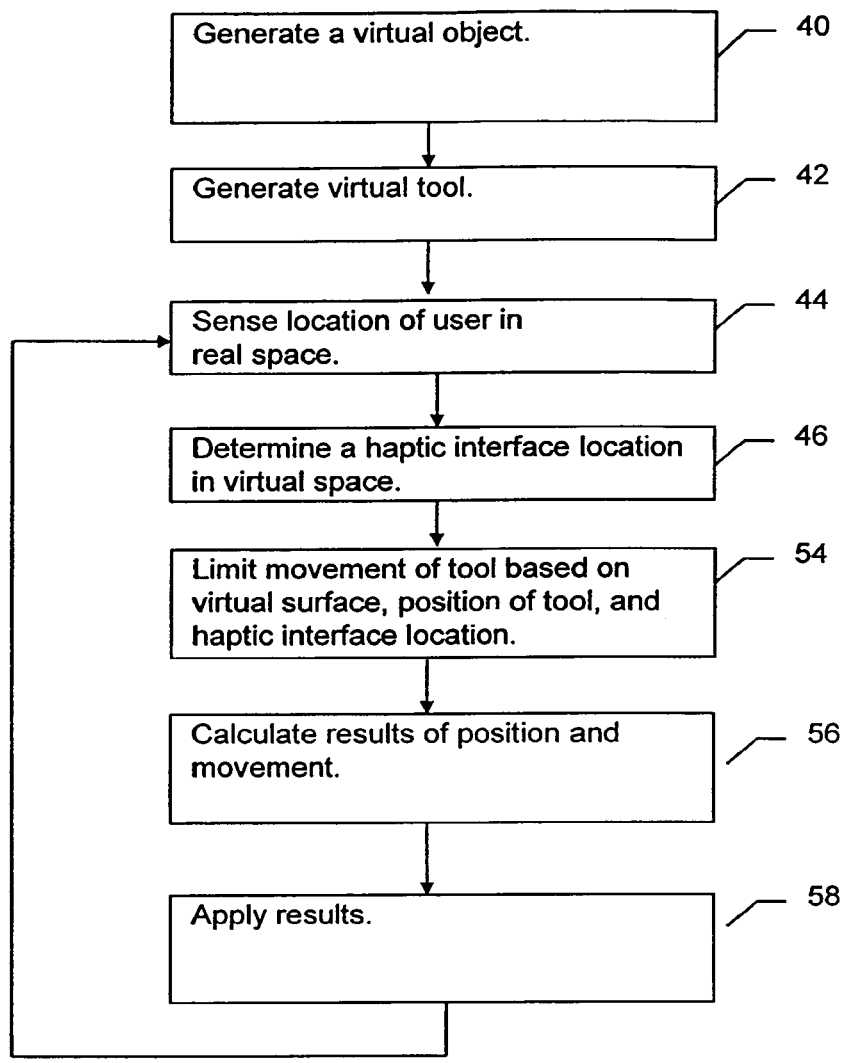
FIG. 3 illustrates a high-level flowchart of the haptic rendering process between a virtual tool and virtual object, for one embodiment of the invention.

FIG. 3 illustrates a flowchart of the haptic rendering process between a virtual tool 28 and virtual object 26. First, a virtual object 26 is generated (step 40). Typically, this occurs when the user requests that an initial virtual object 26 be created, for example, by directing that the virtual object 26 assume a 3-D cube or "block" shape. In one embodiment, the initial virtual object can be defined as a shape generated from a saved file, scanner, or 3D digitizer. In one embodiment, the user selects an interaction mode that selects the characteristic of the virtual object 26. The shape and material, and surface properties of the virtual object 26 can be specified, for example, the hardness or softness of the object 26. For example, if the user selects a sculpting mode, then the virtual object 26 assumes characteristics generally representative of a block of clay. If the user selects a 3-D sketch mode, then the virtual object 26 is overlaid with a stack of planes or slices, and the user sketches a template on the surface of one of the planes. However, the virtual object 26 is not required to assume a cube or block shape and may assume any 3-D shape that the user finds useful when starting to design a model from the virtual object 26. In one embodiment, the object properties permit only manipulation or movement of the virtual object 26 without any sculpting or other modification thereof. The modification mode is not limited to what is described here, but, in other embodiments, is based on other modes of interaction or modification that a user finds useful. For example, other modes may include smoothing the surface of the virtual object 26, shifting material, or mirroring all or parts of the object 26.

In one embodiment, the virtual object 26 is created by the modification process 20 under the directions of the user, and then the graphics process 22 displays a corresponding representation of the virtual object 26 to the user.

If the user selects a 3-D sketch mode, then the virtual object 26 is overlaid with a stack of planes or slices, and the user sketches a template on the surface of one of the planes.

Generating The Virtual Tool

In the next step, a virtual tool 28 is generated (step 42). In one embodiment, the user selects a shape and characteristics for the virtual tool 28, which the haptic rendering process 16 generates in the virtual environment. The graphic process 22 then displays a corresponding version of the virtual tool 28 to the user on a graphics display 14. For example, the virtual tool 28 can assume different shapes and interaction or modification characteristics. The tool 28 can assume any 3-D shape, such as a sphere 34 or a cube, or a substantially 2-D shape, such as a spatula or knife. In general, modes include a material removal, material addition, or other material modification mode such as smoothing. In one embodiment, removal modes include Boolean removal, sand paper removal, and removal using the concept of a function which falls off gradually. Additional modes include Boolean addition, Boolean pull, and pull using a fall-off function. An additional form of interaction and modification includes a sketch mode for sketching a template on the surface of a virtual object 26. Used here, Boolean refers to adding or subtracting two geometries to arrive at a third geometry.

Sensing User Location

In the next step, sensors determine the location of a user in real space (step 44). In one embodiment, the sensors are any type of sensors useful in determining the location of a user, such as the location of a hand in real space. Such sensors could be based on measurements of location based on mechanical, electrical, magnetic, optical, or other sensing devices. In one embodiment, the haptic interface device 10 senses the location of the user in real space. For example, the user physically manipulates the haptic interface device 10, such as a handgrip or stylus, in real space and the location of this device is determined in real space. In one embodiment, one such haptic interface device 10 is the PHANToM® device from SensAble Technologies, Inc., Cambridge, Mass. Generally, the PHANToM® device can sense six degrees of freedom—x, y, z, pitch, roll, yaw, while providing for force feedback in three degrees of freedom—x, y, z. One embodiment of this invention includes a haptic interface that can provide more than three degrees of force feedback.

As used herein, "real world space" is defined as the real world environment. The haptic rendering process 16 utilizes the information obtained by the sensors to determine the haptic interface location 98 in the virtual environment. As used herein, "haptic virtual environment" refers to the region in the computer generated virtual environment with which the user can interact through the sense of touch. The location of the haptic interface describes the location of the user in the haptic virtual environment.

Correlating User Location And Virtual Tool Position

In one embodiment, the haptic rendering process 16 then translates the location of the haptic interface device 10 in real space into a corresponding location in the haptic virtual environment, which is the haptic interface location 98 (step 46). Then the haptic rendering process 16 uses a method to limit the movement of the tool 28 based on the virtual surface 25, the position of the tool 28, and the haptic interface location 98 (step 54). The objective of the method is to move the tool 28 as close as possible to the haptic interface location 98, without crossing the virtual surface 25 and using a path for the tool 28 that yields progressively better locations for the tool 28, which typically means locations closer to the haptic interface location 98. This method is discussed in detail later.

Typically, the haptic rendering process 16 analyzes the interaction and calculates results based on the potential position of the virtual tool 28 relative to the virtual object 26 (step 56). Then the results are applied to the virtual tool 28 and/or the user (step 58).

Calculation Of Force

For example, if the movement of the virtual tool 28 is constrained such that the virtual tool origin 27 is not coincident with the haptic interface, the haptic rendering process 16 may calculate an interaction force to be applied to the haptic interface device 10, so that the user feels a resistance to trying to move the virtual tool 28 into the virtual object 26. In this case, the results are a feedback force applied to the user via the haptic interface device 10 and corresponding constraints or limits on the movement of the virtual tool 28 (step 56). The force feedback provides the user important non-visual information about the shape of the virtual object, whether the interaction mode is object modification or simply evaluating the shape of the object.

Interaction And Modification

In one embodiment, if the user is using the virtual tool 28 in an interaction mode, such as sandpaper, then the modification process 20 calculates changes in the virtual object 26, such as material being removed, which in turn changes the graphical representation of the virtual object 26. The results, in this case, are a modification to the virtual object 26 (step 58). Interaction modes need not result in modification of the virtual surface. For example, in another case, the user may be trying to use the virtual tool 28 to evaluate the shape of the virtual object 26 without trying to modify the object 26. In this case, the results are limits on the movement of the virtual tool 28 without any penetration or modification of the virtual object 26. Another example is if the user presses the virtual tool 28 into a virtual object 26 in an erase or removal mode, but does not press with enough force, then the virtual tool 28 remains at the surface or may skirt along the surface of the virtual object 26 without removing any material. The results, in this case, are constraints on the movement of the virtual tool 28 (step 58). The calculation and application of results (steps 56 and 58) are not confined to what is described here but involve other effects depending on many factors, such as the shape of the virtual tool 28, the characteristics of the tool 28, the characteristics of the virtual object 26, the nature of the movement of the virtual tool 28 relative to the virtual object 26, and other factors. Another factor may be a construction constraint that aids in the construction of a virtual object 26. In one embodiment, the constraint can be a line, an arbitrary curve, or a surface that constrains the movement of the virtual tool 28.

Ongoing Interaction Between User And System

Finally, after the results have been applied (step 58), the user engages in additional movement of the haptic interface device 10, in which case a new location must be sensed (step 44) and steps 46-58 are repeated. Alternatively, the user changes the nature of the virtual object 26 and/or the interaction mode. The user may also change the shape or characteristics of the virtual tool 28 (not shown in FIG. 3). These changes by the user in turn would affect the calculations, constraints, and results determined by steps 46, 54, 56, and 58.

Virtual Object and Tool Interaction

Haptic Rendering Process

Figure 4:
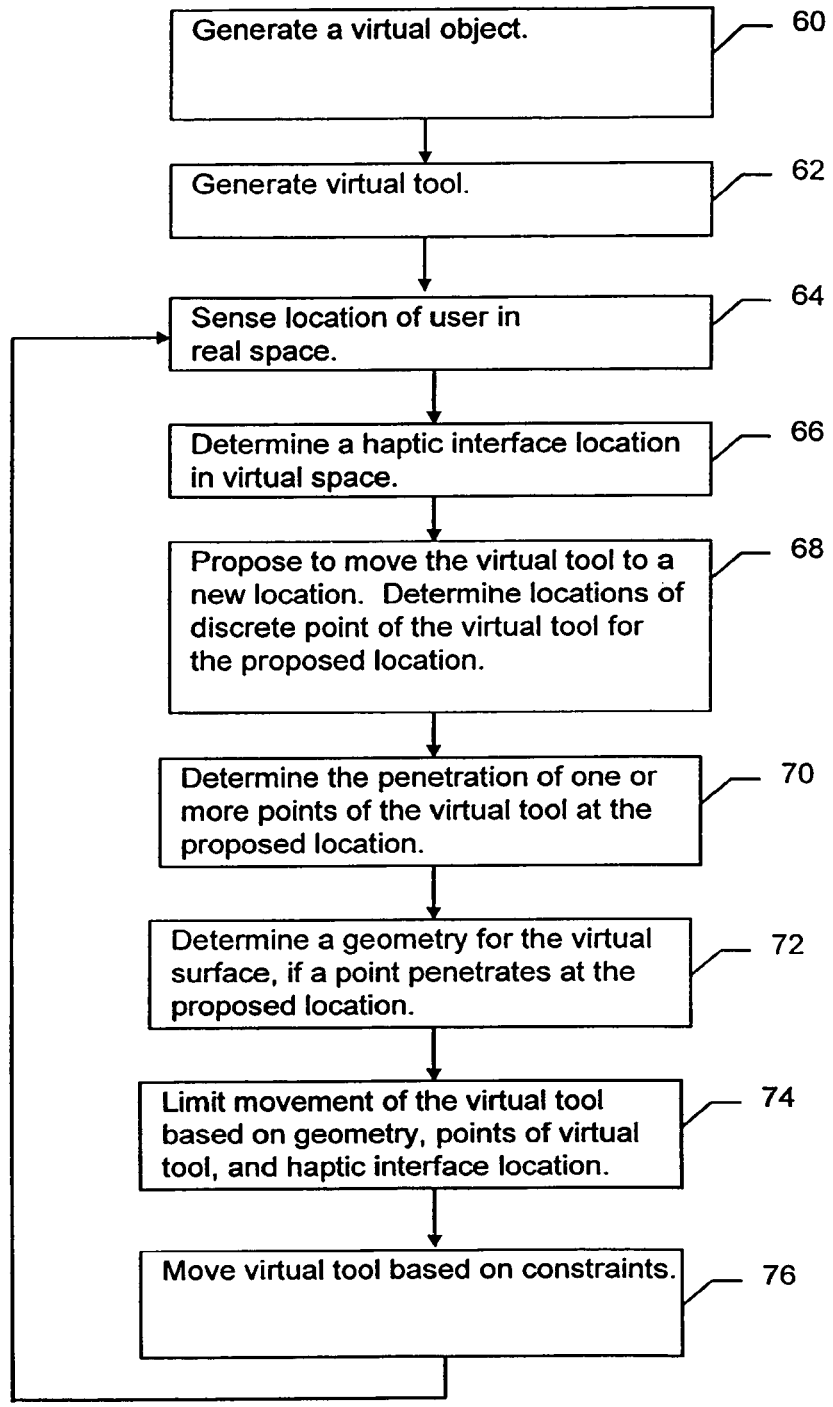
FIG. 4 is a high-level flowchart of the haptic rendering process between a virtual tool and a virtual object for another embodiment of the invention.

FIG. 4 is a flowchart of the haptic rendering process 16 for the interaction between a virtual object 26 and a virtual tool 28 for one embodiment of the invention. In the first steps, the haptic rendering process 16 generates a virtual object 26 (step 60). The haptic rendering process 16 determines or generates a virtual tool 28 represented using a plurality of discrete points for use by the user (step 62). Sensors sense the location of the user in space (step 64) in a manner similar to that described for FIG. 3 above. The haptic rendering process 16 then determines a haptic interface location 98 (see FIG. 5A) for the haptic interface (step 66) in the haptic virtual environment corresponding to the location of the haptic interface device 10, which the user is manipulating in real space. The haptic rendering process 16 determines potential locations for the points of the virtual tool 28 in the haptic virtual environment in comparison to the haptic interface location 98 and the virtual surface of the virtual object 26 (step 68).

The haptic rendering process 16 determines the amount of penetration into the virtual object 26 for all the points of the virtual tool 28 if it were to be moved to the potential location (step 70). The haptic rendering process 16 may determine that there would be no penetration, that only one point of the virtual tool 28 would penetrate the virtual object 26, or that several points of the virtual tool 28 would penetrate the virtual object 26.

If at least one of the points of the virtual tool 28 has penetrated the virtual object 26, then the haptic rendering process 16 determines a geometry for the virtual surface at the area of penetration of the virtual tool 28 (step 72). For example, the haptic rendering process 16 determines if the virtual object 26 has an edge, trough, valley, vertex, or hole in the vicinity of the virtual tool 28, to be discussed in more detail later with respect to FIGS. 7A-7C. This determination is then used in the next step (step 74), which determines limits or constraints for the movement of the virtual tool 28 based on the geometry of the virtual object 26 (as determined in step 72), the locations of the points of the virtual tool 28 that would have penetrated the virtual object 26 (as determined in steps 68 and 70), and the haptic interface location 98 (as determined in step 66). The haptic rendering process 16 then uses the previously determined constraints to constrain or limit the movement of the virtual tool 28 (step 76). For example, if the virtual tool 28 has encountered an edge or trough on the surface of the virtual object 26, then the virtual tool 28 may be constrained to slide along the edge or trough (see FIG. 5E) until the user makes a definitive movement, such as moving away from the virtual object 26. In one embodiment, the movement of the virtual tool 28 is limited without the user feeling any force feedback. In another embodiment, the movement of the tool 28 is limited and the user feels an interactive force feedback corresponding to the limits on movement of the tool 28.

Relationship of Virtual Tool Location to Haptic Interface Location

Figure 5A:
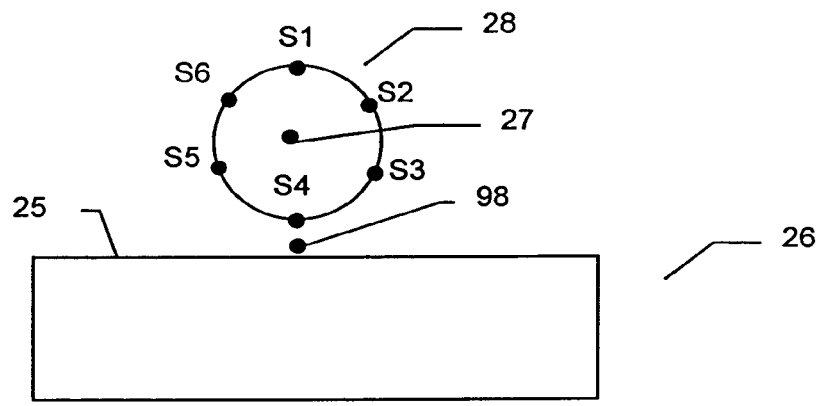
FIG. 5A illustrates a pictorial view of a virtual tool approaching the virtual surface of a virtual object.

FIG. 5A illustrates a virtual tool 28 approaching the virtual surface 25 of a virtual object 26. The surface of the virtual tool 28 is defined by a series of points, S1, S2, S3, S4, S5, S6 in a simplified view of a virtual tool 28 in one embodiment.

Figure 6:
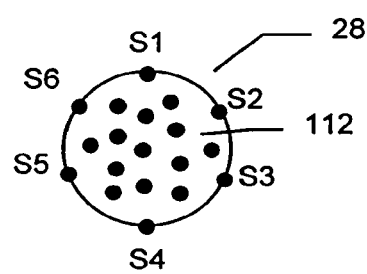
FIG. 6 illustrates a virtual tool with points located throughout the interior of the tool.

In another embodiment of the invention, the points that define the volume of the virtual tool 28 extend throughout the space of the virtual tool 28 (shown as additional interior points 112 within the tool 28 in FIG. 6). In one embodiment, the additional points 112 are spaced evenly throughout the interior 3-D volume of the tool 28. In another embodiment, there is no requirement that the additional points 112 be spaced evenly within the tool 28.

In the example shown in FIG. 5A, the user is moving the haptic interface device 10 so that the virtual tool 28 is moving toward the virtual surface 25 of the virtual object 26. The haptic rendering process 16 attempts to move the origin 27 of the virtual tool 28 to match the haptic interface location 98. In the embodiment shown in FIG. 5A, the location of the virtual tool origin 27 lags behind the haptic interface location 98 as the user moves the virtual tool 28 through the virtual space.

Haptic Rendering and Graphics Rendering

It should be understood that the haptic rendering process 16 is operating at a high rate of speed, such as updating the location of the haptic interface location 98 and virtual tool 28 many times per second, as the user attempts to move the virtual tool 28 through the virtual environment. In one embodiment, the haptic rendering process 16 is updating the locations at about 1000 times per second. In one embodiment, some calculations of the haptic rendering process, such as force reaction calculations, are occurring at about 1000 times per second, while less time critical calculations of the haptic rendering process, such as geometry calculations, are occurring at slower rates, such as 100 times per second. The graphics process 22 updates the image seen by the user on the graphics display 14, but typically at a lower refresh rate than the haptic rendering process 16. In one embodiment, the graphics process 22 updates the graphics display 14 at a rate of about 60 times per second.

Example of Tool Points Penetrating Virtual Object

Figure 5B:
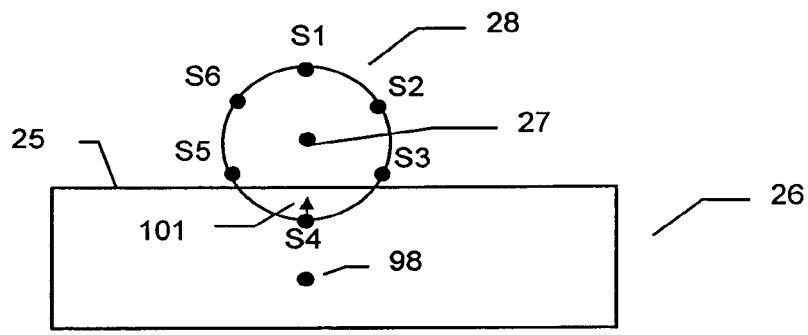
FIG. 5B illustrates a pictorial view of a proposed location for a virtual tool with one point of the virtual tool penetrating the virtual surface of the virtual object, for the embodiment shown in FIG. 5A.

FIG. 5B illustrates one point S4 of a virtual tool 28 encountering the virtual surface 25 of the virtual object 26, for the embodiment shown in FIG. 5A. The haptic rendering process 16 attempts to move the virtual tool origin 27 to match the location of the haptic interface 98, but determines that a point, S4, of the virtual tool 28 would cross the virtual surface 25. The haptic rendering process 16 then determines the approximate minimum distance vector 101 in a direction toward the virtual surface for a point S4. This vector 101, later referred to as the surface direction vector 101, also has the property that it is the approximate normal vector to the virtual surface 25 where it crosses the surface 25. As described in more detail later, the haptic rendering process 16 uses this vector 101 to calculate movement constraints for the virtual tool 28, as the virtual tool origin 27 is progressively moved toward the haptic interface location 98. In general, the haptic rendering process 16 attempts to keep the points of the tool 28 outside of the virtual surface 25 of the virtual object 26; that is, the object 26 is treated as a solid.

Example of More than One Point Encountering the Virtual Object

Figure 5C:
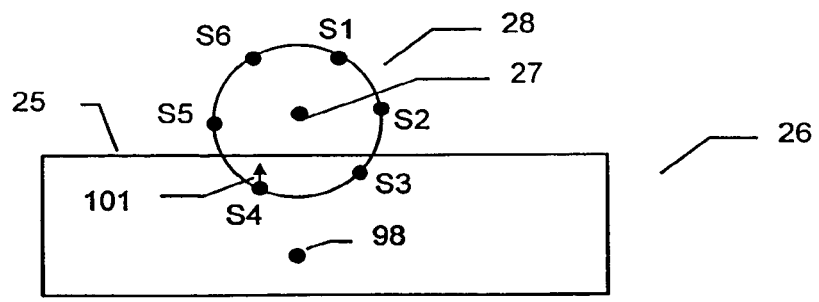
FIG. 5C illustrates a pictorial view of a proposed location for the virtual tool with two points of the virtual tool penetrating the virtual surface of the virtual object, for the embodiment shown in FIG. 5A.

FIG. 5C illustrates two points, S3 and S4, of the virtual tool 28 encountering the virtual surface 25 of a virtual object 26, for the embodiment shown in FIG. 5A. In this case, the virtual tool 28 encounters the virtual surface 25 at a different orientation than the one shown in FIG. 5B. For example, the user has rotated the virtual tool 28 slightly or is moving the virtual tool 28 at a slightly different angle, so that two points, S3 and S4, are encountering the virtual surface 25 rather than the one point, S4, as shown in FIG. 5B. The surface direction vector 101 shown in FIG. 5B is based on point S4. In FIG. 5C, the surface direction vector 101 is based on point S4 as it has penetrated the virtual surface 25 more than point S3. In the embodiment shown, if multiple points penetrate the virtual surface 25, the surface direction vector 101 is calculated for the point of deepest penetration. Other embodiments may use a combination of all points which are penetrating to calculate a resulting minimum surface direction vector 101.

Local Geometry Constrains Motion

Figure 5D:
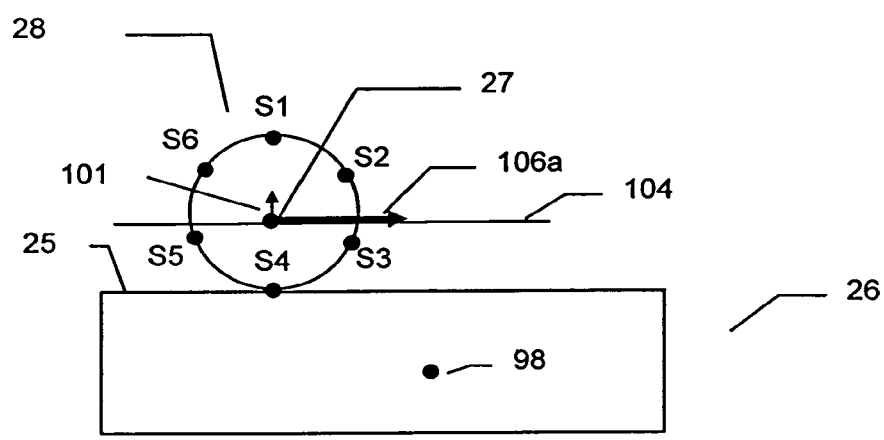
FIG. 5D illustrates a pictorial view of a virtual tool moving along the virtual surface of a virtual object, for the embodiment shown in FIG. 5A.

FIG. 5D illustrates a virtual tool 28 skirting along the virtual surface 25 of a virtual object 26, for the embodiment shown in FIG. 5A. A plane of tangency or constraint plane 104 is formed that is orthogonal to the surface direction vector 101 that was previously calculated. In FIG. 5D, the plane of tangency 104 is shown aligned with the origin 27 of the virtual tool 28. In other embodiments, the plane of tangency 104 may be aligned differently, such as at or near the virtual surface 25 of the virtual object 26, as long as the plane of tangency 104 constrains the movement of the virtual tool 28 substantially parallel to the virtual surface 25. In FIG. 5D, the plane of tangency extends out of the plane of the diagram. The virtual tool 28 is allowed to move along the plane of tangency 104. The movement is shown by the direction of movement or motion vector 106*a*.

Figure 5E:
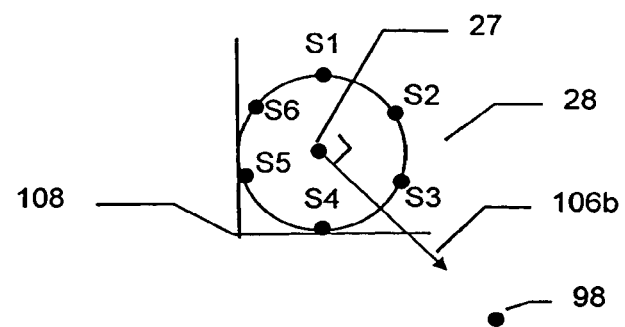
FIG. 5E illustrates a two dimensional pictorial view of a virtual tool moving along a concave edge in the virtual surface of a virtual object for the embodiment shown in FIG. 5A.
Figure 5F:
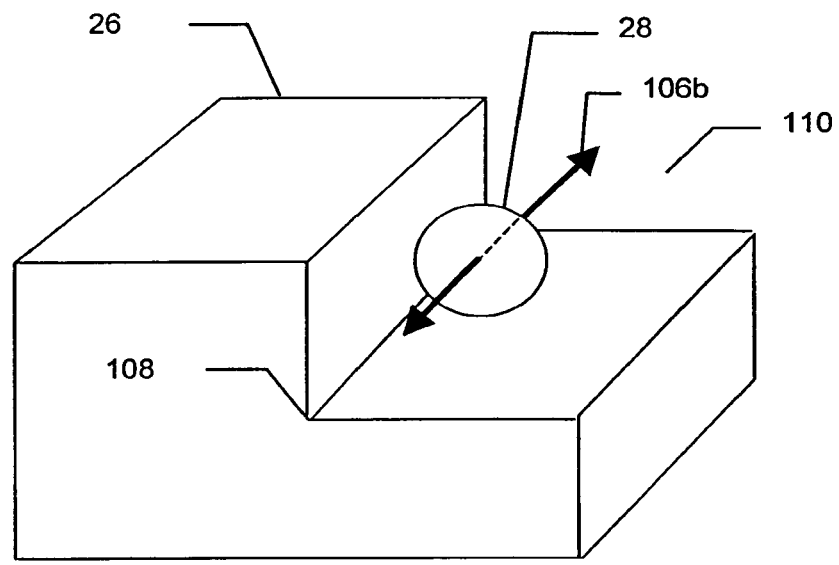
FIG. 5F illustrates a three dimensional pictorial view of a virtual object moving along a concave edge, for the embodiment shown in FIG. 5E.

FIG. 5E provides a two dimensional view of a virtual tool 28 constrained to move along an inside or concave edge 108. FIG. 5F illustrates a 1 three dimensional view of the virtual tool 28 constrained to move along an edge 108 of a trough or valley 110 for the embodiment of the invention shown in FIG. 5E. The virtual tool 28 is constrained to move in the direction of a vector 106*b* that constrains the tool 28 to move in a direction approximately parallel to the concave edge 108 toward a haptic interface location 98. FIG. 5F provides another pictorial view of a the tool 28 moving along a vector 106*b* approximately parallel to the concave edge 108 of the virtual object 26.

Modification of the Virtual Object

If the virtual tool 28 is in a removal mode, the modification process 20 may also determine material to be removed from the virtual object 26 in response to the shape of the virtual tool 28. In one embodiment, this removal mode is termed a carving mode. In one embodiment, the user feels a resistive force when attempting to move the virtual tool 28 into the virtual object 26 because forward motion of the virtual tool 28 into the object 26 is not allowed. Forward motion of the tool 28 is only achieved as a result of the modification process 20 changing or deforming the geometry of the virtual object 26 in a manner that simulates carving of the virtual object 26. The haptic rendering process 16 continues to treat the virtual object 26 as a solid object as material is removed or added. For example, the user feels added material as solid, since movement of the virtual tool 28 into the material is not permitted.

Case 1 of Tool in Empty Space

Figure 7A:
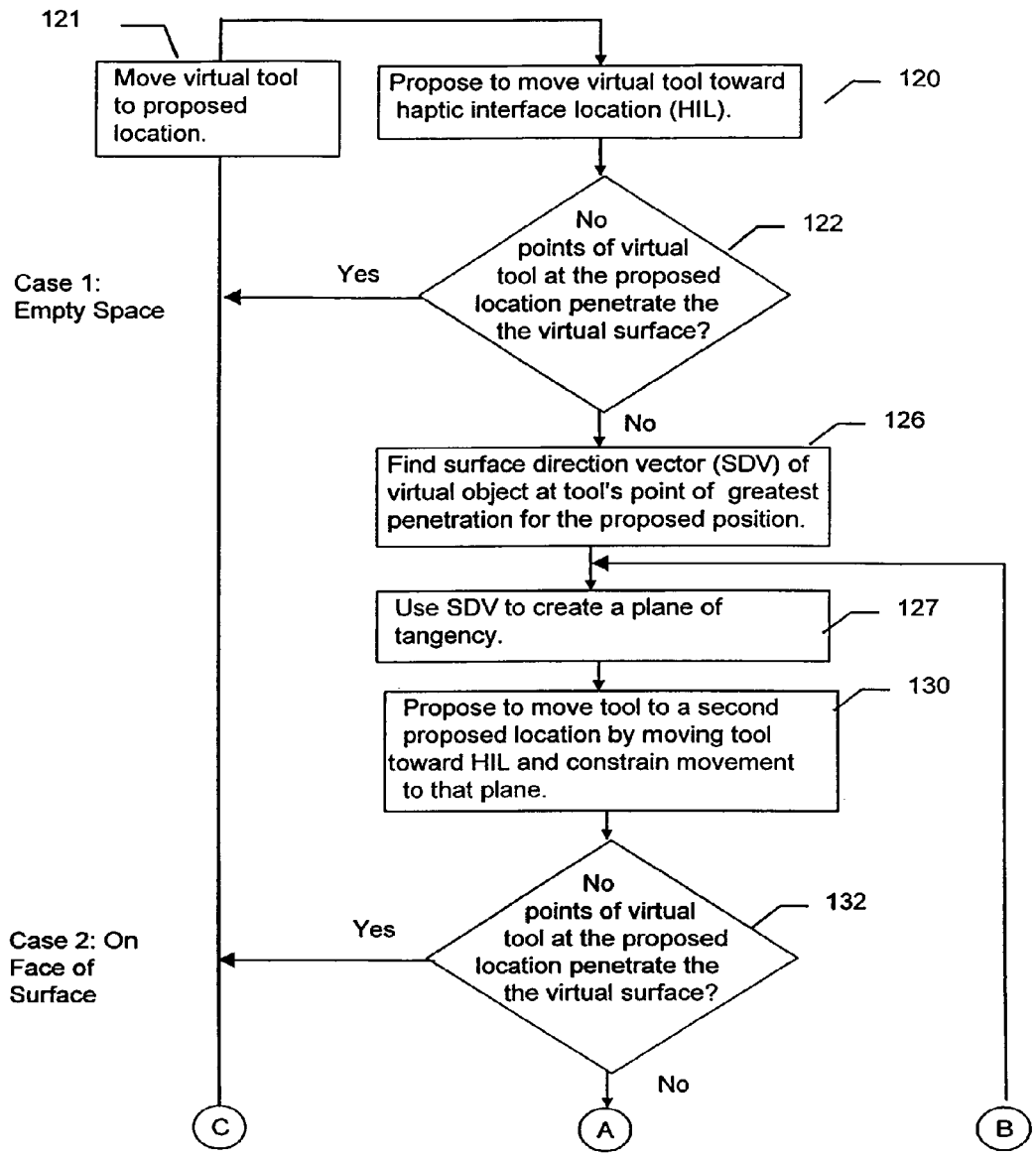
FIGS. 7A-7C depict flowcharts of the haptic rendering process between a virtual object and virtual tool for one embodiment of the invention.
Figure 7B:
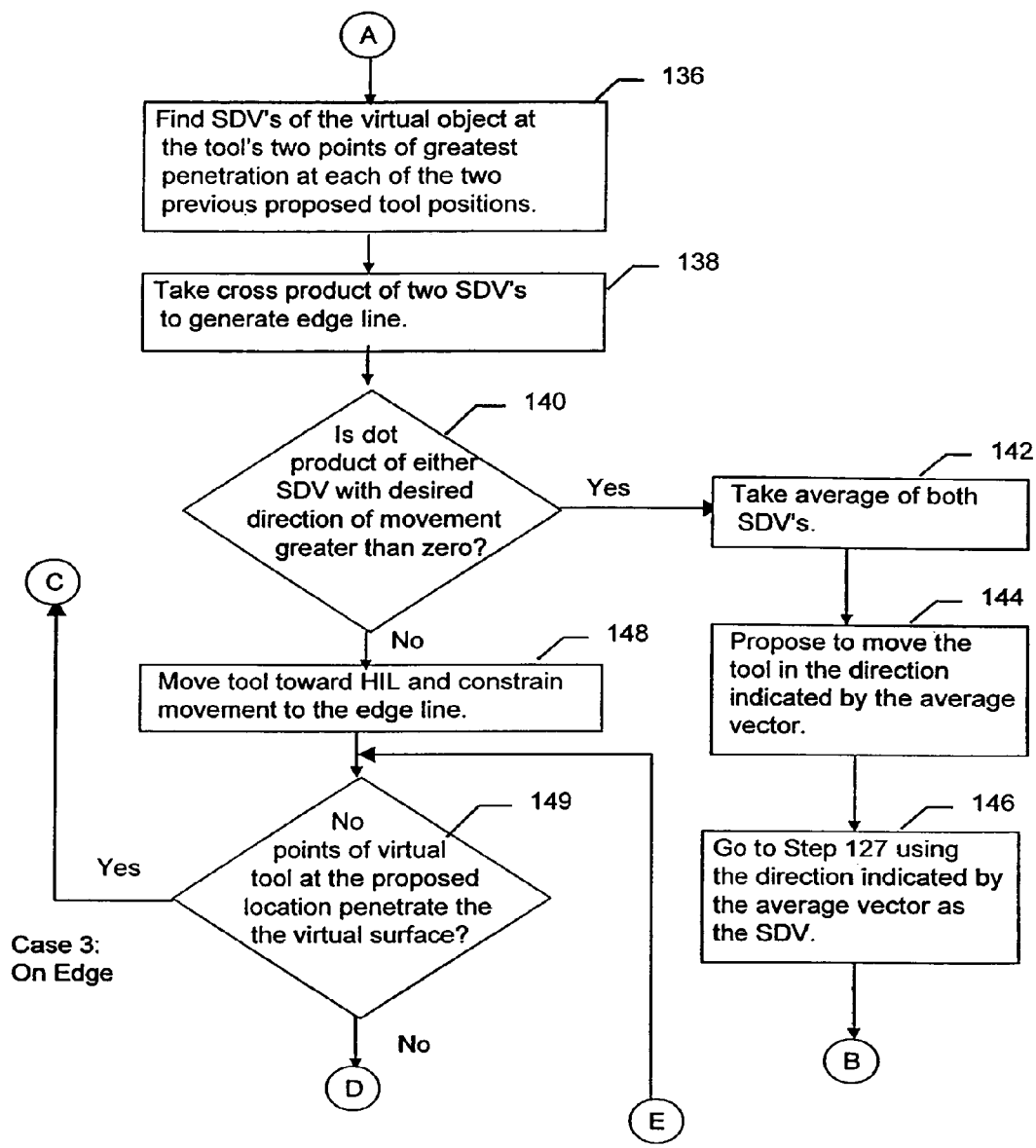
Figure 7C:
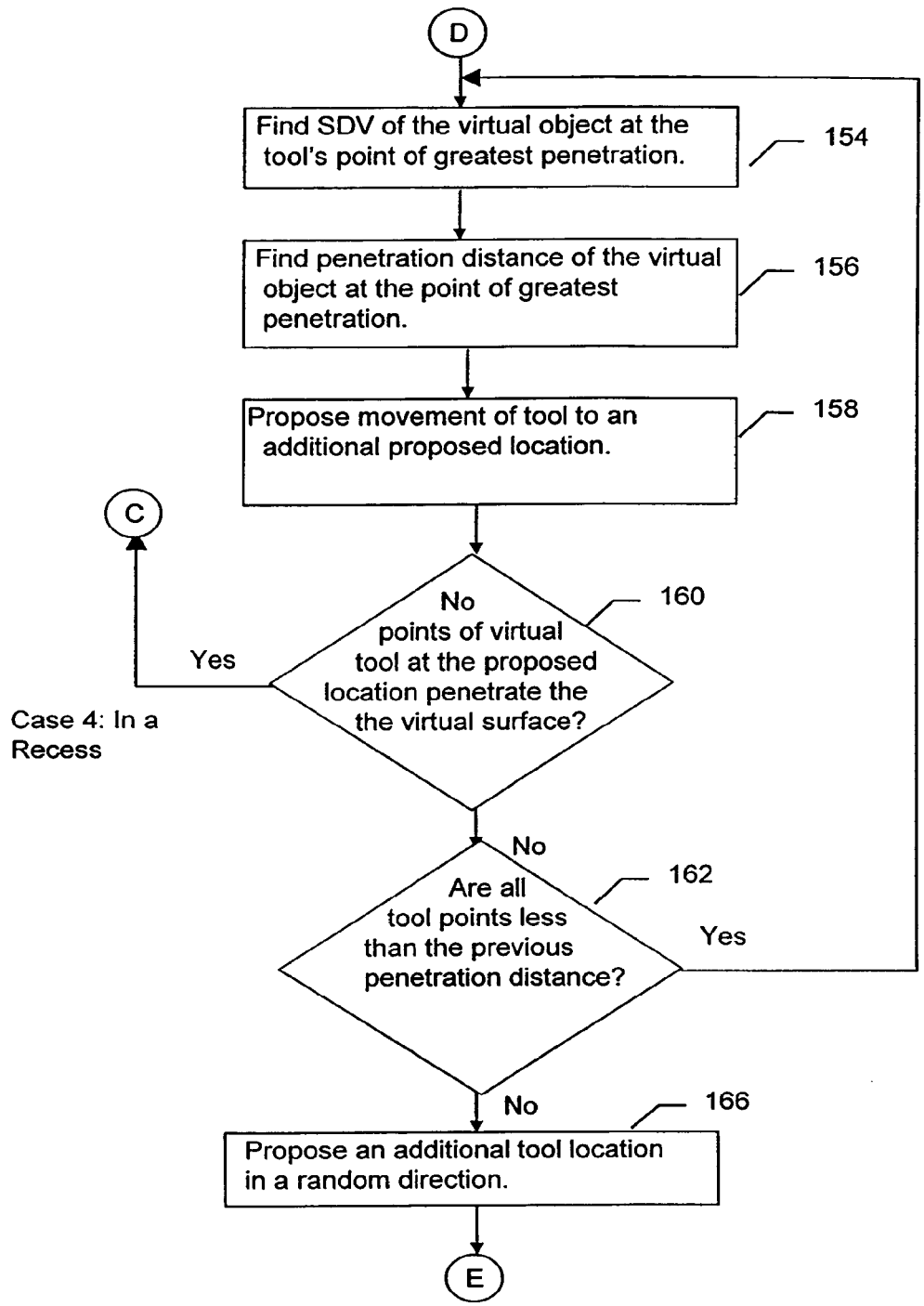

FIGS. 7A-7C depicts flowcharts of the haptic rendering process 16 which calculates interactions between the virtual object 26 and the virtual tool 28 for one embodiment of the invention. These flowcharts represent movement of the virtual tool 28 in steps relative to the virtual surface 25 of a virtual object 26. First, the haptic rendering process 16 proposes to move the virtual tool origin 27 toward the haptic interface location 98 (step 120). Then the haptic rendering process 16 determines if any of the tool 28 points would penetrate the virtual surface 25 (step 122). If none of the tool 28 points would penetrate the virtual surface 25, this represents "Case 1." The virtual tool 28 would encounter only empty space by moving to the proposed new location, so the incremental movement of the virtual tool origin 27 is allowed (step 121) and the haptic rendering process 16 returns to step 120.

Case 2 of Tool Penetrating the Virtual Surface

If at the proposed tool position, some points of the virtual tool 28 would penetrate the virtual surface 25 (step 122), then the haptic rendering process 16 finds the direction of shortest distance to the virtual surface as indicated by surface direction vector 101 for the point of the greatest potential penetration into the virtual object 26 by the virtual tool 28 (step 126, see also FIGS. 5B and 5C). The haptic rendering process 16 then calculates a constraint plane or plane of tangency 104 (see FIG. 5D) based on the surface direction vector 101 (step 127 of FIG. 7A). The plane of tangency 104 is a plane orthogonal to the surface direction vector 101. The haptic rendering process 16 then attempts to move the virtual tool origin 27 toward the haptic interface location 98 but constrains the movement to the plane of tangency 104 (step 130) to arrive at a second proposed virtual tool 28 location.

If none of the tool 28 points would penetrate the virtual surface 25 at this second proposed virtual tool position (step 132), then the haptic rendering process 16 moves the virtual tool origin 27 to the second proposed location (step 121) and returns to step 120. This situation represents "Case 2" and the haptic rendering process 16 has assumed that the virtual tool 28 is intended to be touching the surface 25 of the virtual object 26.

Case 3 of Tool Encountering Edge Condition

Figure 8A:
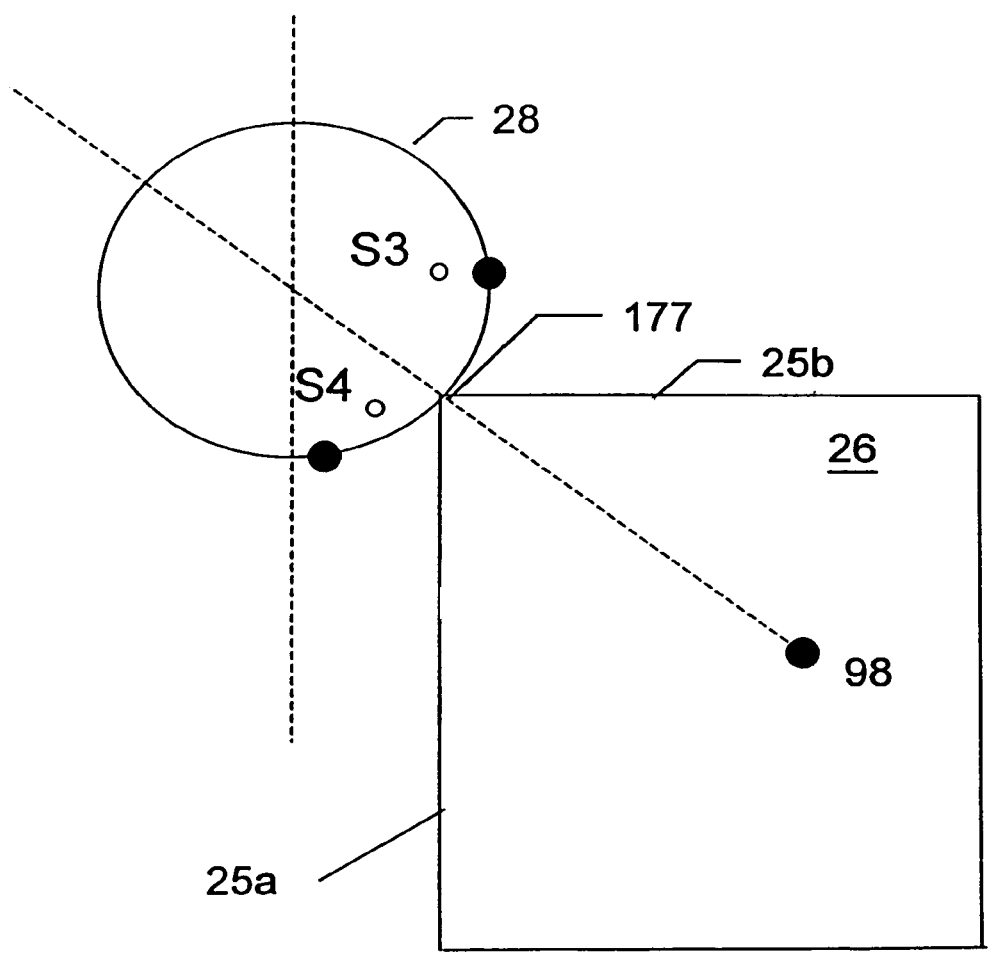
FIG. 8A illustrates a pictorial view of a virtual tool encountering the convex edge of a virtual object for one embodiment of the invention.
Figure 8B:
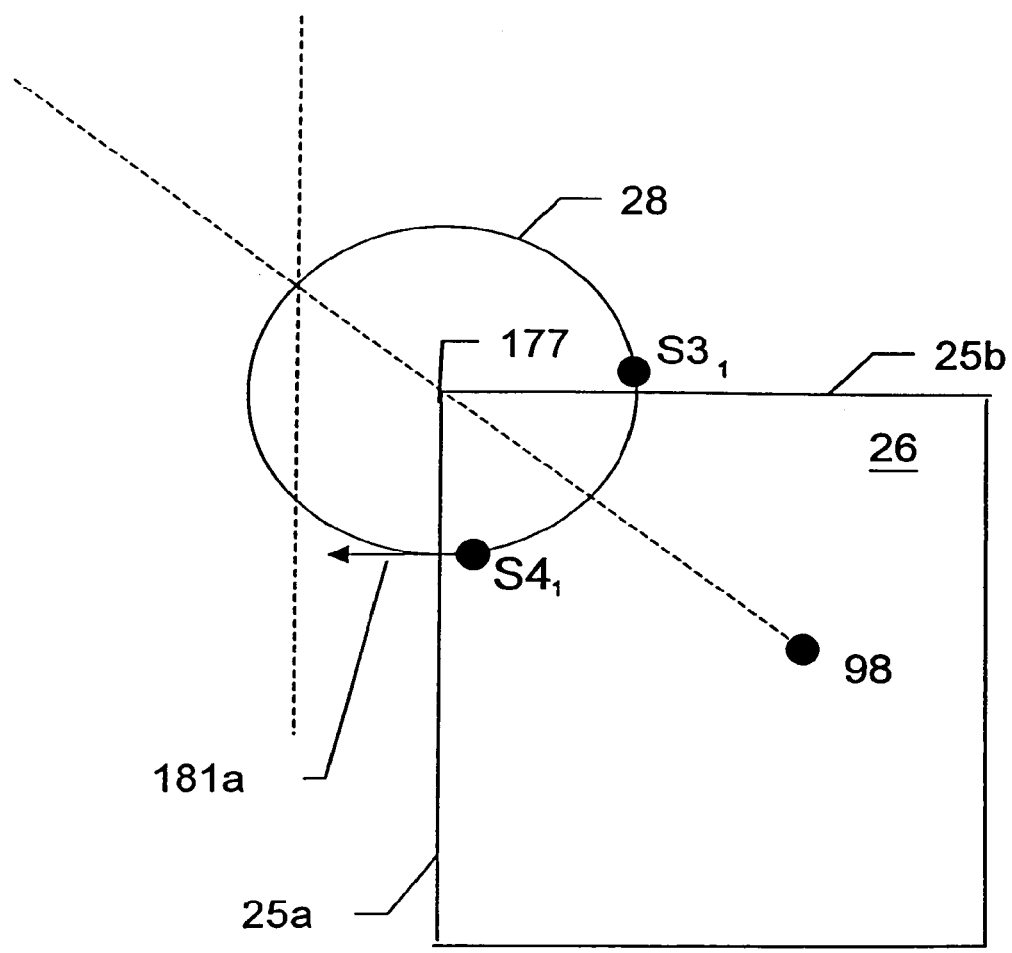
FIG. 8B illustrates a pictorial view of a surface direction vector calculated for one proposed tool position for the embodiment of the invention shown in FIG. 8A.
Figure 8C:
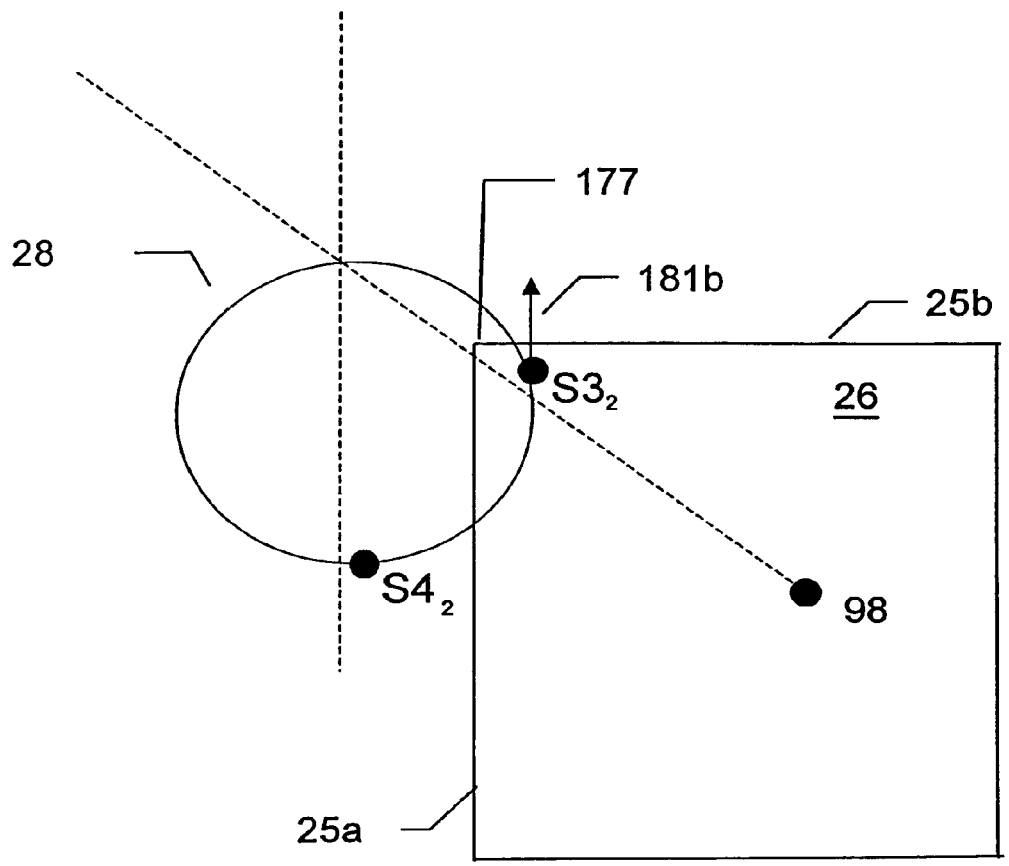
FIG. 8C illustrates a pictorial view of a surface direction vector calculated for a second proposed tool position for the embodiment shown in FIG. 8A.

If at the second proposed tool position, some points of the virtual tool 28 would penetrate the virtual surface 25 (step 132), then the haptic rendering process 16 finds the two surface direction vectors 181*a* and 181*b* of the virtual object 26 at the tool's 28 two points of greatest penetration at each of the previous two proposed tool positions (step 136). FIG. 8A illustrates a virtual tool 28 encountering the outside or convex edge 177 of a virtual object 26 in one embodiment of the invention. The virtual object 26 extends out of the plane of the diagram, and has an edge 177 that likewise extends out of the plane of the diagram. In FIG. 8B the proposed tool position penetrates the virtual object 26 at point $S4_1$ and the haptic rendering process 16 calculates a surface direction vector 181*a* relative to virtual surface 25*a*. In FIG. 8C, the haptic rendering process 16 proposes a second proposed tool location based on the surface direction vector 181*a* relative to virtual surface 25*a*, as shown in FIG. 8C. In this proposed tool location, point $S3_2$ has penetrated the virtual object 26, and the haptic rendering process 16 calculates the surface direction vector 181*b* relative to virtual surface 25*b*.

Figure 8D:
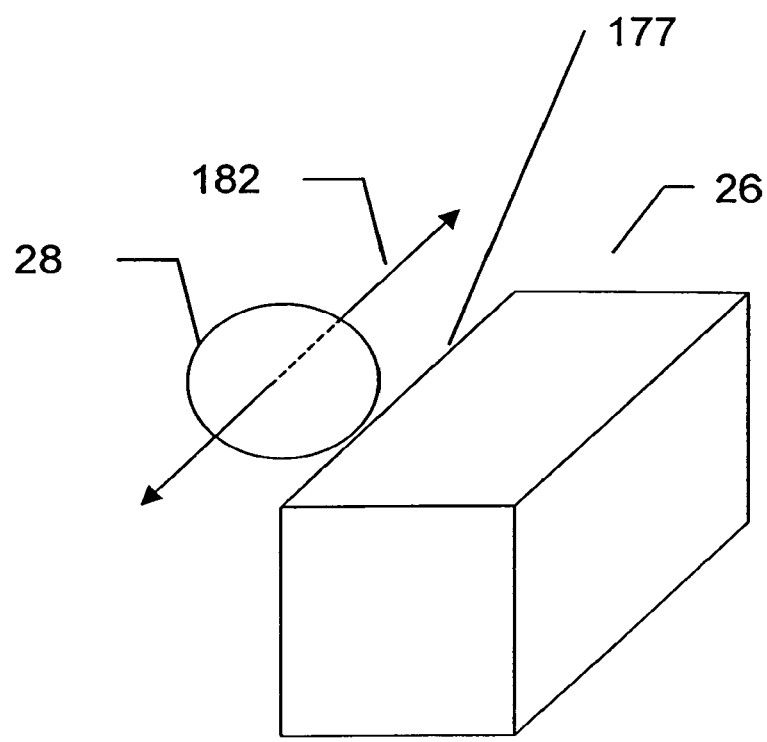
FIG. 8D illustrates a pictorial view of virtual tool constrained to the edge of a virtual object for the embodiment of the invention shown in FIG. 8A.

The haptic rendering process 16 uses the vectors 181*a* and 181*b* and the desired direction of movement to determine constraints to the tool motion, as follows. The haptic rendering process 16 calculates the cross product of the vectors 181*a*, 181*b* found in step 136 to generate an edge line and a direction of movement 182 (step 138 in FIG. 7B), as shown in FIG. 8D. The haptic rendering process 16 then determines the dot product of each minimum distance vector 181*a*, 181*b* with the direction of movement 182, as indicated by the user (step 140). The haptic rendering process 16 then determines if either dot product is greater than zero (step 140). If one of the dot products is greater than zero, then the haptic rendering process 16 takes the average of both surface direction vectors 181*a*, 181*b* (step 142). The haptic rendering process 16 then proposes to move the tool 28 in the direction indicated by the average vector (step 144) and then proceeds to Case 2 (step 146). The haptic rendering process 16 then proceeds to step 127 in FIG. 7A to determine a plane of tangency 104 using the average normal.

If neither dot product is greater than zero (step 140), then the haptic rendering process 16 constrains movement to the previously determined edge line (step 148). See FIG. 8D, which shows the virtual tool 28 at the edge 177 of the virtual object 26. In one embodiment, the virtual tool 28 is constrained based on one point of the tool 28, such as the origin 27 of the tool 28. The haptic rendering process 16 then attempts to move the virtual tool origin 27 toward the haptic interface location 98 but constrains the movement to the direction of the edge 108 or 177 (step 148). If none of the tool points would penetrate the virtual surface 25 at this third proposed virtual tool position (checked in step 149), then the haptic rendering process 16 moves the virtual tool origin 27 to this proposed location (step 121) and returns to step 120.

This situation represents "Case 3," and the haptic rendering process 16 assumes that the virtual tool 28 is on an edge 108 or 177 of the virtual object 26. Generally, in Case 3, the haptic rendering process 16 attempts to properly identify an edge 108 or 177 of the virtual object 26 and allow movement of the virtual tool 28 along the edge 108 or 177.

In one embodiment the haptic rendering process 16 identifies an edge 108 or boundary between two portions of the virtual surface 25 of a virtual object 26. The two portions are not required to be planar. For example, the two portions may have curved surfaces. The two portions are not required to be in contact but may represent portions of virtual surfaces 25 of two separate virtual objects 26 located in contact with or near each other.

Case 4 of Tool Encountering A Hole

If one or more points of the virtual tool penetrate the virtual surface 25 (step 149), the haptic rendering process 16 finds the surface direction vector 101 at the point of greatest potential penetration of the virtual object 26 by the virtual tool 28 (step 154). The haptic rendering process 16 then determines the penetration value at the point of greatest potential penetration and saves this value for subsequent use (step 156). The haptic rendering process 16 then attempts to move the virtual tool 28 in the direction of the surface direction vector 101 just determined (step 158). The haptic rendering process 16 then checks to see if no points of the virtual tool 28 at the proposed location penetrate the virtual surface 25 (step 160). If no points penetrate the virtual surface 25 86, then the haptic rendering process 16 moves the tool 28 to the proposed location (step 121) and proceeds to step 120. This situation represents "Case 4," which occurs if the virtual tool 28 is in a corner, recess, or "hole" in the virtual object 26.

If one or more points of the virtual tool 28 penetrate the virtual surface 25, then the haptic rendering process 16 proceeds to step 162 and determines if the penetration values at all the tool points would be less than the previously determined penetration value at the deepest potential penetration, as calculated in step 156. If all the tool points would be less than the previously determined penetration value, then the haptic rendering process 16 returns to step 154.

If all the tool points would not be less than the previously determined penetration value, then the haptic rendering process 16 proposes moving the virtual tool 28 in a random direction (step 166) from its previous potential position and goes to step 149.

Description of a Voxel-Based Approach

Figure 9:
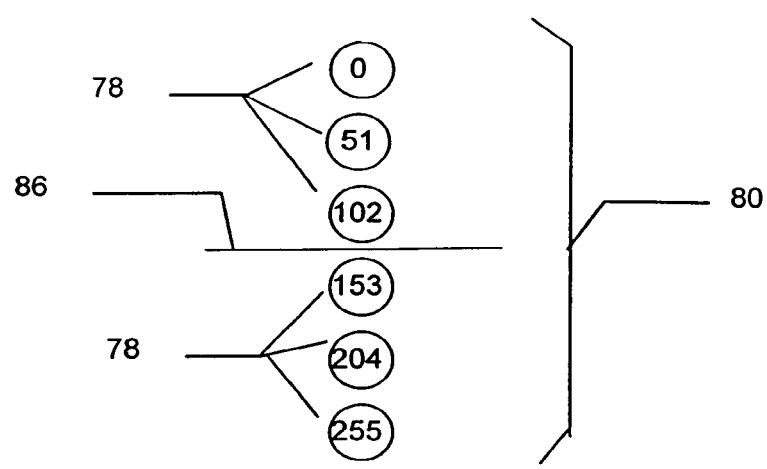
FIG. 9 depicts a set of voxels with different density values and an isosurface.
Figure 10:
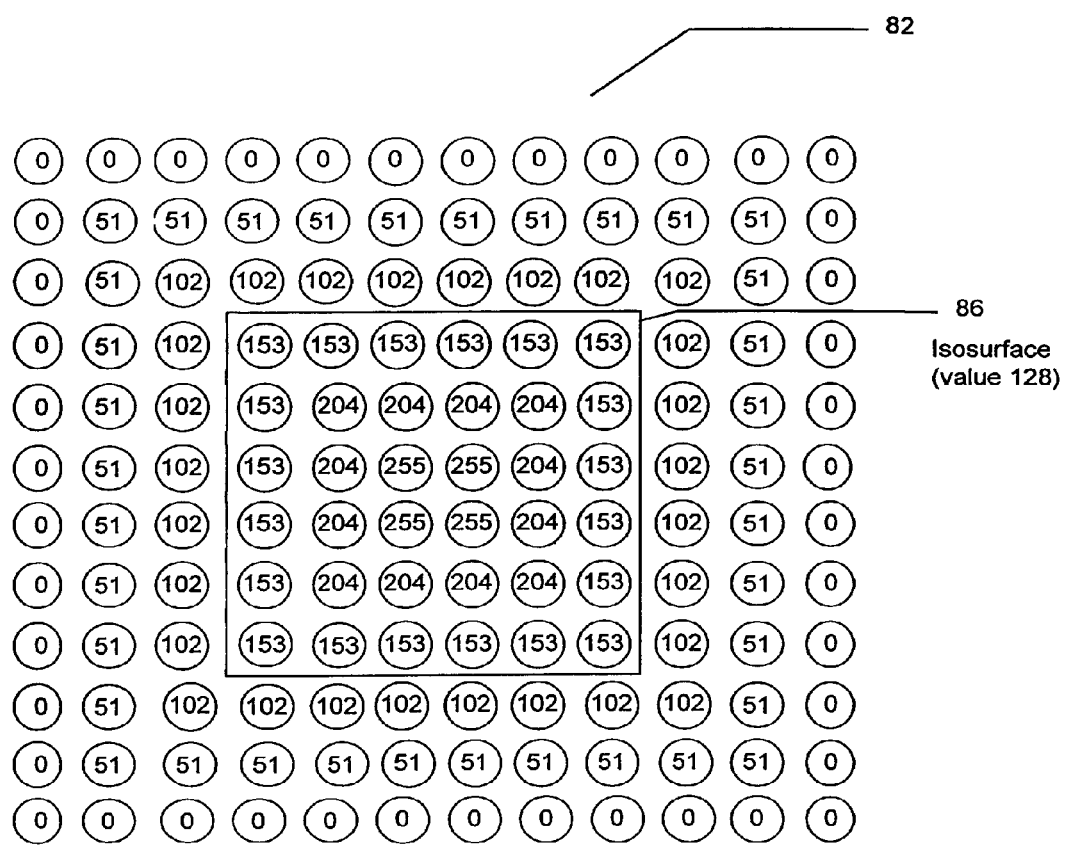
FIG. 10 illustrates a two dimensional representation of a rectangular solid with voxels and an isosurface, for the embodiment shown in FIG. 9.

In one embodiment of the invention, the virtual object 26 is implemented as a volume using concepts of voxels 78, density, and an isosurface 86. FIG. 9 shows several voxels 78 having different density values 0, 51, 102, 153, 204, and 255, a gradient 80 established by these voxel values, and an isosurface 86. As used herein, density is not a physical property of the virtual object 26, but rather an abstract construct used for determining the shape of the virtual object 26. FIG. 10 illustrates a pictorial view in two dimensions of the voxels 78 of a three dimensional rectangular solid 82 with an isosurface 86 at value 128 indicating the solid surface of the rectangular solid 82. As shown in FIG. 10, the volume of the virtual object 26 is modeled using a 3-D array of evenly spaced elements or voxels 78 located at discrete points in the virtual environment 26. In another embodiment, the elements are not required to be arranged with regular spacing. Each voxel 78 stores a density value. Density values for points that lie between the discrete voxel points can also be evaluated using interpolation. The volume also stores a density threshold value. Points having a density value greater than the density threshold are considered to be inside the object. Points having a density value less than the density threshold are considered to be outside the object. As used herein, an "isosurface" 86 refers to a locus of points all having an identical density value. In one embodiment, the isosurface 86 whose density value equals the density threshold represents the virtual surface 25 of the virtual object 26. In one embodiment, as shown in FIG. 10 this density threshold is 128 and the voxel density values can range from 0 to 255. Thus a voxel representation facilitates an easy method for determining whether points on a virtual tool 28 lie inside or outside of a virtual surface 25 of a virtual object 26. All of the voxels 78 shown in FIG. 10 are associated with the rectangular solid 82, but a user moving a virtual tool 28 toward the rectangular solid 82 would not encounter a solid feeling surface until the virtual tool 28 contacts the isosurface 86. The user would not feel any resistance to moving the tool 28 when moving through the voxels 78 with density values, such 0, 51, and 102, which are less than 128.

Implementation of the Haptic Rendering Process

The haptic rendering process 16 between a virtual object 26 and virtual tool 28 is described in more detail below for one embodiment of the invention as implemented by the assignee, SensAble Technologies, Inc. of Cambridge, Mass.

The chosen volumetric representation is integrated with the GHOST® SDK (Software Developer's Kit) haptic interaction software developed by SensAble Technologies, which provides much of the necessary haptics functionality and reduces haptic virtual objects into a set of basic methods that are then handled correctly by GHOST® SDK. The GHOST® SDK uses the c++programming language. The developer can create a high-level object which needs only to handle basic interactions such as determining vectors, without being required to address low-level processes such as generating forces on the haptics device, resolving multiple collisions, and other more complex issues addressed by the GHOST software.

Volume Implementation Using Voxels

Haptic virtual objects are handled by a volume class. One embodiment of the invention is the gstVolume class. The gstVolume class follows the specifications of the generally provided gstShape GHOST class and follows the behavior of general geometric classes.

As described previously, the volume is represented using a voxel grid, the density values of which define an implicit virtual surface or isosurface 86 for the virtual object 26 as described for FIGS. 9 and 10. A valid volume for this representation is created containing an established gradient 80.

The specific voxel values defining the gradient 80 depend on the shape of virtual object 26 being presented. In one embodiment, the voxel values may vary between 0 and 255, with the value 128 representing the virtual surface. Any modifications to the volume must also preserve the gradient 80 to avoid incorrect calculation of surface direction vectors 101 or penetration distances.

The voxel value at any point gives an indication of the penetration depth and the shortest distance between that voxel 78 and the surface 86 of the volume. The ramp length is the number of voxels 78 over which density values go from their minimum (0) to their maximum (255). Voxel values increase with the penetration depth until the values reach a maximum. All voxels 78 beyond that penetration depth are also set to that maximum value. Likewise, when moving farther from the virtual surface in a direction away from the volume, voxel values decrease until they reach the minimum value. All values in that direction beyond that distance are set to the minimum value.

Figure 11:
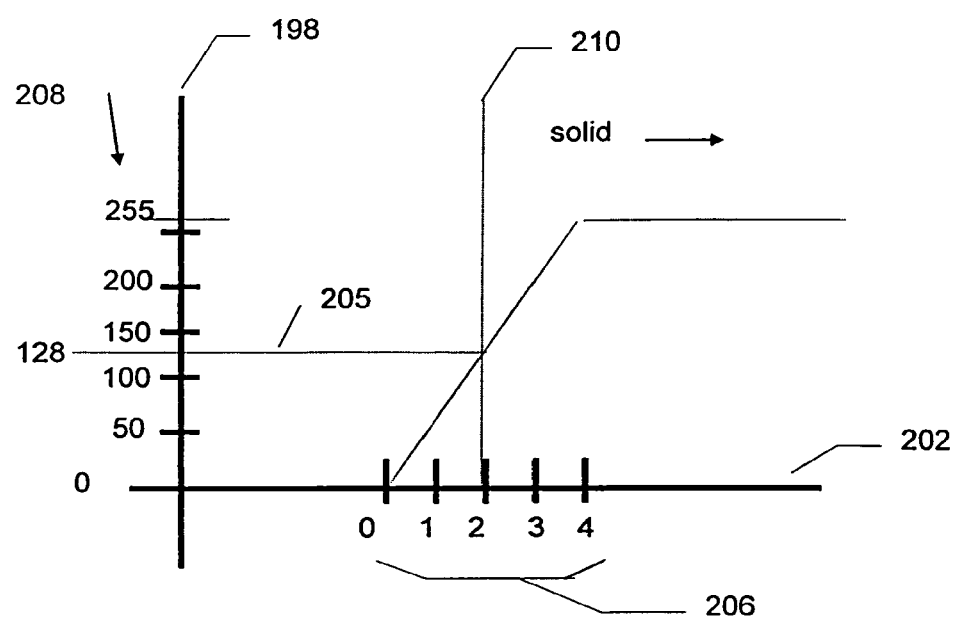
FIG. 11 illustrates a ramp length diagram comparing voxel values to penetration distances for one embodiment of the invention.

The volume class is used to determine approximate surface direction vectors 101 to the surface 86 from any internal point or point along the surface 86 of the volume using the density gradient 80 as explained below. FIG. 11 illustrates a ramp length diagram comparing voxel values to penetration distances for one embodiment of the invention. FIG. 11 depicts a vertical axis 198 for voxel values, a horizontal axis 202 for the penetration distance, an isosurface line 205 representing a density threshold value of 128, a ramp length 206, a maximum voxel value 208 with a value of 255, and a penetration line 210 at the isosurface 86 corresponding to the density threshold value 128. The penetration line 210 indicates that any penetration to the right of the line is into the solid body of the virtual object 26.

Ramp Length

The maximum penetration depth where a gradient 80 exists is defined by the ramp length 206, the density range, and the density threshold value. For example, for a ramp length 206 with a value of 4, a density range of 0 to 255 and a density threshold of 128, any penetration beyond 1.99 voxels [4/255* (255−128)] from the isosurface 86 will not lie within the portion of the volume where the voxel values exhibit a gradient. As such, the amount of penetration beyond this distance cannot be reliably calculated. Beyond that, the voxel values will all be at the maximum value. In one embodiment, the maximum value is 255.

In one embodiment, the direction of the surface direction vector 101 is calculated to be the direction of largest voxel density value gradient at that point. For any point that lies within the portion of the volume which exhibits a density gradient 80 a surface direction vector 101 can be calculated which points to the virtual surface and whose magnitude is the distance to the surface 86. In other words, in this region of space, the volume class can return a surface direction vector 101 which, when added to the current location, returns a location that is near the surface 86 of the volume. The vector calculations contain the same limitations as the penetration distance calculations; that is, the surface direction vector 101 can only be calculated reliably within the portion of the volume which exhibits a density gradient 80.

Interpolating Values For Intermediate Points

Although the volume is characterized by a discrete array of voxels 78, it must be able to return a valid value at any point along the continuous range of its space, since the object it represents is continuous. For example, a line is characterized by two discrete points, but itself is continuous and can be evaluated at any point. If a value is requested at a point where a voxel 78 is present, then that particular voxel density value is returned. For spaces between voxels 78, the value may be resolved through tri-linear interpolation, a method of converting a discrete set of points into a continuous field. In another embodiment, the interpolation can be based on other methods, such as a quadric interpolation.

In one embodiment, the evaluation is accomplished in a single step via a mathematical formula that weights the contribution of each voxel 78 by its distance to the point being evaluated.

In one embodiment, voxels 78 are spaced one millimeter (that is, one world coordinate in a coordinate system based on millimeter spacing) apart. In other embodiments, the voxels 78 are spaced other distances apart. In general, there is constant spacing between each of the voxels 78, but there need not be for some embodiments. In further embodiments, memory management techniques may be utilized. A larger number of voxels 78 can be represented, and thus either the resolution or size of the object 26 can be increased.

Calculating Vectors

As stated previously, the required surface direction vector 101 at any point is determined using the direction of maximum density gradient at that point. This maximum density gradient is determined using central differences: the density value at a set distance from the point in the direction of each Cartesian coordinate in turn is determined, and the differences between those values determines the vector direction.

Figure 12:
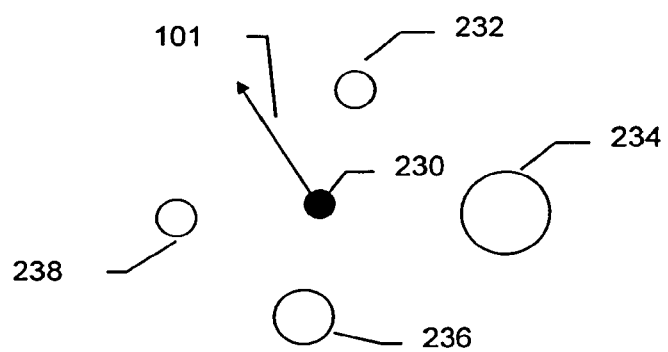
FIG. 12 illustrates a pictorial view of the surface direction vector of a point and surrounding density evaluation points for one embodiment.

FIG. 12 illustrates a method of calculating the surface direction vector 101 of a point based on the density values of surrounding evaluation points. FIG. 12 shows a point 230 for which a direction vector 101 is being calculated. The surrounding evaluation points include a first evaluation point 232 with a value of 40, a second evaluation point 234 with a value of 100, a third evaluation point 236 with a value of 80, and a fourth evaluation point 238 with a value of 40. In one embodiment, each evaluation point is a voxel 78 and the values represent density values.

The vector and density computations are used to project any point within the virtual object 26 to the virtual surface 25 of the virtual object 26. Typically, this projection is used for the purposes of calculating the potential tool surface contact point 226. If a tool point 230 is penetrating deeper than the region in which a gradient exists 206, then no projection can be made directly from that point 230. Instead, the point must be first brought closer to the surface 25 (that is, to a region where a gradient 80 exists).

Figure 13:
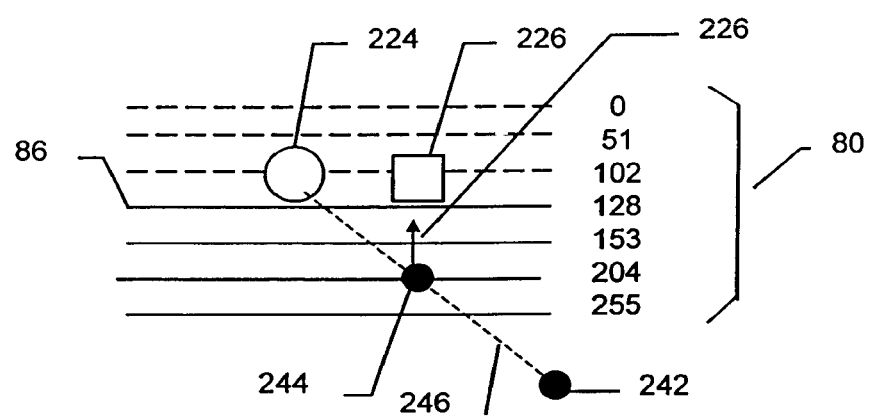
FIG. 13 illustrates a schematic view of a gradient for a virtual object, including a last SCP, a current SCP, an initial point, and a midpoint for one embodiment.

FIG. 13 illustrates a region of a volume where a gradient 80 for a virtual object 26 exists, including a last tool point 224, a final tool surface contact point 226, an initial proposed point 242, and a second proposed point 244 for one embodiment of the invention. In FIG. 13, the haptic rendering process 16 proposes to move the tool location such that a point 224 on the tool 28 would move to the point represented by 242. However, point 242 is not located within the region where a valid gradient can be computed. Because the maximum surface direction vector 101 cannot be calculated for this point, the haptic rendering process 16 calculates a second proposed tool position that would result in the tool point 242 moving to the second proposed point 244. Point 244 is the approximate midpoint of a line 246 between point 242 and the last tool point 224. If the voxel density value at that point 244 is still the maximum value (255 in one embodiment), the haptic rendering process 16 can continue to average the point 244 with the last tool point 224, by using a binary algorithm to bring it progressively closer to the last tool point 224, until the midpoint 244 lies within the gradient 80. Once within the region where a gradient exists, the surface direction vector 101 to the virtual surface from the latest midpoint 244 can be computed for the purposes previously described.

In one embodiment, a binary search method is used to determine the intersection point between the endpoints of the segment. The process is repeated until either the points are within a tolerable error of the desired value, or a maximum number of iterations has been reached.

FIGS. 14A, 14B, and 14C illustrate an example of a binary search for locating the virtual surface 25 for a segment 249 that intersects the virtual surface 25 for one embodiment of the invention. In FIG. 14A, the haptic rendering process 16 determines a midpoint 254 by averaging the locations of the endpoints 248 and 252. In FIG. 14B the haptic rendering process 16 treats the point 254 as an endpoint of a modified segment 253 extending from point 254 to endpoint 248. The haptic rendering process 16 determines a midpoint 256 between points 248 and 254 and how far points 248 and 254 are from the virtual surface 25. The haptic rendering process 16 determines that point 248 is farther from the virtual surface 25 than point 254, and thus sets the upper endpoint 248 to be at a new point 256. The endpoints of the additionally modified segment 257 are thus points 256 and 254. This process is repeated until a point is found that is regarded as the intersection point 258 (within a predetermined distance from the virtual surface 25) of the original segment 249 and the virtual surface 25, as shown in FIG. 14C.

Other Interaction Techniques

The following sections describe in more detail an implementation of virtual object 26 and virtual tool 28 interaction according to an embodiment of the invention implemented by the assignee, SensAble Technologies, Inc. of Cambridge, Mass.

Single Point Methods

In some contexts a single point virtual tool 28 may interact with the virtual object 26. This may be handled as the simplest case of multipoint interaction using the methods previously described and described in more detail later. In another embodiment, specialized methods may be used for single point interaction, as described herein.

Collision Detection For Single Point Interaction

The haptic rendering algorithm determines when a collision between a virtual tool 28 and a virtual object 26 has occurred. A collision is detected when the haptic rendering process 16 attempts to move a tool 28 to penetrate a surface. In one embodiment, a collision occurs whenever the haptic interface location crosses through the virtual surface 25. In one embodiment, the virtual surface 25 may be a NURBS surface. In one embodiment, the virtual surface 25 may be the "skin" of a volumetric solid.

A stateless haptic rendering algorithm would consider only the haptic interface location 98 in determining the resulting forces from a collision. It would not consider any history or previous collisions. The resulting forces in a stateless algorithm would use only the current haptic interface location 98 to determine the 1) depth of penetration and 2) direction to the nearest surface 25. The resulting force vector would be a vector toward the nearest surface whose magnitude is proportional to the penetration depth. In the case of a voxel embodiment, the penetration depth of the haptic interface device point is generally proportional to the voxel density at that point.

The direction of the force vector would be a vector that points from the haptic interface location 98 to the closet point on the surface. In the case of the voxel embodiment, this vector is simply the maximum voxel gradient (i.e. direction of greatest voxel density change) at the haptic interface location 98. In conclusion, a stateless haptic rendering algorithm would consider the location of the haptic interface device at each iteration, determine if it has crossed a virtual surface 25 or is embedded in a virtual object 26, then return a force vector whose direction is from the haptic interface device location 98 to the nearest point on the surface, and whose magnitude is proportional to the penetration distance.

A stateless algorithm handles only basic cases of tool 28 interaction and falls short of accurately representing some cases. The most notable case for which the stateless algorithm fails is for the case of thin objects. If a user begins pressing through a thin surface, at some point the nearest surface point to the haptic interface device location 98 will be on the other side of the thin object (i.e. after the user has pressed more than halfway through), and thus the force vector will incorrectly push the user out the other side.

An improved algorithm keeps track of a virtual tool position at each iteration. Maintaining this virtual tool position is an efficient way to contain state information about the history of the user's path or trajectory. If the haptic interface device location 98 moves across a surface, the algorithm will attempt to move the virtual tool 28 toward the haptic interface device location 98, but never through the surface, as if the two points were connected by a spring. The resulting force sent to the haptic interface device 10 is proportional to the distance between the tool 28 and the haptic interface device location.

In some embodiments, the force is also proportional to the difference in velocity or acceleration between the virtual tool 28 position and the haptic interface device location 98. The tool position on the virtual surface 25 is referred to herein as the surface contact point or SCP 226.

In one embodiment, the haptic rendering process 16 attempts to minimize the distance between the SCP 226 and the current haptic interface location 98, given that a path of decreasing distance exists between the last SCP 224 and the desired one. The connection between the SCP 226 and the haptic interface location 98 can be viewed as a spring. The haptic rendering process 16 processes the locations of the SCP 226 and haptic interface location 98 in iterative steps. At each iteration, the haptic rendering process 16 attempts to minimize the distance from the SCP 226 to the haptic interface location 98 if possible.

In one embodiment, the haptic rendering process 16 uses an algorithm for determining the SCP 226 based on a stepping method. For a given number of iterations, the algorithm determines a valid direction to move the SCP 226 which would yield a better solution (that is, decrease the distance between the SCP 226 and the current haptic interface location 98) and moves the point from the previous SCP 224 to a current SCP 226 in that direction. In one embodiment, valid directions are those which move along the virtual surface 25 of the virtual object 26. The haptic rendering algorithm should not allow the SCP 226 to penetrate the virtual surface 25 as it steps toward the haptic interface location 98.

FIG. 15 shows one method of determining a final SCP 226 used in one embodiment. FIG. 15 illustrates changing SCP positions 264a, 264b, 264c, tangency planes 260a, 260b, 260c, and resulting SCP 226. The resulting SCP 226 is a stationary position until the user makes a further movement of the virtual tool 28. In one embodiment, the changing SCP 264 is similar to the last or previous SCP 224. In one embodiment, the tangency planes 260a, 260b, 260c are similar to the tangency plane 104 described earlier. Using this process, the haptic rendering process 16 creates a tangency plane 260a for an existing SCP 264a using the surface direction vector 101a for the SCP 264a. The haptic rendering process 16 then moves the SCP 264a a fixed step (predetermined distance) on the virtual surface 25 to new SCP 264b, constraining the movement of the changing SCP 264b to the tangency plane 260b. The haptic rendering process 16 then determines a new tangency plane 262b and repeats the stepping process to move the SCP 264b to a changed SCP 264c. The haptic rendering process 16 then creates a new tangency plane 262c and repeats the process until the SCP 264c reaches a final position at SCP 226 above, or at the shortest distance from, the haptic interface location 98, as shown in FIG. 15. This method of movement is also termed a march by the SCP 264 across the virtual surface 25.

In one embodiment, the SCP 264 is constrained to move in the plane 260, which passes through the current SCP 264 and whose vector is the approximate direction of the normal to the virtual surface 25 at that point. In other words, the SCP 264 is allowed to move in any direction perpendicular to the surface direction vector 101 at that point. In one embodiment, the haptic rendering process 16 determines which direction along that plane 260 which would yield the optimum solution (that is, the solution that decreases the distance between the SCP 264 and the haptic interface location 98 by the largest amount) and moves the SCP 264 in that direction. Since the shape of the surface 25 at the SCP 264 position may be curved, moving linearly in some direction may either cause the SCP 264 to penetrate the virtual surface 25 (if convex) or leave the virtual surface 25 (if concave) causing an error in the SCP 264 position. Therefore, the SCP 264 may be projected onto the surface at each step. In one embodiment, this error is minimal if the step size is small, so the haptic rendering process 16 only needs to project the SCP 264 onto the virtual surface 25 after the final position (final surface contact point 226) has been determined from the march. Another potential problem involves local minimums and maximums. Because the SCP 264 only moves in directions which draw it progressively closer to the haptic interface location 98, the SCP 264 may not be able to traverse local maximums (that is, small humps in the virtual surface 25) and may settle in local minimums (small dips in the virtual surface 25). In one embodiment, the solution is to allow the spring (a spring calculation connecting the SCP 264 and haptic interface location 98) to stretch a small and finite distance so that the SCP 264 march can overcome these local discrepancies. In one embodiment this problem of local maximums and minimums rarely becomes a serious problem, so the spring stretching approach need not be implemented.

In another embodiment, the haptic rendering process 16 implements an iterative stepping algorithm as follows: The haptic rendering algorithm creates a plane 260 passing through the current or changing SCP 264, whose surface direction vector 101 is the calculated approximate normal to the virtual surface at the SCP 264. The haptic rendering algorithm projects the current haptic interface location 98 onto the nearest point on that plane 260a, 260b, 260c and creates a vector 262a, 262b, 262c from the SCP 264a, 264b, 264c to that point. This vector then becomes the desired direction for the march. The haptic rendering algorithm moves the SCP 264a, 264b, 264c a fixed step in the direction indicated by the vector 262a, 262b, 262c. The haptic rendering algorithm repeats these steps. Finally, the haptic rendering algorithm projects the SCP 264a, 264b, 264c onto the virtual surface 25 using the intersection technique described above. In an alternate embodiment, the haptic rendering algorithm uses the faster but less robust technique of projecting based on the surface direction vector 101 and density value at that point. For example, see FIGS. 17A-17E.

Collision Detection with Three-Dimensional Tools

Collision with a point interface is sufficient for many interactions, but in one embodiment a more complete method of three-dimensional tool interaction is used. The virtual tool 28 is represented by a series of points along its surface, as discussed previously. At each iteration, the haptic rendering process 16 tests each of these points on the surface of the tool 28 to test for penetration of the tool 28 into the virtual surface 25 of the virtual object 26.

Improved Stepping Method

One embodiment of the haptic rendering process 16 maintains a tool position and iteratively moves it toward the current haptic interface location 98. The haptic rendering process 16 operates in a repeated loop of iterative processing steps. For each loop, the haptic rendering algorithm attempts to minimize its distance to the haptic interface location 98 without violating the virtual surface 25. In other words, at each iteration, the spring connection between the tool 28 and the haptic interface location 98 attempts to contract, but stops if that action would cause any of points of the virtual tool 28 to penetrate the virtual surface 25.

During each iteration, the haptic rendering process 16 attempts to march the tool 28 toward the haptic interface location 98, checks for violations against the virtual object 26, and repeats this process a number of times. Since the haptic rendering process 16 evaluates for collision at a potential tool location which is a distance equivalent to the step size away from the previous tool location at each step, the step size is bound to a relatively small value so that the haptic rendering process 16 does not jump the tool 28 over any features such as a concave "hole" in the surface 25 of the virtual object 26. The step size should also be large enough so that the movement of the tool 28 can reasonably keep up with the movement of the haptic interface location 98 as the user moves the haptic interface device 10. If the haptic interface device 10 moves a considerable distance but the step size of the tool 28 is small, the user feels a drag as the haptic rendering process 16 attempts to move the tool 28 to the haptic interface location 98. In one embodiment, the step size for each iteration should be less than the minimum feature size that the user will want to feel. In one voxel embodiment, the step size is one half of the voxel grid spacing.

Moving Along A Face Of A Surface

If the movement method is to always move directly toward the haptic interface location 98, the tool 28 would get "stuck" on the virtual surface 25 once it touched the virtual surface 25. Therefore, the haptic rendering process 16 attempts to move the tool 28 along the surface 25 in a manner that minimizes its spring distance (between the tool 28 and the haptic interface location 98) instead of simply backing up to the previous position whenever the tool 28 violates the surface 25. The methods for achieving this are similar to those for determining the SCP 226 for a single point.

Figure 17A:
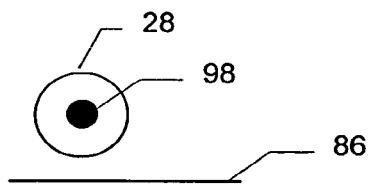
Figure 17B:
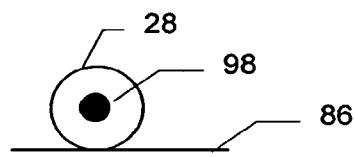
Figure 17C:
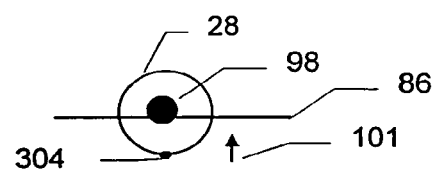
Figure 17D:
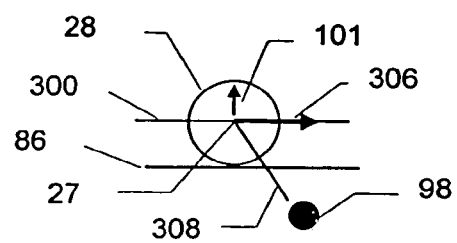
Figure 17E:
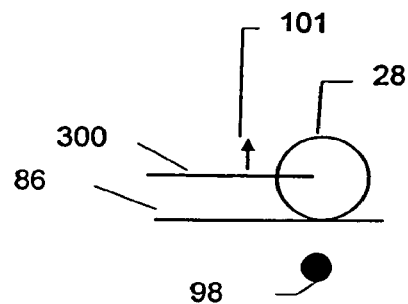

FIGS. 17A-17E show a virtual tool 28 encountering a virtual surface 25 and moving along the virtual surface 25 constrained by a plane 300. In FIGS. 17A and 17B, the tool 28 is not penetrating the virtual surface 25, so the haptic rendering process moves the tool 28 to follow the location of the haptic interface location 98. In FIG. 17C the potential tool position would result in penetration of the virtual surface 25 and thus violate the interaction constraints. The haptic rendering process 16 determines the surface direction vector 101 at the point of greatest potential penetration 304. In FIG. 17D the haptic rendering process 16 determines a plane 300 perpendicular to the surface direction vector 101 and passing through the last legitimate tool position in FIG. 17B. The haptic rendering process 16 constrains the virtual tool 28 to move only within the plane 300. The desired direction of motion 306 is determined by taking a vector 308 from a tool origin 27 to the haptic interface location 98 and projecting that vector 308 onto the plane 300. In FIG. 17E, the tool 28 moves a fixed distance in the direction determined in FIG. 17D. This manner of movement effectively allows the tool 28 to move along the virtual surface 25 without getting "stuck." Once the haptic rendering process 16 determines that the tool 28 is near the virtual surface 25 (that is, after finding a potential penetration), this method may be used for all further calculations until the tool 28 leaves the virtual surface 25 (that is, the potential tool points cease to penetrate the virtual surface 25, causing the tool 28 to no longer be in a touching state).

Thus, the haptic rendering process 16 can detect when the tool 28 is on a face of a virtual surface 25, and attempts to move it along the surface 25 instead of directly toward the haptic interface location 98 when this condition is detected.

Moving Along Or Across An Edge

More complicated situations may occur where the haptic rendering process 16 is moving the virtual tool 28 along an edge 108 or 177 instead of a face of a virtual object 26. In this situation, the haptic rendering process 16 constrains the tool 28 to a line (the edge) instead of a plane (the face). When multiple potential penetration points on the surface of the tool 28 have differing surface direction vectors 101, then the haptic rendering process 16 assumes that the tool 28 is at an intersection of the two faces with differing surface direction vectors 101, and constrains the tool 28 to that virtual edge 108 accordingly. The virtual edge 108 is the cross product of the surface direction vectors 101; the haptic rendering process 16 then constrains the tool 28 to moving only in that direction or its negative. (See the discussion of edge constraints associated with FIGS. 7A-7C.)

In one embodiment, it is not always the case that the haptic rendering process 16 constrains a virtual tool 28 to moving along an edge 108 or 177 when one is detected. Otherwise, when attempting to slide across edges 177 that are convex (that is, mountains or "sharp" edges 177 in the virtual surface 25 of the virtual object 26), the tool 28 may get stuck. Thus, the haptic rendering process 16 should distinguish between when the tool 28 is attempting to slide along a concave edge 108 versus when it is attempting to cross a convex edge 177. This is determined by taking the dot product of the desired direction (that is, a vector from the tool origin 27 to the haptic interface location 98) with the surface direction vectors 101 of each face that forms the virtual edge 108 or 177. See FIG. 7B. A positive dot product indicates that the tool 28 is attempting to move away from one of the virtual surfaces 25 instead of sliding along the edge 108 or 177. If either dot product is positive, the haptic rendering process 16 assumes that the tool 28 is moving across a convex edge 177 and does not constrain itself to the convex edge 177. When this case is detected, the haptic rendering process 16 "pushes the tool 28 away" slightly, moving in the direction of the vector which is the average of the two surface direction vectors 101.

The methods described above are sufficient in most cases; however, scenarios exist where the movement of the tool 28 may get "stuck" and the haptic rendering process 16 is unable to move the tool 28 along the virtual surface 25 effectively. To compensate for this, the haptic rendering process 16 tries moving the tool 28 tries away from the surface 25 (that is, in the direction of the surface direction vector 101) at small increments if it has been stuck for a considerable time (that is, the haptic rendering process 16 has unsuccessfully attempted to move the tool 28 for the past several iterations).

Progressive Extraction

Finally, there are situations in which the tool 28 somehow becomes stuck inside the virtual surface 25. In other words, the current tool position is penetrating the surface 25. For example, if the user touches a surface 25 with the flat face of a cube, then rotates the cube such that one of the edges is now penetrating the surface 25. Unless the haptic device limits this rotation via a torque feedback, the haptic rendering process 16 can put the virtual tool 28 in a position of penetration, which violates the desired behavior. In one embodiment, the haptic interface device 10 would have six degrees of freedom of force feedback and thus not allow invalid rotations. In other embodiments, the haptic interface device 10 has more than six degrees of freedom. An embedded tool position may also occur if the user uses a modification mode to add material on top of the tool 28, or the virtual object 26 is rotated such that the tool 28 suddenly becomes embedded.

If the tool 28 is forced to an invalid position, the haptic rendering process 16 needs some way of extracting the tool 28 to a valid position. In these cases, the haptic rendering process 16 should attempt to move the tool 28 in a direction away from the virtual surface 25 to escape the surface 25. Therefore, if the tool 28 is stuck such that moving directly toward the haptic interface location 98, moving along the constraint plane 300, moving to its previous position, and moving in the direction in the normal of that plane 300 all would result in penetration of the virtual object 26, then the haptic rendering process 16 attempts to "jump" the tool 28 a significant distance in the direction of the surface direction vector 101. (See FIG. 7C.) If this jump still does not free the tool 28 (that is, one of its points would remain embedded in the surface 25), but the proposed position results in lesser penetration of the virtual object 26, then it is considered a superior position (that is, if the point of greatest penetration yields a lower density evaluation value than the previous evaluation for the previous point of greatest penetration). This condition allows the haptic rendering process 16 to have a notion of "progress;" that is, even though moving in some direction does not fully release the tool 28 from the surface 25, the movement is still an improvement over the previous position if moving in this direction causes the penetration distance to decrease.

Random Extraction

The above methods handle most cases. However, some scenarios exist where the tool 28 is "stuck" but moving in the direction of the normal to the plane does not yield any improvement. This is a rare condition since the surface direction vector 101 points toward the surface 25 of the virtual object 26, moving in that direction should decrease the penetration distance. But although moving in that direction decreases the penetration distance of that point which is used to determine the surface direction vector 101, this movement may increase the penetration of another point (usually one of the opposite side) such that the tool's 28 overall penetration distance increases. In circumstances where none of the above techniques yields acceptable results, the haptic rendering process 16 may conclude that the tool 28 is truly stuck and should not legally move (for example, as in FIGS. 16A and 16B).

For example, suppose a spherical tool 28 ends up in a situation where it is in a gap or channel 270 between two virtual objects 272 and 274, whose width is less than that of the tool 28. A similar situation occurs if the tool 28 is in a tunnel or conduit in a virtual object 26. FIGS. 16A and 16B show a spherical virtual tool 28 in a channel 270 formed between two virtual objects 272 and 274. The diameter of the channel 270 is less than the diameter of the virtual tool 28. FIG. 16A shows a point of greatest penetration 276 and a vector 278 to the surface 280 of virtual object 274. FIG. 16B shows a new point with greatest penetration 282 and its computed vector 284. The point 288 represents the tool surface contact point for the previous penetration of virtual object 274. The haptic rendering process 16 may determine that the point 276 with the greatest X value has the greatest penetration (based on a horizontal X axis for FIGS. 16A and 16B). It will then push the sphere 28 toward the minus X direction by some distance. During the next iteration, the point of greatest penetration will probably be the point 282 with the least X value. This will then cause the sphere 28 to move back in the X direction by some distance, etc. In this example, the haptic rendering process 16 could cause the tool 28 to oscillate indefinitely between the positions depicted in FIGS. 16A and 16B.

Thus, as a final method, the haptic rendering process 16 may attempt to move the tool 28 in a random direction as a way of arriving at a better solution (that is, one that decreases the greatest penetration distance). (See FIG. 7C.) However, in one embodiment, instead of moving in a purely random direction, the haptic rendering process 16 determines which of the points of the tool 28 have computed surface direction vectors 101 (that is are either embedded in the surface 25 or within the field of decreasing non-zero values surrounding the surface 25) and chooses one of those surface direction vectors 101 randomly as the direction to move in. The movement of the tool 28 obeys the same rules as described for other cases in FIGS. 7A-7C. If the maximum penetration distance does not decrease as a result of the attempted move, then the haptic rendering process 16 does not move the tool 28 but instead tries a different direction.

Note that this final method is fairly expensive computationally. Thus, when the tool 28 reaches this state, the haptic rendering process 16 may determine all the current tool penetration points only once, by creating a list of indices of points whose penetration values are within the virtual surface 25. In one embodiment using voxels 78, the points include those points with densities greater than the density of the threshold value (isosurface 86). For all successive iterations, the haptic rendering process 16 randomly chooses one of the points and moves the tool 28 in the direction of that point's surface direction vector 101.

Variable Step Size And Other Optimizations
Adaptive Step Size

In one embodiment, the user may feel a drag force if the haptic rendering process 16 is not able to maintain the movement of the tool 28 with the movement of the haptic interface device 10. For example, if the step size or number of iterations is small, then the haptic rendering process 16 may take a considerable amount of time to move the tool 28 to its final position if the haptic interface device 10 has moved a significant distance. Thus, it is desirable to have an adaptive algorithm that interactively sets the step size depending on the movement of the haptic interface device 10. If the haptic interface device 10 is moving quickly, then the step size increases to compensate. If the haptic interface device 10 is not moving quickly, the step size is decreased so that the tool 28 can be placed with greater accuracy. A smaller step size also helps prevent undesired buzzing or vibration of the haptic interface device 10. Buzzing can occur when the haptic rendering process 16 cycles the tool 28 between multiple positions, attempting to settle but never finding rest. See FIGS. 16A and 16B. However, if the step size is decreased, these oscillations become very small and barely noticeable or do not occur at all. On the other hand, if the user is moving a large distance, then oscillations and "buzzing" do not occur because the haptic rendering process 16 is attempting to maintain the position of the tool 28 with the haptic interface location 98 of the haptic interface device 10 instead of having the tool 28 stay in one position. Thus, if during a given loop, the haptic interface device 10 is not moving rapidly, the step size of the tool 28 is decreased.

Adaptive Number of Iterations

If the computer processor is not performing any other process-consuming tasks, then the number of iterations per second can be increased safely. The most intensive operations occur if the user is not only interacting with the virtual object 26 but is modifying it in some manner. For example, if the haptic rendering process 16 is using the tool 28 to remove or add material, the calculations can consume much of the processing time. If the virtual object 26 is not being modified, the haptic rendering process 16 assumes it can use a greater portion of the processing time and thus increases its number of iterations. In one embodiment, the number of iterations is increased by a factor of two. In other embodiments, other factors are used to determine the number of iterations.

Tool Point Collision Detection Optimization

The processing requirement per step can also be decreased if not all points along the tool 28 are evaluated at each loop. Evaluating a large number of points to check for penetration of the virtual surface 25 by the virtual tool 28 consumes a large amount of processing time. In one embodiment, a faster method attempts to optimize this by choosing only a set number of points to evaluate during each iteration, depending on which points are closest to the surface 25. In a voxel embodiment, during the first step in each loop, the haptic rendering process 16 evaluates the density values for the voxels 78 at all tool points and remembers the five points that evaluated to the greatest densities. For subsequent steps during that loop, it characterizes the tool 28 by those five points and thus does not perform any collision detection with any of the other tool points. This gives a significant performance increase. In one embodiment, the average tool 28 may have around 80 tool points, so evaluating the only 5 of 80 provides a large advantage. When this optimization is used, the number of iterations per loop is doubled to four, so that the haptic rendering process 16 only performs collision detection against every tool point every fourth step.

This can lead to situations where one of the tool points would violate the virtual surface 26, if that point was not one of the original five chosen during the first step. The haptic rendering process 16 however, does not usually place the tool 28 in situations where a valid position cannot be found following an evaluation of a potentially illegal series of steps.

Adaptive Stepping Behavior

In one embodiment if the haptic rendering process 16 has been moving the tool 28 toward the haptic interface location 98 without encountering intersections with virtual objects 26) for several iterations, then the haptic rendering process 16 assumes that the tool 28 is in empty space. For future iterations, instead of stepping toward the haptic interface location 98, the tool origin 27 is set to be coincident with the haptic interface location 98 at each step. Thus, the user does not feel any unwanted force effects. This continues until the tool 28 intersects with a virtual object 26, in which case the haptic rendering process 16 uses the previously discussed stepping algorithms to increment the tool position to a valid location. The number of legal steps needed before the tool 28 is set to the haptic interface location 98 may be defined to be one hundred iterations. In other embodiments, the number of legal steps may be less than or greater than one hundred iterations.

Optimize Transform Computations

For each collision detection evaluation between a tool point and the virtual surface 25, the point is transformed from the local coordinates of the tool 28 to the local coordinates of the virtual object 26. The greatest process consumption involves multiplying the point by the appropriate transformation matrix to account for the rotation of the tool 28 and virtual object 26. In one embodiment, instead of calculating this transformation for each loop, the points are only updated to the current orientation every one hundred iterations. When the points are updated, they are stored in a separate point array of local points, which is used to represent the tool 28 until it is again updated. Note that only the rotation of the points is updated every one hundred iterations; the translation of the points is accurately updated every loop to accurately reflect the potential position of the tool 28.

Additional Conditions Handling

Normally, the haptic rendering process 16 places the tool 28 to remain on the outside of any virtual object 26 with which it is interacting. If some small portion of the tool 28 becomes buried in the virtual object 26, the tool 28 can usually be extracted to the surface 86 using one or more of the techniques described above. However, situations exist where the tool 28 may instantaneously become completely buried inside a virtual object 26. For example, if the user adds a large amount of material over the current tool position, or the user begins the program with the tool position inside a virtual object 26, then the tool 28 is buried. If the tool 28 is ever inside a virtual object 26, the desired behavior is for the haptic rendering process 16 to gradually push the tool 28 away from the virtual object 26 in the direction of the nearest surface 86. In another embodiment, the tool 28 reaches a state where it is completely or nearly buried in a virtual object 26, then no forces are generated until the haptic rendering process 16 moves the tool 28 to exit completely the virtual object 26. It sets its position to the haptic interface location 98 for subsequent iterations and generates no collisions until the tool 28 reaches a position where every tool point is outside of the virtual object 26. In a voxel embodiment, the tool 28 is considered buried if its center evaluates to a density value approximate to the maximum density value (which is a value of 255 in one embodiment).

Tool Behavior Under Object Transformations

The tool position is stored in the local coordinates of the virtual object 26. Thus, if the virtual object 26 instantaneously changes scale, translation, or rotation, the tool position may jump, and the user feels a sudden "kick back" in the haptic interface device 10. To prevent this in one embodiment, a check is made during the first potential step of the tool 28 to determine if the transform of the object 26 has changed significantly since the previous loop. If this is true, then the tool position is set to the haptic interface location 98, and therefore no force generated. For example, if an object 28 were scaled upward, the haptic rendering process 16 would bury the tool 28 in the virtual object 26 instead of kicking the tool 28 to the surface 86.

Tool Position Error

The tool 28 is most often not directly on the virtual surface 25. As discussed previously, the haptic rendering process 16 only moves the tool 28 in discrete steps and its movement is constrained from violating the surface 25. Thus, the tool 28 rarely settles directly on the surface 25. This difference in position is not particularly noticeable when the user is feeling the surface 25 with the virtual tool 28. Realistic feel does not depend on having the tool 28 always directly on the virtual surface 25. In one voxel embodiment, step sizes are generally around 0.1 grid space unit; thus, the user at most experiences an error of 0.1 grid space units from the surface 86. This is below the threshold where it would make a difference in the force felt by the user. In other embodiments, the step size may have other values than the 0.1 grid space unit.

Modification Techniques

FIG. 18 illustrates a flowchart of the modification process occurring between a virtual tool 28 and virtual object 26. First, a virtual tool 28 is determined or generated in virtual space that represents the haptic interface device 10 that the user is manipulating in real space (step 400). In one embodiment, the haptic rendering process 16 generates the virtual tool 28. The virtual tool 28 includes a plurality of discrete points. The user then selects a modification mode that determines what kind of modification occurs to the virtual object 26 as a result of interaction between the virtual object 26 and the virtual tool 28 (step 402). The modification modes can include material removal, material addition, and other material modification modes. The material removal modes can include a remove, erase, and sandpaper modes. Material addition can include addition and push and pull modifications. The material modification mode can include smoothing, mirroring, and other material modification modes.

In step 404, sensors determine the location of a user in real space. In one embodiment the user is manipulating a haptic interface device 10 and sensors determine the position of the haptic interface device 10 in real space.

The modeling application 12 then determines the location of the discrete points of the virtual tool 28 relative to the location of the virtual object 26 (step 406). In one embodiment the haptic rendering process 16 determines these locations. The haptic rendering process 16 then calculates an interaction force between the virtual tool 28 and the virtual object 26 based on the locations of the points of the virtual tool 28 and the location of the virtual object 26 (step 408). The user feels the interaction force through the haptic interface device 10, which thus provides feed back to the user on the interaction of the virtual tool 28 with the virtual object 26. In one embodiment, the haptic rendering processor 16 provides the interaction force to the haptic interface device 10. In one embodiment, the virtual object 26 includes a virtual surface 25 and the position and orientation of the virtual tool 28 is determined relative to the virtual surface 25 based on the locations of the points of the virtual tool 28 compared to the virtual surface 25. In one embodiment using voxels the virtual surface is a virtual isosurface 86.

The modeling application 12 then produces a modified virtual object 26 by modifying the virtual object 26 based on the modification mode, the position of the virtual tool 28, and the location of the virtual object 26 (step 410). In one embodiment, the modification processor 20 produces the modified virtual object 26. For example, if the virtual tool 28 is in a removal mode and the user is attempting to penetrate the virtual object 26 with the virtual tool 28, then the modification processor 20 removes material from the virtual object 26 that is in the path of the tool 28 as the user pushes the tool 28 into the object 26. If the modification mode is a sandpaper mode, and the user is rubbing the virtual object 26 with the virtual tool 28 (as though rubbing wood with sandpaper), then the modification processor 20 removes a limited amount of material from the virtual object 26 that corresponds to the area being rubbed and the force and amount of rubbing that the user is applying to the virtual object 26.

The modified virtual object 26 is then output from the system. In one embodiment, the output is a modified visual image of the virtual object 26 that is output to a graphics display 14 by the modeling application 12 or graphics processor 22. In one embodiment, the output also includes a new or modified shape, which the user feels through the haptic device. The user then decides whether to continue with the modification process (step 414). If the user decides to continue in the same modification mode, the user makes an additional movement of the virtual tool 28, and the haptic rendering process 16 determines the new position of the virtual tool 28 (step 406). The user may decide to select a different modification mode (step 416) and returns to step 402 to select the new modification mode. If the user does not decide to make any further modifications, then the virtual object 26 may be displayed, output, or saved to a disk, tape, or other data storage device (step 418). Output may include output or export to on an alternate file format or a printing device or a device that provides a physical, real world model of the virtual object 26.

Basic Modification Techniques

The modification process between a virtual object 26 and virtual tool 28 is described in more detail below for one embodiment of the invention as implemented by the assignee, SensAble Technologies, Inc. of Cambridge, Mass.

Voxel-Based Removal

As described previously, one embodiment uses a voxel model to define the isosurface 86. Modifications to the isosurface 86 are made indirectly, by modification of the voxel density values, based on the virtual tool 28 location relative to the isosurface 86.

In one embodiment, the tool 28 itself stores voxel density values for various locations throughout its volume. In another embodiment, the density values are calculated only when needed and are not stored. For a given location of the tool 28 in the haptic virtual environment, the "tool density values" are then compared to the density values of the virtual object 26 at those locations. The density values of the virtual object 26 are then modified based on the comparison with the tool density values and the modification mode. For example, if the modification mode was set to removal, when the virtual object density values were found to be greater than those of the tool 28 at the identical location, the virtual object density values would be set to match those of the tool 28. This has the effect of lowering the density value of the virtual object 26 at that location, resulting in a modification to the isosurface 86 that appears as removal of material.

How the modification mode is set affects how voxel densities are defined inside the virtual tool 28. For the case where modification mode is set to removal, the voxel densities are set in the tool 28 such that they are at the minimum value on the most interior portions of the tool 28 and set at a maximum value beyond the virtual isosurface of the tool 28. The direction of density value increase is reversed when modification mode is set to addition. That is, the voxel density values are greatest within the tool 28 and go to their minimum beyond the virtual isosurface of the tool 28.

Example Tools

Many different tool shapes are possible. In one embodiment, the voxel densities assigned within the virtual tool 28 are made based on distance from a tool "center". For example, in the case of a sphere tool and a modification mode of removal, voxel densities at the center of the sphere would be their lowest value. On any line emanating radially from this center, the voxel density values would increase, depending on the ramp length, until they reached the isosurface value at the apparent surface of the virtual tool 28. On this same radial line, beyond the virtual tool surface, voxel densities would continue to increase until their maximum value was reached. The tool, then, in this embodiment, is a "field" of voxel density values, which when moved around by the user transfers its values, when appropriate, to the virtual object 26, resulting in modification of the object 26.

Note that it is possible to define virtually any arbitrarily shaped field, using this approach, and thus have an unlimited number of virtual tools 28. In one embodiment, the user can draw arbitrary 2-dimensional shapes which are then populated with voxel density values, much like the more complicated 3-dimensional example above. In one embodiment, the actual shape of the tool is created by carving the virtual object 26, and then defining the shape of the tool 28 to be that of the object 26. These interactively carved tool shapes can be saved to a file and used later or shared through the Internet.

Pillboxing

Although the user is conceptually moving in a continuous motion, tool locations are only sampled discretely. As the user can move the virtual tool 28 quite quickly through space, it is necessary to be able to reliably remove or add material on the path between sampled tool positions. FIG. 19A provides a pictorial view of a removal based on a removal line 454 between two such points P21, P22. FIG. 19A is a 2-D representation of a 3-D removal process. Conceptually, planes 456 and 458 are formed at each endpoint and extend vertically out of the plane of the FIG. 19A. The removed area may be termed a "pillbox" or swept area 452 between the two points P21, P22. In one embodiment, this type of removal may occur automatically when the user holds down a switch button on the haptic interface device 10 such as a stylus having a button on it, and the user moves the stylus to drag the haptic interface location 98 through a region to form the swept area 452. In another embodiment, the haptic rendering process 16 may receive a request that is equivalent to sweeping a sphere 34 across an area, in effect creating a cylinder with spherical ends.

FIG. 19B provides a pictorial view of endpoints P21, P22, a point P23 where the appropriate voxel density value must be computed, a projected point P24, and conceptual endpoint planes 456, 458. In FIG. 19B a virtual tool 28 is represented by sphere 462*a* representing the starting position of the tool 28 and sphere 462*b* representing the ending position of the same tool 28. Two planes, 456, 458 exist conceptually, one at each endpoint of the segment 454. If the point of interest, P23, lies between the planes 456, 458, then the point P23 is projected the shortest distance to the line segment 454. The resulting density value at point P23 is based on the distance from point P23 to the line, as if the tool 28 was centered at the point P24.

Optimizing Removal and Addition

When the user requests a removal by moving the virtual tool 28 in a removal mode, the haptic rendering process 16 determines the number of voxels the tool 26 currently occupies, the desired settings for each of these voxels, and then changes these voxel values if needed. If the haptic rendering process 16 determines that the current voxel value at some point is less than the desired voxel value, then the haptic rendering process 16 does not need to modify that point. For removal, only voxels that need to be decreased (that is, voxels whose densities are greater than the desired target density) are modified.

In one embodiment, the feel of the object 26 must be updated at a very high rate. As such, removals are made at a slower rate than the feel of the object 26 is updated. Whenever a removal request is read, a box enclosing the extent of the removal operation is determined, and the number of voxels in that box is calculated. The removal is then spread over several iterations. Because the removal extends over multiple cycles but touch is performed each cycle, the virtual object 26 may not feel "correct" to the user during an intermediate stage of the removal. However, in practice, this difference is small and offset by the benefit of allowing large-scale removal.

Ensuring Accurate Modification and Feel

Although the tool 28 is frequently intended to be "just touching" the virtual surface 25, in practice it is usually only approximately touching. As such, the first step in modification is to accurately position the tool 28 as just touching the virtual surface 25. In one embodiment, this step is accomplished by doing a binary search along the approximate surface normal at the point of greatest potential tool penetration. Using the binary search, a more exact location for the surface 25 at the potential penetration point is computed, and the tool origin 27 is then moved such that the point in question is coincident with the computed surface location.

Since the point locations used for sensing penetration may have space between them, it is possible for the sample points to not penetrate the virtual surface 25, but still have potential embedding of the virtual tool 28. FIGS. 20 and 21 illustrate two cases of this. FIG. 20 depicts a cube 466 near a virtual surface 25 which has a protruding feature 490 of the virtual surface 25 penetrating between two points, P31, P32 of the cube 466. In FIG. 20, the features are more detailed than the point distribution on the cube 466, so the feature 490 is able to penetrate undetected between the points P31, P32. FIG. 21 depicts a sphere 34 penetrating a virtual surface 25 between two points S3, S4 of the sphere 34. The sphere 34 is a convex object, so penetration may occur even when the virtual surface 25 is completely flat.

In the case of a tool 28 that is a sphere 34, the haptic rendering process 16 can reliably determine how much penetration has occurred between points of the sphere 34 when contacting a reasonably flat virtual surface 25. For example, FIG. 22 depicts a sphere 34 represented by multiple points S11, S12, S13, S14 none of which penetrate a virtual surface 25. FIG. 22 also shows a surface direction vector 101 at point S12, a vector 494 from S12 to the origin 496 of the sphere 34, and calculated distance 498 from the origin 496 to the virtual surface 25. At the current contacting point S12, the haptic rendering process 16 first finds the surface direction vector (v1) 101 of the virtual object 26 at that point. The haptic rendering process 16 then takes the dot product between the normalized surface direction vector (v1) 101 and the vector (v2) 494 from the point S12 to the origin 496 of the sphere 34. The resulting distance 498 indicates how much of the sphere 34 is not penetrating the virtual surface 25. This distance is then used in correcting the position of the sphere 34 to be tangent to the virtual surface 25. Note that this position correction is only performed to calculate the tool position for modification. When the user is simply feeling the virtual surface 25, no correction to the tool position needs to be made because the feel of the tool 28 does not have to be exceptionally accurate to create a compelling feel to the user.

The second step in modification is to then tentatively embed the tool 28 by a specified penetration distance based on the removal metaphor or mode. The embedded tool 28 is then superimposed against the virtual object 26 and, in one embodiment, the voxel densities of the virtual object 26 updated based on the voxel densities of the tool 28 at the superposition locations. The penetration rate can be at a constant rate or it can be at a variable rate based on equations, functions, or other rules. For example, a rule or equation could state that no modification occurs until a certain force threshold is met or that the amount of penetration is dependent in a non-linear way on the amount of force applied or the velocity of the movement.

As the virtual object 26 is updated, both the graphical display and the haptic feedback or touch sensation are updated at very high rates. By properly limiting tool motion, using concepts such as softness, friction, and many other physical simulations, virtually any effect can be simulated for the user, including the effect of feeling the surface 25 while carving.

Modification with Alternate Feel

Although it is frequently desirable to give the user the feeling that he is carving a surface 25, it is also possible to give the user other touch sensations when performing modifications. For example, a non-directional viscous force can give the sensation of pushing the tool 28 through a thick liquid. In one embodiment, when the user activates the stylus switch on the haptic interface device 10 to begin removal, a point constraint is generated at the haptic interface location 98. This point follows and matches with the haptic interface location 98 unless it is removing material. (In other words, if the haptic interface location 98 is surrounded by empty space, the user does not feel any force effects). When modification occurs, this point constraint moves more slowly toward the haptic interface location 98 and thus produces a drag effect. The force the user feels is modeled as a spring effect between the point constraint and the actual haptic interface location 98.

To determine if any material needs to be removed, the haptic rendering process 16 performs the removal method and notes the number of voxels that have been affected. If this number is greater than zero, then the haptic rendering process 16 determines that the tool 28 is removing material and applies a drag force to the tool 28. The distance the tool 28 is allowed to move during removal is dependent upon the user-defined removal rate.

In one embodiment, using the voxel approach for more accuracy, this removal rate can be dependent upon the number of voxels changed, so that the tool movement is further constrained if a larger number of voxels have been affected. Conversely, if the haptic rendering process 16 determines that the movement of the tool 28 only removes an insignificant number of voxels, then it can be permitted to move further. In one embodiment, the approach is to count those voxels that have been changed from above to below the isosurface value 86. In another embodiment, a force threshold is imposed, such that the haptic rendering process 16 would only remove material if the threshold exceeds a certain user-defined force.

Addition

As mentioned previously, addition is the opposite of subtraction: the same methods are used except for some minor changes to reverse the subtraction process. In one embodiment based on the voxel approach, the gradient within the tool 28 is inverted. That is, the higher voxel values are found in the most interior region of the tool 28 and the lowest values outside of the virtual surface of the tool 28.

Existing voxels are only changed to the desired voxel values when the latter exceeds the current values. Force effects are also different. As voxels are being added, the user feels only a 3-D-friction force similar to that experienced in non-contact removal mode. In other words, a point constraint is activated, and this constraint is permitted to move toward the haptic interface location 98 at a set but slow rate. Thus, the user experiences a drag while adding material.

Sandpaper

In one embodiment, one removal mode is the sandpaper removal metaphor. When sanding, the objective is to remove small amounts of material at a consistent depth. One way to accomplish this is using outriggers, to be discussed later, which would constrain the tool 28 to the virtual surface 25 of the virtual object 26 outside the area currently being sanded. Other embodiments utilize other methods. Regardless of mode, the sander (a virtual tool 28 in sandpaper removal move) only removes material when the haptic interface location 98 velocity tangent to the virtual surface 25 has exceeded a certain threshold.

A frictional effect is introduced while the virtual tool 28 is contacting the virtual surface 25, regardless of whether removal is being currently performed or not, thus representing the real-world feel of a sander. When the sander is not removing, the frictional effect is constant. When the sander is removing, the frictional effect oscillates. This oscillation makes the virtual surface 25 feel somewhat "rough" to the user, as is expected for a sanding tool.

In one embodiment, the actual area that is sanded is determined by taking the tool 28, shrinking it, and then penetrating it into the virtual surface 25 of the virtual object 26 at a set distance. For example, in the case of a cube 466 the actual sanding element is a smaller cube protruding from the cube 466 that the user touches the virtual surface 25 with. In another embodiment, the sander is implemented as a 2-D blade that protrudes from the surface of the tool 28.

In one embodiment, the current sandpaper metaphor attempts to smooth the virtual surface 25 while avoiding gouging. The sandpaper method keeps the tool 28 on the virtual surface 25 and only allows the tool 28 to move laterally along the plane of the virtual surface 25. As discussed previously for normal modification, the tool 28 is first placed directly on the virtual surface 25, then embedded a certain distance toward the haptic interface location 98 depending on the removal rate. The sandpaper method places the tool 28 directly on the virtual surface 25, then restricts the tool 28 to moving along a plane defined by the normal at the virtual surface 25.

Thus, the desired direction (that is, a vector from the tool 28 to the haptic interface location 98) is projected onto the plane, and the tool 28 is moved in that direction. Then the removal is performed based on the movement of the tool 28.

Pull Mode

Pull mode is an interaction mode that reverses the virtual surface 25 and binds the user inside the virtual object 26.

In one embodiment, using a voxel approach where the maximum density is represented by 255 and the minimum density is represented by 0, all density evaluations become invented to 255 minus the pre-inverted value. Thus, empty space (0) becomes maximum density space (255), and vice versa. The effect is that the haptic rendering process 16 calculates the tool 28 interaction with the inside of the virtual object 26 instead of the outside.

All removal and addition methods work effectively in pull mode. However, adding material in this mode feels to the user as if she is pulling the virtual surface 25 outward. Likewise, the feel for removing material is the opposite. Thus, when in pull mode, all methods are reversed. The force effects for removal become those that the user would otherwise feel when normally adding. Likewise, the force effects that the user feels while normally adding would be used for pull removal. In one embodiment, the user feels a 3-D friction force while adding. Thus, in pull mode, the user feels this friction force while removing.

Non-Cutting Tool Geometries

Portions of a tool may be declared to be non-cutting. This means that they may be used to feel the object or limit the tool motion, but they do not actively modify the virtual object. For example, consider a sphere tool with a plane through its center, with the sphere declared as cutting and the plane declared as non-cutting. In this example, the user could only embed the sphere in the material until the plane touched the material, limiting the cut. Another example of this is "outriggers," where the non-cutting portion flanks the cutting portion of the tool.

Figure 23A:
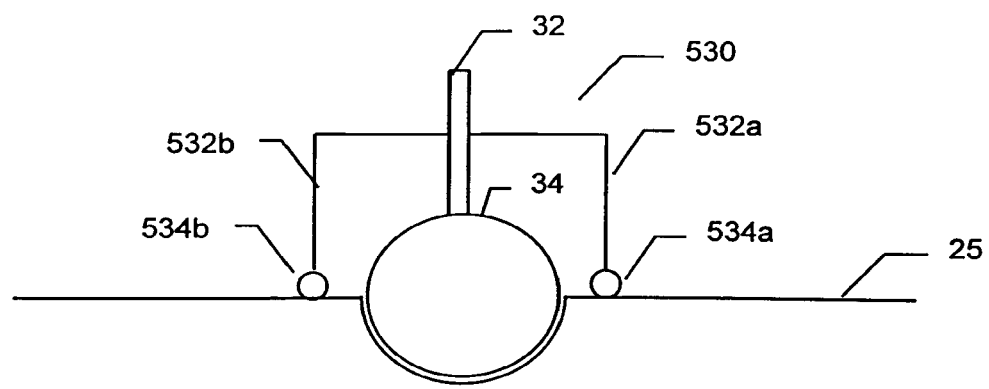

FIG. 23A shows an outrigger construct 530 including arms, shown generally as 532, and outriggers, shown generally as 534, connected to the handle 32 of the sphere 34 of a virtual tool 28. When used in a modification mode, such as sandpaper, the user may use the virtual tool 28 to remove material from an object 26 at a prescribed depth only. The depth of material removed is determined by the position of the outriggers 534*a*, 534*b* where they touch the virtual surface 25 of the virtual object 26. That is, the sphere 34 is allowed to penetrate the virtual surface 25 and remove material from the virtual object 26, but the outriggers 534*a*, 534*b* are not allowed to penetrate the virtual surface 25. The outriggers 534*a*, 534*b* are attached to the handle 32 of the virtual tool 28 by rigid arms 532*a*, 532*b*. The rigid arms 532*a*, 532*b* thus limit how far the sphere 34 of the virtual tool 28 penetrates the virtual object 26 and how much material the modification process 20 removes. The user can adjust the length of the rigid arms 532*a*, 532*b* to adjust the depth of penetration of the sphere 34 into the virtual object 26. In one embodiment, the outrigger approach is implemented using one rigid arm 532 and one outrigger 534 (not shown in FIG. 23A). In further embodiments, more than two arms and outriggers are used (not shown in FIG. 23A). The outrigger approach is not limited to a virtual tool 28 having a handle 32 and sphere 34, but may also be applied to a virtual tool 28 having other geometric shapes.

Figure 23B:
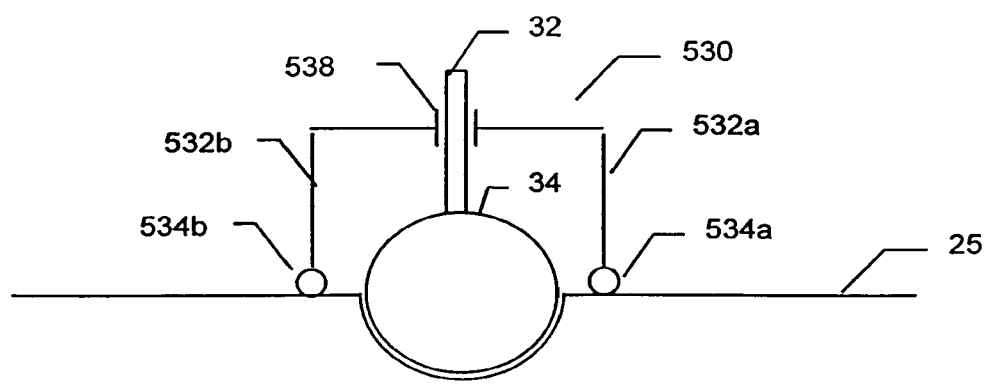

FIG. 23B depicts an outrigger construct 530 showing the rigid arms 532*a*, 532*b* connected to the handle 32 of the tool 28 by a slip ring 538, for one embodiment of the invention. The slip ring 538 provides for some slippage, by a predetermined factor, of the outrigger construct 530 as the sphere 34 penetrates the virtual surface 25 of the virtual object 26. The user feels resistance as the slip ring 538 slides along the handle 32, as the sphere 34 is allowed to penetrate further into the virtual object 26. Typically, the resistance provided by the slip ring 538 is a constant resistance force as the sphere 34 moves into the virtual object 26.

Figure 23C:
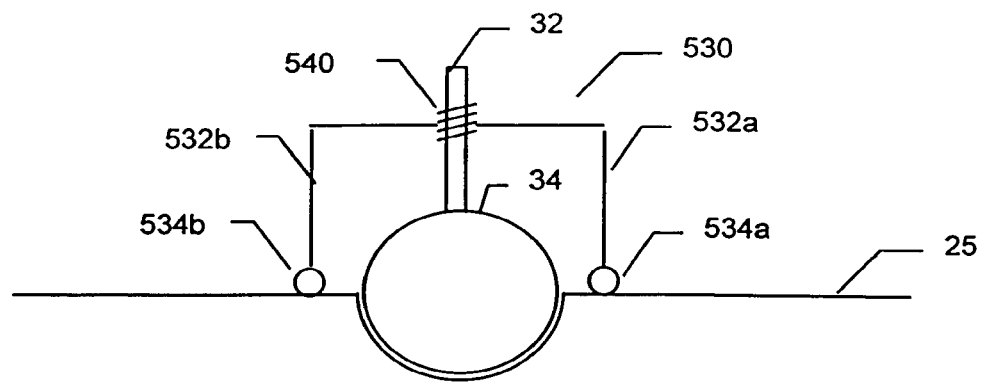

FIG. 23C depicts an outrigger construct 530 connected to the handle 32 by a spring 540, for one embodiment of the invention. The user feels a spring-based feedback force from the spring 540 that indicates how far the sphere 34 is penetrating into the virtual object 26. In other words, as the tool 28 penetrates farther into the virtual object 26, the user feels an increasing resistance to movement into the virtual object 26 due to the feedback from the spring 540.

Figure 23D:
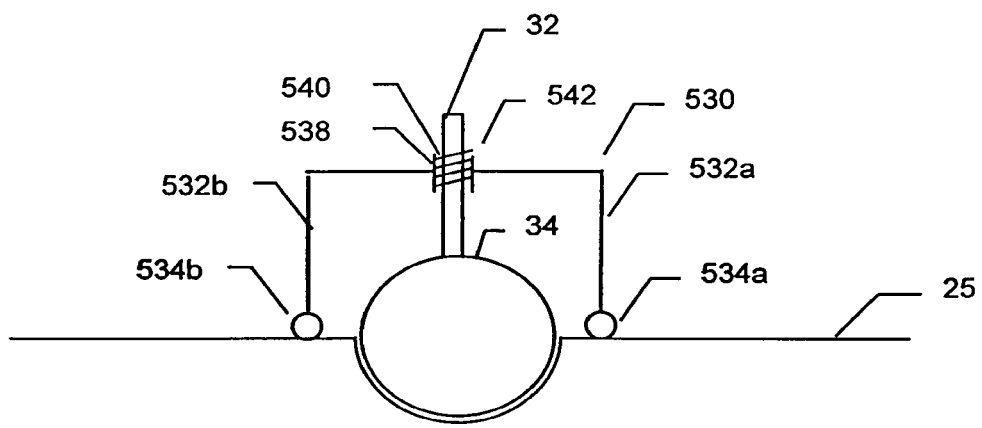

FIG. 23D depicts an outrigger construct 530, showing a combination connector 542 of a spring 540 and slip ring 538, for one embodiment of the invention. In this embodiment, the combination connector 542 provides a springlike feedback force of increasing resistance to penetration of the virtual object 26 until a predetermined limit is reached, and then the combination connector 542 slips along the handle 32 in a slip ring 538 effect. In one embodiment, after the predetermined limit is reached, the user feels a steady resistance to further penetration into the virtual object 26, as the slip ring 538 effect continues. In another embodiment, this slippage is for a predetermined distance, and then the combination connector 542 restores a springlike effect.

Smoothing

Smoothing blurs large features and eliminates some smaller features on a virtual object 26. The resulting appearance of the virtual surface 25 of the virtual object 26 is similar to the appearance of a wax model that has been partially heated. Smoothing is important for removing bumps and small undesired detail.

Smoothing can be applied to portions of the virtual object 26, or the virtual object 26 in its entirety. The user selects a region of the virtual object 26, which is indicated by the region being highlighted (that is, drawn) in a different color.

In one embodiment, the user paints the virtual surface 25 of the virtual object 26 with the virtual tool 28 as a way of selecting the region of the object 26 to be smoothed.

In one embodiment using the voxel approach, selection smoothing works by allowing the user to paint an area on the virtual object 26 to be smoothed. FIG. 24 illustrates a two dimensional view of a grid 489 of voxels 78, showing a painted area 493 of the surface 86, corresponding voxels 495 that correspond to the painted area 493, and a selection volume 497 of voxels 78 including ramp. The selected area 493 is then smoothed at the voxel level and an isosurface 86 is recomputed from the new voxel values. The set of voxels spanning the isosurface 86 and voxel ramp corresponding to the area selected become the selection volume 497. The selection volume 497 is then filtered through an N×N×N kernel in three separate, one dimensional passes. Each successive pass uses the results from the previous pass to accumulate the final resulting voxel values. Each source voxel in the selection volume 497 is filtered using a kernel of size N, where each element of the kernel can vary according to the smoothing result desired. A kernel of size N results in the source voxel being filtered against N/2 (rounded to the nearest integer) voxels 78 in each dimension, X, Y, & Z.

The resulting filtered selection volume 497 is then copied back into the source volume and a new isosurface 86 is computed using the new voxel values. The number of voxels 78 remains constant in the volume, but the distribution of voxel values may change, resulting in either more or fewer surface triangles in the resulting isosurface 86.

Higher smoothing levels correspond to an overall smoother shape and a loss of detail in finer features, whereas lower smoothing levels correspond to less loss of detail and a more localized smoothing effect.

Geometric Constraints

The haptic rendering process 16 may constrain or limit the motion of a tool 28 along one or more degrees of freedom using a force feedback approach. Constraints may take the form of geometric entities, equations, rules, or other methods of defining a restriction to tool motion. For example, a rule might state that the tool may only remove a certain amount of material per cut invocation. Another example of limiting tool motion is a rule or equation which states that the motion of the virtual tool is to emulate the motion of the haptic device in physical space, but as a reduced "gain" for example, reducing the amount of motion by a factor ten. Tool constraints may limit the ability of the tool 28 to move, translate, and or rotate in virtual space. In addition, geometric constraints may be associated with point, line, curve, surface, or space representation. For example, FIG. 25 illustrates a virtual tool 28 moving through a virtual object 26, but constrained by a geometric constraint, which in this case is a curved line 550 to move in a direction indicated by vector 552. For example, the user may be using the tool 28 to remove material from the virtual object 26, but wishes to remove the material in only a certain manner. Therefore, she sets a geometric constraint, such as the curve 550 shown in FIG. 25, that limits how the tool 28 moves, thus affecting what material is removed.

Geometric constraints can either restrict the user's movements by "holding" her on the geometry or by blocking her from the geometry. For an example of a blocking constraint, consider a person who moves her fingertips along a tabletop, with the result that the fingertips are constrained only to move along the plane of the table. The fingertips may be lifted off of the table, but they cannot be go through the table. For a virtual tool 28 limited by a blocking constraint by a plane, the haptic rendering process 16 allows the tool 28 to touch the plane and move away from it, but does not allow the tool 28 to penetrate the plane.

An example of a hold constraint is one that keeps the fingertips on the table top, but would not allow the fingertips to move off of the tabletops. For a virtual tool 28 limited by a hold constraint to a plane, the haptic rendering process 16 allows the tool 28 to touch the plane, but does not allow the tool 28 to penetrate it or move away from it depending on whether the constraint is permeable or not, as discussed below. In one embodiment, the user receives a force feedback impression that the tool 28 is "stuck" to the geometric constraint, in this example, the plane. Referring to FIG. 25, if there is a hold constraint to the curve 550, the user is given the feeling that the tool 28 is stuck to the curve 550.

Geometric constraints may also optionally have a force-field surrounding them. For example, a hold constraint might "pull" a user onto it when they are near it. Or a block constraint might push the user away as they approach it.

Geometric constraints are permeable or nonpermeable. For a permeable constraint, the user may make the tool 28 break through or break away from the constraint by applying a force beyond a threshold. That is, if permeable, the user can set the geometric constraint to be penetrated by the virtual tool 28, for example, with a sufficient exertion of force by the user. A nonpermeable constraint does not allow any departure from the limitations that they impose on the position or orientation of the tool 28.

Constraints can also be placed interactively by using the haptic interactive device 10, with the user feeling a force feedback effect when doing so. Thus the user can place a geometric constraint at or within a virtual object 26 using the haptic interactive device 10. The user then uses the haptic interactive device 10 to control a virtual tool 28 to modify the virtual object 26, with the movement of the virtual tool 28 limited by the geometric constraint. In another embodiment, the user makes a constraint, such as by using the virtual tool 28 to inscribe a slight groove in the virtual surface 25 of a virtual object 26. The user then uses this groove as a geometric constraint, when using the virtual tool 28 to enlarge the groove to make a larger indentation in the virtual surface 25 based on the shape of the groove.

In one embodiment, the virtual constraint can take the shape of any geometric shape, including a previously generated virtual object or portion of a virtual object. Virtual constraints derived from virtual objects are referred to herein as bucks. Bucks may be visibly distinct from the virtual object being carved. Bucks can be particularly useful for sculpting product designs that must contain certain objects within. For example, if a toy is to contain batteries, the designed can introduce bucks that represent the batteries into the virtual environment, thereby limiting himself to sculpt only portions of the virtual object that lie outside of the volume of the batteries. Because the bucks make the region of the model occupied by the batteries unsculptable, the design sculpted by the designer is guaranteed to contain a volume large enough to enclose the batteries.

Portions of the virtual object being sculpted can also be designated as virtual constraints, using the painting selection method described previously for smoothing. Regions of the model that are painted by the designed are thereby designated unsculptable. This feature prevents accidental modification of finished portions of a virtual object, while allowing modification of unfinished portions of the virtual object.

In an embodiment that uses voxels, each voxel has a flag which represents sculptable or unsculptable. Bucks are achieved by setting this flag to unsculptable for each voxel that lies within the region or shape of the buck. This modification process will not substantially alter the value of the voxels designated as unsculptable.

In one embodiment, the tool 28 is constrained based on the constraint geometry, the position of the virtual object 26, the position of the virtual tool 28, and the haptic interface location 98. In another embodiment the tool 28 is also constrained by the virtual surface 25. For example, if a user, is removing material from a virtual object 26, the user feels a force feedback or drag when moving into the object 26 and removing material. In addition, if the virtual object 26 is constrained by an impermeable hold constraint, as in FIG. 25 to a curve 550, then the user also feels a force feedback that makes the user feel that the virtual tool 28 is stuck to moving only along the curve 550. The user is allowed to remove material in the virtual object 26 when moving along the curve 550, but is not allowed to move away from the curve 550 and to remove material elsewhere in the virtual object 26 in an area where the virtual tool 28 is not touching the curve 550.

FIG. 26 is a flowchart illustrating the process of using a geometric constraint to constrain the virtual tool, for one embodiment of the invention. First, the user generates an initial or starting virtual object 26 having a virtual surface 25 in a haptic virtual environment (step 600). The user then selects a geometric constraint that determines how a virtual tool 28 will be constrained when it moves in the haptic virtual environment (step 602). A virtual tool 28 is determined or generated in virtual space that represents the haptic interface device 10 that the user is manipulating in real space (step 604). In one embodiment, the haptic rendering process 16 generates the virtual tool 28. In step 606, sensors determine the location of a user or designer in real space. In one embodiment the user is manipulating a haptic interface device 10 and sensors determine the location of the haptic interface device 10 in real space.

The modeling application 12 then determines a haptic interface position 98 in the haptic virtual environment that represents the location of the haptic, interface device 10 in real space (step 608). The modeling application 12 then determines a proposed position of the virtual tool 28 in the haptic interaction space in comparison to the haptic interface location 98 and the location of the virtual surface 25 (step 610). Next the modeling application 12 determines if the proposed position of the virtual tool 28 penetrates the virtual surface 25 (step 612). The modeling application 12 constrains the action of the tool 28 based on the constraint geometry, the virtual surface 25, the position of the virtual tool 28, and the haptic interface location 98 (step 614). In one embodiment, the modeling application 12 constrains the translation or rotation of the tool 28. In another embodiment, the haptic rendering processor 16 constrains the action of the tool 28. If the tool 28 does not penetrate the virtual surface 25, the process checks the location of the user in real space (step 606) to determine if the user has moved the haptic interface device 10, thus causing a change in the haptic interface location 98 (step 608). If so, steps 610 and 612 are repeated.

Virtual Object Orientation

The user can interactively change the position and orientation of virtual objects 26 during evaluation and modification operations. In one embodiment, the user uses a 1 DOF (degree of freedom) or greater input device such as a mouse or trackball to directly affect the position and orientation of the virtual object about an arbitrary point. In one embodiment the user uses the input device using the non-dominant hand. In another embodiment, the user uses a 1-DOF or greater haptic device, such as a haptic interface device 10, to directly affect the position and orientation of the virtual object about an arbitrary point. In a further embodiment, the user uses keyboard commands to directly affect the position and orientation of the virtual object 26 about an arbitrary point. While manipulating the virtual object with the non-dominant hand, the user has the option of making modifications with the virtual tool. That is, while the virtual object is in motion, whether through active manipulation or some other means such as an inertia effect, modification may be effected with the virtual tool either in motion, or in a stationary position.

Virtual Control Wheels

In one embodiment, the user also uses one or more virtual control wheels 586 to control the orientation of the virtual object 26. FIG. 27 shows a virtual object 26 controlled by a control wheel 586 and a virtual lathing tool 588. The user uses any virtual tool 28 to touch and move the control wheels. In one embodiment, the user uses a virtual lathing tool 588 to modify the virtual object 26. The user uses the virtual lathing tool 588 to remove material, in a manner similar to a cutting wood on a physical lathe, as shown in FIG. 27. The user can also add material to a virtual object 26. In addition, the user can start the rotation of the control wheel 586 and add material from a virtual tool 26 when acting in an extrusion, addition, or "toothpaste" mode. In this case, the added material may form a circular or spiral shape as extruded from the virtual tool 26 into the rotating space controlled by the control wheel 586.

The control wheels 586 control the orientation of the virtual object 26 about an arbitrary axis. FIG. 27 shows the control wheel 586 controlling the rotation of a virtual object 26 about a vertical or z axis. In one embodiment, the user can use control wheels 586 to control the rotation of a virtual, object 26 about the x axis and the y axis also. In one embodiment, the user can use control wheels to control the rotation of the virtual object 26 about two or more axes at the same time. For example, the user uses two control wheels to cause the virtual object 26 to rotate about the x axis and z axis simultaneously and use a virtual lathing tool 588 or other virtual tool 28 to modify the virtual object 26 while it is rotating about two or more axes.

The control wheels 586 may have properties associated with mass, damping, surface compliance, and friction.

In one embodiment, the control wheels 586 are programmed to stop as soon as the user stops interacting with them or to continue rotating, (that is, much like a physical lathe) until they are explicitly stopped.

In one embodiment, the user rotates the control wheels 586 without constraint. In another embodiment, the user constrains the rotation to an angular extent.

In one embodiment, the control wheels 586 have haptically sensible "indentations" associated with their rotations, much like some real world, physical rotary knobs.

3-D Sketch Modeling

The 3-D sketch system is a system that allows rapid and intuitive creation of 3-D shapes. These shapes are generated from planar sketches. The user of the 3-D sketch software sketches outlines or profiles of the shape they desire from different views of the object 26 (for example top, right and front views). These sketches are then used to "cut" the desired shape out of a virtual block of material or virtual object 26. In one embodiment, the user creates the outline sketches on construction planes, referred to generally as 700 (see FIG. 28A). The user can feel and manipulate the planes 700 using a 3-D force feedback device or haptic interface device 10. Through the haptic interface device 10, the user controls a virtual drawing tool 690 which, in one embodiment, can be a pen used to feel and create sketches on the planes 700. In one embodiment, the virtual drawing tool 690 includes a longitudinal portion or handle 692 and an end 694. In another embodiment, the end 694 includes a drawing point used to create the sketch 702. In one embodiment the haptic interface device 10 is a stylus with a switch or button on a forward part of the stylus where it can be readily pressed by one of the user's fingers. In another embodiment, the end 694 of the virtual drawing tool 690 is a virtual hand used to feel, select and manipulate one or more planes 700 and the block of material or virtual object 26. However, in other embodiments the user can use the 3-D sketch approach without any force feedback effect. That is, the 3-D sketch system does not require a force feedback approach.

The process is similar to creating models with blue foam and a hot wire, although there are a number of ways in which the 3-D sketch system can do more than the physical process. Generally, when designers create blue foam models they create sketches that they attach to the faces of a block of blue foam. They use these sketches to guide the hot wire as it cuts through the block of blue foam. For any given cut, they use only one sketch. In one embodiment of the invention, in addition to placing sketches on the outside of the block, the user can also place sketches in the interior of the block 26. The user can also place any number of sketches along a given axis.

The 3-D sketch system interpolates between those sketches to create a smooth shape. Typically, this cannot be done in physical blue foam. The 3-D sketch system also allows the user to create sketches with holes in them and to use initial shapes other than a block. The other advantages include having easy undo and redo functions and having a virtual object 26 as a digital version of the model that can be passed on to CAD/CAM programs, rapid prototyping machines, etc.

FIG. 28A illustrates an initial block of virtual material 701 overlaid by construction planes 700a, 700b, 700c, 700d, aligned along an axis 703 and a sketch 702 on the top surface of construction plane 700a. In one embodiment, the starting block of virtual material 701 is a virtual object 26, as described previously. In the embodiment shown in FIG. 28A, the construction planes 700 occupy the same space as the starting block of virtual material 701; that is, the planes 700 overlay the same space as the starting block 701: In other embodiments, the construction planes 700 occupy a larger or smaller space than the virtual object 26. In another embodiment, only a starting construction plane 700a and an ending construction plane 700d connected by an axis 703 need be used. In another embodiment, an ending construction plane 700d is not required. In a further embodiment, all that is required is a starting construction plane 700a with a sketch 702 on the plane 700a.

If several construction planes are provided along one axis 703, they form a stack 718 of construction planes 700. In one embodiment, the construction planes 700 are aligned along an axis 703. In one embodiment, the axis 703 may be positioned at any orientation relative to the initial block of material 701. In one embodiment, the user draws the sketch 702 on the top construction plane 700a using the haptic interface device 10. In another embodiment, the user places a previously created sketch or 2-D design on the construction plane 700a. There is no requirement that the sketch 702 be placed on a top or outermost sketch plane 700a, and the sketch 702 may be placed on any construction plane 700a, 700b, 700c, 700d. There is no requirement that the virtual object 26 be a box-like or rectilinear shape, as shown in FIG. 28A. The starting block of material of the virtual object 26 can be any suitable shape that the user finds useful.

FIG. 28B illustrates a cutaway or resulting block of material 704 based on the sketch 702. The user invokes a cutting or "cut outside" operation based on the sketch 702 to produce the cut block of material 704. FIG. 28C illustrates a holed block of material 706 based on the sketch 702. In FIG. 28C, the user invokes a "cut inside" operation based on the sketch 702 to remove material to create a hole 708 in the resulting holed block of material 706. The result is not required to be a hole 708. For example, if the sketch extends to the edge of the construction plane 700A, then the result of the cut outside operation could be a substantially U-shaped or otherwise open cavity.

FIG. 29A illustrates the cut block 704 of FIG. 28B overlaid with a block of potential material of the virtual environment 701, which is overlaid with a starting construction plane 710a, and ending construction plane 710b, and a sketch 712 on starting plane 710a. The user implements a create operation to create the union block of material 714 shown in FIG. 29B. The union block 714 includes horizontal portions 716a and 716b and a vertical portions 704a and 704b. The vertical portions 704a and 704b correspond to the cut block of material 704 shown in FIG. 28B. The horizontal portions 716a and 716b are determined by the sketch plane 712 on the starting construction plane 710a in FIG. 31A. The user can repeat the process described for FIGS. 29A and 29B for additional blocks of material 701 overlaid with additional construction planes 700 to add additional portions to the union block 714 to create an increasingly complex object. In one embodiment, the user can use a cut outside operation to put holes 708 or cavities in a cut block 704 or union block 714 to produce complex shapes with concave and convex surfaces, as well as cavities, holes, and protrusions of various shapes.

FIG. 30 provides a flowchart of the process of making a producing a modified virtual object or cut block of material 704 from an initial virtual object or starting block of material 701 without requiring any force feedback interaction. First the user selects or provides an initial virtual object 704 (step 730). Then the user provides an axis 703 that intersects the initial virtual object 704 (step 732). In one embodiment, the axis is oriented to intersect the initial virtual object 704 by default, as shown in FIG. 28A. In another embodiment, the user orients the axis 703 with a hand tool 792, as shown in FIG. 33B. The user then specifies or selects a starting construction plane 700 (step 734). In one embodiment, the 3-D sketch software provides one or more construction planes 700 with an axis 703 that intersects the initial virtual object 704. In one embodiment, the user does not need to specify or use any axis 703, but may use construction planes 700 only. In another embodiment the user aligns a stack of construction planes 700 to overlay the initial virtual object 701). The user then provides a two dimensional sketch 702 on the starting construction plane 700, such as plane 700a in FIG. 28A (step 736). The user may also place the sketch on some other plane, if more than one construction plane 700 has been selected or provided. The user may draw the sketch directly on a surface of the construction plane 700 using a drawing tool, such as a virtual drawing tool 690, or create the sketch in a separate drawing program and then move the sketch on the construction plane 700. The user then invokes an operation to apply the sketch 702 to the initial virtual object 701 (step 738). The 3-D sketch software then divides the initial virtual object 701 into a first and second portion by slicing the initial virtual object 704 based on the sketch 702 and the orientation of the axis 703 (step 738 continued). The user selects, or has selected previously, one selected portion of the two portions (step 740) and then the 3-D software creates a modified virtual object, such as a cut block of material 704 or a holed block of material 706, based on the selected portion of material (step 742). The user can then request output of the modified virtual object to a data storage medium, to a visual display, over a network, to a printed representation, or a 3-D physical model.

FIG. 31 provides a flowchart showing a process of producing a modified virtual object or cut block of material 704 from an initial virtual object or starting block of material 701 in a haptic virtual environment while providing force feedback to the user of the software. First the user selects a virtual tool 28, such as a virtual drawing tool 690, to use in the haptic virtual environment (step 750). For example, the virtual drawing tool 690 may appear as a virtual pen or pencil that the user can use to draw a sketch 702 on a construction plane 700. Then the user selects or provides an initial virtual object 704 (step 752). The location of the user in space is determined (step 754). In one embodiment, this location is the location of a haptic interface device 10, such as a stylus or pen, that the user is holding or manipulating in real space. Then the user or the sketch software orients an axis 703 that intersects the virtual object 701 (step 756). The user then selects a starting construction plane 700 that intersects the axis 703. (step 758). In one embodiment, the sketch software provides a starting construction plane 700 when the user selects a sketch mode. The user then provides a 2-D sketch 702 on the starting construction plane 700 (step 760). Typically, the user draws the sketch 702 directly on a surface of the construction plane 700 using the virtual drawing tool 690. In one embodiment, the software senses the position of the virtual drawing tool 690 and provides haptic or force feedback to the user as she draws the sketch 702. The force feedback aids the user in keeping the virtual tool 28 on the construction plane 700 when making the sketch 702. In addition, the force feedback provides feedback based on point, line, or circle drawing constraints. For example, when one drawing entity, such as a line, is close or aligned with another drawing entity, the user feels a haptic force feedback effect, which will be discussed in more detail later. The 3-D sketch software then divides the initial virtual object 701 into a first and second portion by slicing the stack of planes 700 based on the sketch 702 (step 762). The user selects, or has selected previously, one selected portion of the two portions (step 764), and then the 3-D sketch software creates a modified virtual object, such as a cut block of material 704 or a holed block of material 706, based on the selected portion of material (step 766), as described previously. The user can then request output of the modified virtual object to a data storage medium, to a visual display, to a remote location over a network, to a printed representation, or a 3-D physical model.

FIG. 32A illustrates an initial virtual object 701 with sketches 776, 778, and 780 on construction planes 700a, 700c, and 700d. FIG. 32B illustrates a modified virtual object 782 created by an interpolation process from the initial object 701 and sketches 776, 778, and 780. Referring to FIG. 32A, the user first places the sketch 776 on plane 700a, a different sketch 778 on plane 700c, and another sketch 780 on plane 700d. Then the user applies the sketches, 776, 778, 780 to the initial virtual object 701. The 3-D sketch software then interpolates among the sketches to produce the modified virtual object 782, which is composed of top portion 784 and bottom portion 786, as shown in FIG. 32B. A top portion 784 of the virtual object 782 is determined by interpolation between sketch 776 on plane 700a and sketch 778 on plane 700c. A bottom portion 786 of the virtual object 782 is determined by interpolation between sketches 778 on plane 700c and sketch 780 on plane 700d.

FIG. 33A depicts a virtual object 26 with starting construction planes 788 and 790 connected by an axis 703. The construction planes 788 and 790 are placed a distance from the virtual object 26 and are not required to touch or be contiguous with the virtual object 26. The user can draw a sketch 702 on the starting construction plane 788 and then apply the sketch 702 to the virtual object 26 to produce a cut block of material 704, a holed block of material 706 or union block of material 714 in a manner similar to what has been described previously. The user can move or rotate the axis 703, so that the axis 703 intersects the virtual environment at a different angle, as shown in FIG. 33B. In one embodiment, the starting construction plane 788 and ending construction plane 790 are connected in a rigid manner to the axis 703. The user can use a grasping or hand-shaped virtual tool 792 to grasp the axis 703 and rotate or move the axis 703 through the virtual space, thus causing the starting construction plane 788 and ending construction plane 790 to move in coordination with the axis 703.

Scene Graph and Nodes

One embodiment of the 3-D sketch approach is implemented by SensAble Technologies, Inc. of Cambridge, Mass., as described in the following sections. The 3-D sketch software relies on GHOST® SDK software from SensAble Technologies.

In one embodiment, the basic structure of the system is a GHOST SDK scene graph 840 made from three custom GHOST SDK nodes: the sketch block node 842, the plane stack node, referred to generally as 844, and the sketch plane node, referred to generally as 846. FIG. 36 illustrates a block diagram of a scene graph 840, including a sketch block node 842, plane stack nodes 844a, 844b, and sketch plane nodes 846a, 846b, 846c, 846d, 846d one embodiment, the sketch plane node 846 corresponds to the sketch or construction plane 700, and the plane stack node 844 corresponds to the stack 718, as illustrated in FIG. 28A.

In one embodiment, the sketch block node 842 is a GHOST separator node. The sketch block object 842 has a child node a GHOST shape node that contains both the starter shape and the volume representations for the current virtual object 26, as well as the graphic (polygonal) representations of the current virtual object 26. This child node is not shown in FIG. 36. All of the plane stacks associated with the virtual object 26 are stored as children nodes 844 in the GHOST scene graph 840 of this object. Therefore, by transforming this object, the user transforms the virtual object 26 and all of the sketch planes relative to the world reference frame.

In one embodiment, the plane stack node 844 is a GHOST separator node. The plane stack node 844 has as its children the sketch plane nodes 846 for the stack 844. The plane stack node 844 represents the stack 718 of construction planes 700 observed and manipulated by the user in the virtual environment. Transforming the stack 718 transforms the stack axis 703 and all of the sketch or construction plane nodes 846 in the stack node 844 relative to the sketch block node 842. The sketch plane children nodes 846 of a plane stack node 844 are always sorted by the position of the sketch planes 700 along the axis 703 of the plane stack 718.

In one embodiment, the sketch plane node 846 is a GHOST shape node. This node 846 represents a haptic rectangle or other shape that is "haptically transparent." The sketch plane node 846 contains a bitmap representing the grid and the pencil drawings in that plane 846 as well as a representation of the ink sketch in that plane 846. By transforming the sketch plane 846 relative to its parent stack 844 the user can change the position of the plane 846 along the axis of the parent stack 844.

As mentioned previously, there are two threads in the system—the servo loop thread running at 1000 Hz and the graphics thread running at approximately 30 Hz. In one embodiment, the servo thread is a high priority process and controls the force feedback that the user feels through a haptic interface device 10 (reading position and outputting force). In another embodiment, the user uses the 3-D sketch approach to modify virtual objects 26 without requiring any force feedback. The graphics thread does all of the graphic rendering and handles all the window events such as mouse, keyboard, and menu events. Creation and scheduling of the servo thread is handled by GHOST® SDK. In order for the force feedback to be stable and high quality, the servo thread must maintain its high rate of 1000 Hz. In order to do that, many costly operations that would otherwise be done in the servo thread are done in the graphics thread. The two threads have shared memory making communication easy via setting of shared flags etc.

Sketching

When the user touches a sketch plane 700 using a virtual drawing tool 690, the sketch plane 700 updates the pencil sketch or ink sketch 702 appropriately depending on the current tool 690 being used. The tool 690 may be either a pencil tool or an ink tool. The tool 690 is activated by touching the sketch plane 700 and depressing the stylus switch on the haptic interface device 10. The tool 690 remains active until the user lets go of the stylus switch or stops touching the plane 700.

Pencil

Pencil drawing is stored as a pixmap (pixel map) in the standard format for OpenGL texture maps. The grid that is drawn on the sketch plane 700 is also stored in this texture map. The texture map is a map of the surface texture including individual texture elements, or texels, that is associated with a graphic object. Initially the entire texture map is set to the background color except those texels that are on grid lines which are set to the grid line color. In one embodiment, the drawing and erasing of the texture map is updated at the servo rate (1000 Hz), although the updated texture map is sent to the OpenGL renderer at the graphics rate (30 Hz).

If the sketch plane 700 is touched while the stylus switch of the haptic interface device 10 is depressed while the virtual drawing tool 690 in pencil mode, the pencil draws. Drawing with the pencil involves changing the color of the texel currently being touched by the user to the pencil color. In one embodiment, the texture map is updated this way at the servo rate, although the updated texture map is sent to the OpenGL renderer at graphics rate (30 Hz).

If the sketch plane 700 is touched while the stylus switch of the haptic interface device 10 is depressed, the drawing tool 690 is in eraser mode, and the user is specifying they'd like to erase pencil marks, the nine texels forming a square around where the tool 690 is touching are erased. Erasing a texel involves setting it to either the background or the grid line color as needed.

Ink

Ink drawings are stored as geometric primitives (line segments, circles, arcs, freehand curves, and boxes). They are not rendered into the texture map as with pencil drawings. They are rendered using OpenGL line drawing routines overlapping the sketch plane 700 they belong to. In one embodiment, ink geometry is created and modified in the servo thread, but new geometry is added to the sketch 702 (the list of ink geometry for the plane 700) in the graphics thread. The servo thread signals the graphics thread that new geometry is to be added and the graphics thread adds it the next time it goes through the rendering loop.

Drawing

Ink drawing creates and updates the geometric primitives at the servo rate although they are redrawn at the graphics rate. During all drawing with the drawing tool 690 set to an ink mode, the user is constrained to the sketch plane 700 being drawn on. The constraint begins once the drawing tool 690 touches the plane 700 and the user depress the stylus switch on the haptic interface device 10 which activates the tool 690. The ink drawing tool 690 remains constrained to the plane 700 until the user lets go of the stylus switch at which point the tool 690 becomes inactive.

a) Line Segment

Line segments (also referred to as lines herein) are represented by their start point and endpoint. The user may use the drawing tool 690 set to a line drawing mode, which is also referred to as a line tool. When using the line tool, if the user touches the plane 700 with the drawing tool 690 while depressing the stylus switch on the haptic interface device 10, the point of first contact is stored. The start point of the line is set to this point. The end point of the line interactively follows the location (haptic interface location 98) of the haptic interface device 10 as the user moves the line tool around the plane 700. Once the user lets go of the stylus switch, the end point of the line becomes fixed at its last location.

b) Circle and Arc

Circles are represented as arcs by a center, radius, start angle and span angle. The user may use a drawing tool 690 set to a circle mode, which is also referred to as a circle tool. When using the circle tool, if the user touches the plane 700 with the stylus switch of the haptic interface device 10 depressed, the point of first contact is stored. The center of the circle is set to this point. The radius of the circle interactively changes as the user moves the circle tool in the plane 700 so that the circle passes through the point being touched by the user. Once the user lets go of the stylus switch on the haptic interface device 10, the radius becomes fixed at its last value. Initially the start angle is 0 degrees and the span angle is 360 degrees representing a complete circle. These angle values change if the circle is trimmed.

c) Box

A box is represented by two points: the top left corner and the bottom right corner. The user uses a drawing tool 690 set to a box mode, also referred to as a box tool. When using the box tool, if the user touches the plane 700 with the drawing tool 690 while depressing the stylus switch of the haptic interface device 10, the point of first contact is stored. The top left corner of the rectangle is set to this point. The bottom right corner of the rectangle interactively follows the location (haptic interface location 98) of the haptic interface device 10 as the user moves the box tool around the plane 700. Once the user lets go of the stylus switch, the bottom right corner of the rectangle becomes fixed at its last location. Once a box has been created, it is converted into four lines representing the sides of the box.

d) Freehand Curve

A freehand curve is represented by an ordered list of points. The curve is approximated by the line segments connecting the points. When using the drawing tool 690 set to a freehand curve mode, if the user touches the plane 700 with the drawing tool 690 and depresses the stylus switch on the haptic interface device 10, the point of contact is stored as the start point for the curve. As the user moves the drawing tool 690 in the plane 700, the current location (haptic interface location 98) of the haptic interface device 10 is added to the list of points for the curve each time the stylus is depressed and released (clicked). After each new point is added to curve, a spline curve is fit through the curve points. Any prior temporary curve displays are erased and the resulting smooth curve is displayed to the user as a temporary curve display reflecting the current state of the curve placement operation. After the user signifies that he is finished providing curve points (by typing the letter 'E' in one embodiment), the temporary curve display is erased and the ink mode sketch freehand curve is obtained by a spline curve fit through all the user provided curve points.

Snap-to Constraints

Snap-to constraints are implemented using a constraint effect. Snap-to constraints used on a sketch plane 700 in a 3D sketch mode should be distinguished from geometric constraints used in a 3D sculpting mode. The snap-to constraint effect can constrain the user to either a point, a line segment, a circle, an arc, a box, or a freehand curve. To determine which if any type of constraint to use, the 3D sketch software checks the current location of the user (haptic interface location 98) and the current geometry being created against the other geometry that is already in the sketch. If it finds a constraint condition, such as a parallel line or tangent circle, it sets the constraint effect appropriately. See FIGS. 34A-34D and 35, which are discussed below. Once a constraint is set it stays until the user moves out of the constraint condition. Since the constraint forces the user to remain in the constraint, she must effectively exceed a certain force threshold to leave the constraint.

When not drawing (stylus switch on the haptic interface device 10 is up) point constraints are set for the endpoints and midpoints of lines, the centers of circles, the center and endpoints of arc, the corner points of boxes and the start and end points of freehand curves. The user is constrained to a point as soon they are within a predetermined "snap radius" 806 of the point. See FIG. 34A. The constraint ends once they move out of the snap radius 806. Each point that the user can be constrained to has a circle with a radius equal to the snap radius 806 drawn around it.

When drawing lines all of the point constraints discussed above are active. In addition, if the current line being drawn is parallel to another line in the sketch, the user is constrained to move only along the current line until she pushes hard enough to move out of the constraint condition. The same is applied for lines in the sketch perpendicular to the line being drawn and for circles tangent to the current line being drawn.

When drawing circles all of the point constraints above are active. In addition if the circle being drawn is tangent to a line or circle in the sketch, the user is constrained to move only in the circle being drawn.

FIGS. 34A-34D and 35 illustrate these constraints in more detail. FIG. 34A depicts a virtual object 26 with a point constraint on a construction plane 800. On the sketch plane 800 is an existing line 802 that the user has previously drawn. The existing line 802 has an endpoint 804 and a snap-to area or radius 806. In one embodiment, the snap-to area 806 is a circle centered on the endpoint 804. In other embodiments, the snap-to area has other shapes than a circle or may have a 3 D shape such as a sphere or cylinder as will be discussed later. The user is drawing a new or current line 808. If the end 810 of the new line 808 touches the snap-to area 806, then the end 810 of the new line 808 snaps to and connects with the endpoint 804 of the existing line 802. In one embodiment, the user feels a force feedback reflecting the snap-to effect of the end 810 of the new line 808 being attracted to and snapping to the endpoint 804. The user uses a virtual tool 28, such as a virtual drawing tool 690, to draw or manipulate the new line 808 with a haptic interface device 10.

FIG. 34B depicts a virtual object 26 with a sketch plane 800 showing an existing line 802 and additional existing lines 812 and 814. The user is drawing a new line 816. Whenever this line 816 is parallel to the existing line 802, within a predetermined limit, then the new line 816 snaps to a position parallel to the existing line 802. In one embodiment, the existing line 802 and the new line 816 are highlighted when the new line 816 is in a parallel orientation to the existing line 802. The lines 802, 816 may be highlighted by a different color, different gray tone, different thickness, dotted manner, dashed manner, or other approach typically used to highlight lines. In one embodiment, the user feels a force feedback effect when the snap-to effect occurs as the user moves the new line 816 in different orientations using a virtual tool 28, such as a virtual drawing tool 690, to move the new line 816 into different positions. The user may also select an existing line, such as 814, and move it into a different orientation until line 814 becomes parallel to existing line 802.

FIG. 34C depicts a virtual object 26 with a sketch plane 800 showing an existing line 802 and additional line 814. The user is drawing a new line 818. Whenever this line is perpendicular to the existing line 802, within a predetermined limit, then the new line 818 snaps to a position perpendicular to existing line 802. In one embodiment, the user feels a force feedback effect when the snap-to effect occurs, as the user draws or manipulates the new line 818 with a virtual tool 28, such as a virtual drawing tool 690.

FIG. 34D depicts a virtual object 26 with a sketch plane 800 showing an existing line 802. The user is drawing a new circle 820. When the circle comes close to the existing line 802, the circle 820 snaps to the existing line 802, which thus becomes a tangent to the circle 820. In one embodiment, the user feels a force feedback effect when the snap-to effect occurs, as the user draws or manipulates the circle 820 with a virtual tool 28. Conversely, if the user is drawing a new line and it comes close to the circle 820, the line may snap to the circle and become a tangent to the circle 820 (not shown in FIG. 34D).

FIG. 35 depicts a snap-to area for a point 824, for one embodiment of the invention shown. The snap-to area is implemented as a 3-D cylindrical volume 828 centered on the point 824 and extending above and below the sketch plane 800. This cylindrical configuration 828 provides for a snap-to effect if the virtual tool 26 is somewhat above or below the surface of the sketch plane 800. Thus if the user is approaching the point 824 with a virtual tool 28 from above the plane 800, the user feels an attractive feedback force to the point 824 when the virtual tool 28 enters the cylindrical volume 828.

Editing (Pliers)

The pliers tool lets the user edit previously created geometry. The user uses a drawing tool 690 set to a pliers mode. When in pliers mode, if the sketch plane 700 is touched; the list of ink geometry in the plane 700 is searched to see if any of it is being touched. If no geometry is touched, nothing happens. If a piece of geometry is touched, it is highlighted graphically by drawing it in another color or using a dashed line, a heavier line, or some other highlighting effect. If geometry is touched and the stylus switch of the haptic interface device 10 is depressed, then the geometry is edited using a method specific to that type of geometry. All modification to geometry other than the freehand curve is done at the servo rate.

a) Line

A line can only be touched by the pliers if one of the lines endpoints is touched. If the user touches one of the endpoints and depresses the stylus switch of the haptic interface device 10, that endpoint tracks the location of the haptic interface device 10 until the stylus switch is released. Once the stylus switch is released the picked endpoint of the line is set to the last location (haptic interface location 98) of the haptic interface device 10.

b) Circle or Arc

If the user touches a circle or arc using the pliers and depresses the stylus switch of the haptic interface device 10, the radius of the circle or arc interactively changes as the user moves the pliers in the plane 700 so that the circle or arc passes through the point being touched by the pliers. Once the user lets go of the stylus switch the radius becomes fixed at its last value.

c) Box

Once the user draws a box in the sketch plane, it is converted to four lines representing the sides of the box. It is not edited as a box. Each line may be edited individually.

d) Freehand Curve

If the user touches a freehand curve using the pliers and depresses the stylus switch of the haptic interface device 10, the curve is modified by recalculating a spline definition that is identical to the majority of the original curve, but changes a local area around the point on the curve specified by the user so that the modified curve passes dynamically through the changing location of the haptic interface device 10. Then the stylus switch is released, the original curve is replaced with the last seen dynamic curve definition. The methods for dynamically modifying spline curves are well known to those skilled in the art of B-spline curves.

Erasing (Trimming)

The eraser has two functions. The user uses a drawing tool 690 in an eraser mode, also referred to as an eraser tool. If the user touches the sketch plane 700 with the eraser tool, depresses the stylus switch of the haptic interface device 10 and chooses one of the two functions (in one embodiment by applying a set amount of force), then pencil tool 690 marks where the eraser touches are erased (see above). The eraser also can function to erase ink geometry. If the user depresses the stylus switch on the haptic interface device 10 while touching ink geometry, then the geometry being touched is trimmed or deleted.

FIG. 37 provides a pictorial view of an open curve 850 to be trimmed. The open curve intersects a first line 852, a second line 854, a third line 856, and circle 858. The points of intersections between the open curve 850 and the other pieces of geometry, 852, 854, 856, 858 are marked by intersection points, T2, T3, T5, and T6. An eraser tool touches the plane 700 and the open curve 850 at point T4.

The trimming algorithm works as follows: First the geometry to be trimmed (trim geometry) is determined. In general the trimming is done by adding a new piece of geometry that represents the trimmed piece, and deleting the original piece of geometry (850). In this case, the open curve 850 is intersected with the rest of the geometry 852, 854, 856, 858 in the sketch and a list of intersection points is created as indicated by points T2, T3, T5, and T6. If there are no intersection points, then the trim geometry is simply deleted, otherwise it is trimmed. Let $p_{start}$ (T1) and $p_{end}$ (T7) he the start and end points of the trim geometry. The two closest intersection points T3 and T5 surrounding the point at which the geometry was touched T4 are found. If T3 is found then a new piece of geometry is added to the sketch. This new piece of geometry has start point T1 and endpoint T3. Similarly, if T5 is found, then a new piece of geometry is added to the sketch. This new piece of geometry has start point T5 and endpoint T7. The original trim geometry 850 is deleted, and the new pieces of geometry from T1 to T3 and from T5 to T7 are retained. Line segments, arcs, boxes, and freehand curves are trimmed according to this algorithm.

In the special case of a closed circle that has no start or end point, the process is similar. If there is only one intersection point then the whole circle is deleted. Otherwise the closest points to the touched point are found as above, the original circle is deleted and a new arc is added having the same center and radius as the circle but with end points such that the arc does not pass through the touched point. In addition to the above modifications to sketch entities, the user also has control to move, rotate, scale, and delete individual or groups of these entities. In one embodiment, these modifications include the constraints mentioned above. In another embodiment, these modifications are enhanced through haptic feedback.

In one embodiment, the 3-D sketch software does not support trimming of freehand curves. They are always deleted in their entirety. In another embodiment, the routines to calculate the intersection of a line with a freehand curve and the intersection of an arc with a freehand curve. In another embodiment, the trimming process is made faster by a spatial partition method (BSP tree or quadtree) on the curve points.

Selection of the trim object is done in the servo thread. The servo thread then signals the graphics thread that trimming must be done, and tells it which geometry to trim. The trimming itself is done in the graphics thread since it can be time consuming.

Mirroring

The mirroring user interface in 3 D sketch mode works as follows. The user can enable mirror mode either by selecting "enable mirror" or "place mirror." If the user selects "enable mirror," then the mirror line is either the last mirror line set for this plane 700 or the default mirror line if no previous mirror was created. If the user selects "place mirror" then the user draws the new mirror line in the plane 700—this also enables mirroring. Once mirroring is enabled, the user then selects the entities to mirror by touching them and depressing the stylus switch on the haptic interface device 10. Selected entities are highlighted in another color or some other highlighting mechanism. If the user touches an already selected entity and depresses the stylus switch of the haptic interface device 10, the entity is unselected and unhighlighted. When the user selects "execute mirror" all of the currently highlighted entities are mirrored using the current mirror line. Mirroring remains enabled until another tool is selected. In one embodiment, only ink entities are mirrored.

There are three parts to mirroring: placing the mirror line, selecting entities to mirror and executing the mirror. In one embodiment, placing the mirror line and selecting entities to mirror are implemented as separate tools. The user uses the tool 690 in a place mirror mode or a select entities mode, also referred to as a place mirror tool or a select entities tool.

The place mirror tool is the same as the line drawing tool except that the line drawn is not added to the sketch, and it is drawn in a different color. Otherwise placing the mirror line is exactly like drawing a line with the ink line tool and even the haptic constraints are enabled. The user does not have to explicitly place the mirror line. Every plane 700 has a default mirror line. Once the mirror line has been placed in a plane 700, that mirror line is stored, and the next time mirroring is enabled, it appears as the default mirror line.

The select entities tool searches the current sketch every time the user depresses the stylus switch of the haptic interface device 10 to see if any geometry is touched. A list of selected geometry is maintained. When geometry is touched, it is either added or removed from this list.

When "execute mirror" is selected each of the entities in the mirror list is mirrored by the current mirror line and the mirrored version is added to the sketch. Lines are mirrored by mirroring their endpoints. Circles are mirrored by mirroring their centers. Arcs are mirrored by mirroring their centers and then mirroring the start point of the arc and using that to calculate a new start angle (Similarly for end point and span angle). Freehand curves are mirrored by mirroring each of the points in the curve.

Selecting entities and adding/removing them from the mirror list is done in the servo thread. Executing the mirroring is done in the graphics thread.

Sketch Planes

Haptics

Haptically the sketch or construction plane 700 is represented as a rectangular shape in three dimensions or an infinitely thin rectangular box. The width and height of the rectangle are stored. It is defined in its own coordinate reference frame so that the normal of the plane 700 is the positive z-axis and the center of the rectangle is at the origin. The sketch plane 700 is implemented as a GHOST® SDK gstShape node; therefore it uses the basic GHOST SDK haptic model.

For each iteration of the haptic rendering process, a new SCP 226 is calculated based on the last SCP 224 ($SCP_{last}$) and the current position (P) or haptic interface location 98 of the haptic interface device 10, implemented in one implementation with the PHANToM® device from SensAble Technologies. First both of these points, SCP and P, are transformed into the planes coordinate reference frame. This means that a point is on the plane 700 if its z coordinate is zero. If both $SCP_{last}$ and P are on the same of the plane there is no collision and so SCP=P. If they are opposite sides of the plane 700 then P is projected onto the plane 700. Call this $P_{proj}$. If $P_{proj}$ is outside of the rectangle then there is no collision, so SCP=P; otherwise, there is a collision and SCP=$P_{proj}$.

When the user is not holding down a switch on the haptic interface device 10, the plane 700 is "haptically transparent". Haptic transparency means that, if the user pushes hard enough on the plane 700 with the stylus, then the virtual drawing tool 690 pops through the plane 700. This allows the user to interact with planes 700 and the virtual object that may be obscured by other planes 700. This is implemented by checking the distance between P and $P_{proj}$ in world coordinates. If this distance times the spring stiffness of the sketch plane 700 exceeds a force threshold, then the virtual drawing tool 690 has popped through. In this case no collision is reported, and SCP=P. If the threshold is not exceeded a collision is reported and SCP=$P_{proj}$ as above.

If the user depresses the stylus switch, then the sketch plane 700 is not set to be haptically transparent. This is done so that the user does not fall through the plane 700 while drawing or editing with the virtual drawing tool 690. In addition while the stylus switch is depressed, the haptic interface device 10 is constrained to the plane 700. Once the user touches the plane 700 while the stylus switch is down, the constrainToPlane flag is set. This flag is cleared when the stylus switch is released. As long as this flag is set, the sketch plane 700 always reports a collision and sets SCP=$P'_{proj}$ where $P'_{proj}$ is $P_{proj}$ moved to the appropriate edge of the rectangle.

If the user depresses the stylus switch and the plane 700 being touched is not the "touched" plane and some other plane is the "touched" plane (see selection below), it never reports a collision. This prevents the user from feeling other planes 700 through the force feedback received through the haptic interface device 10 that intersect the current plane while drawing.

All of the haptic calculations are performed by the haptic rendering process.

Selecting

There are two important concepts in the way selection is implemented for: the touched plane and the working plane (or last touched plane).

There can be only one touched plane at a time. If no plane is currently in contact with the haptic interface device 10, then there is no touched plane. In this case the first plane to come in contact with the haptic interface device 10 or virtual drawing tool 690 becomes the touched plane, and no other plane may become the touched plane until the current touched plane is no longer in contact with the virtual drawing tool 690. If the user depresses the stylus switch on the haptic interface device 10, only the touched plane will ever report a collision with the virtual drawing tool 690. This prevents the user from feeling other planes that intersect the current plane while drawing.

The working plane is the last plane that was set to be the touched plane. When no plane is currently in contact with the virtual drawing tool 690, there can be no touched plane but there can be a working plane. The working plane is highlighted and counts as the selected plane for operations such as clear plane, delete plane, cut plane, etc.

Both the touched and working plane are set in the haptic rendering process 16.

Moving

Sketch planes 700 are moved using the hand tool. In one embodiment, the hand tool is one end 694 of the virtual drawing tool 690. When the user touches a sketch plane 700 with the hand tool and the stylus switch is depressed, the plane 700 may be moved. The plane 700 is moved by transforming it along the z-axis of the parent plane stack 718 in the direction the haptic interface device 10 causing the virtual drawing tool 690 to move.

The force felt from moving a plane 700 and the new position of the plane 700 as it moves are calculated using a 3-D friction model. The model is that of dragging a massless block with the haptic interface device 10. When the user first touches the plane 700 with the stylus switch down, the position of the block is set to the position of the plane 700. When the haptic interface device 10 moves, a spring force is calculated between the current location or haptic interface location 98 of the haptic interface device 10 and the position of the block using Hooke's Law. If the spring force is below a predetermined threshold, then the block does not move and the spring force is sent to the haptic interface device 10. If the spring force exceeds the threshold, then the block is moved to a point some fixed distance from the haptic interface location 98 of the haptic interface device 10 along the line segment from the haptic interface device 10 to the block position. In this case, the force sent to the haptic interface device 10 has the same direction as the spring force but has the magnitude of the fixed force threshold. As the user moves the haptic interface device 10, the position of the plane 700 is set to that of the block in the simulation. The force effect that the user feels in the haptic interface device 10 gives the user the impression that she is dragging the plane 700 along. It also filters out the jitter in the human hand. In addition, the block is constrained to move only parallel to the axis 703 of the parent plane stack 718, and the haptic interface device 10 is also constrained to only move parallel to that axis.

All plane moving is done in the haptic rendering process 16. In one embodiment, plane moving this is done using a GHOST SDK manipulator node that allows the user to transform other nodes and send force to the haptic interface device 10.

Adding

In one embodiment, adding new sketch planes 700, means adding a new child sketch plane node 846 to the appropriate plane stack node 844. Adding a new child 846 into the scene graph 840 from the graphics process 22 while the haptic rendering process 16 is running can create synchronization problems. Removing the plane 846 in the haptic rendering process 16 while the graphics process 22 is running can cause the same problems. Creating a new plane 846 is a time consuming process that cannot be done in the haptic rendering process 16. The 3-D sketch software therefore does this in two parts. First the new plane 846 is created in the graphics process 22 and all of the parameters (width, height, stiffness, etc.) are set to those of the plane stack 844 that new plane 846 will be added to. Then the haptic rendering process 16 is signaled that a plane 846 must be added. The graphics process 22 then waits for the haptic rendering process 16 to add the plane 846 to the appropriate stack before trying to render the scene again. The haptic rendering process 16 adds the plane 846 and then signals the graphics process 22 it has completed.

Deleting

In one embodiment, deleting a sketch plane 700 consists of removing it as a child sketch plane node 846 from its parent plane stack 844. This cannot be done in the graphics process 22 so the haptic rendering process 16 is signaled and it removes the plane 846. The graphics process 22 waits for it to be removed from its parent 844 and then deallocates the memory.

Clearing

The user may clear either the ink, the pencil or both. Clearing a plane 700 consists of removing the list of ink entities (the sketch 702) and/or resetting the texels in the texture map to the clear color. This is done in the graphics process 22; however, a flag is set while the clear is happening so that the haptic rendering process 16 does not try to manipulate the sketch 702 or the texture map during a clear operation.

Cut and Paste

In one embodiment, only entire sketch planes 700 may be copied, cut, and pasted. To copy a sketch plane 700 a copy of the sketch 702 and the texture map are made and stored in the clipboard. A cut operation is equivalent to a copy followed by a clear. To paste the plane 700 to be pasted to has its sketch 702 set to a copy of the sketch in clipboard and its texture map set to a copy of the texture map in the clipboard. When the texture map in the clipboard is copied into the new plane 700, it is centered in the new plane 700 and clipped to the boundaries of the new plane 700.

Virtual Object Generation

The sketch planes 700 are used to generate a virtual object 26 or to modify an existing virtual object 26 or initial block of material 701. In one embodiment, the metaphor for generating a modified virtual object 26 is based on blue foam and a hot wire. The approach is to start with some initial shape in blue foam (starter shape) and then use the sketches to guide the hotwire to cut the piece of blue foam. In one embodiment of the 3-D sketch software, each plane stack 718 corresponds to one cut with the hotwire. The starter shape 701 is first cut based on the plane stack 718 along the x-axis, then the resulting shape is cut based on the sketch planes 700 along the y-axis and finally the result is cut by the sketch planes 700 on the z-axis to create the final virtual object 26.

With blue foam in the real world, the user can only cut one profile at a time, but in one embodiment of the 3-D sketch system, each plane stack 718 defines a single cut made up from multiple aligned sketch planes 700. The hotwire can be viewed as stretching and bending so that it passes through all of the sketches 702 on each of the planes 700 in the stack 718. In one embodiment, the 3-D sketch software interpolates between the sketches, such as 776, 778, and 780 in FIGS. 32A and 32B, to create a smooth shape that fits every sketch as if the hotwire bends and stretches between the different sketch planes 700. Each sketch 702 may be a different geometric shape, such as a square, circle, or irregularly shaped closed loop, and the interpolation technique provides for a substantially smooth surface connecting between each sketch 702.

Virtual Object Representation Using Voxels

In one embodiment, the virtual object 26 is represented as a volume using a voxel grid representation. Each voxel has a density value associated with it. The density values are interpolated between voxel grid locations using trilinear interpolation to create a continuous field as discussed previously. The virtual surface 25 of the virtual object 26 is the isosurface 86 of this field at a set value. In one embodiment, the density values range from 0 to 255 and the isosurface 86 used is 128. An algorithm is used to find a polygonal representation of the isosurface 86 which is used to represent it graphically. The algorithm may be any method commonly used to generate a triangular, polygonal, or mesh surface from a voxel or point representation of a geometric solid. Haptic representation of the isosurface 86 is done using the same methods as discussed previously for the 3-D sculpting system.

Generation of Distance Fields

In one embodiment, the 2-D distance fields used in the representation store the signed distance to a set of closed outlines.

FIG. 38 provides a pictorial representation of a sketch plane 700 showing a grid with a closed outline 870, vertical grid lines 872 and horizontal grid lines 874. Points on the closed outline 870, such as G3 have a value of 0. Points within the closed outline, such as G1 and G2, have a positive value, such as $2^{1/2}$ (1.414 . . . ) for point G1 and 1 for G2. In other embodiments, other positive values may be used for points G1 and G2. Points outside of the closed outline, such as G4 and G5, have a negative value, such as negative 1 for point G4 and negative $2^{1/2}$ for point G5. In other embodiments, other negative values may be used for points G4 and G5. The points shown, G1 through G5, are shown for representative purposes and other points on the sketch plane 700 may also be assigned positive or negative values based on whether the points are inside or outside of the closed outline 870. In one embodiment, the values are not required to be integer values.

A point is defined to be inside the outline 870 if the line segment from that point to the edge of the field intersects outline 870 an odd number of times. The field is represented by a 2-D evenly spaced grid, as shown by the gridlines 872 and 874 in FIG. 38. Each grid location has a scalar value for the distance. A continuous field is defined by using bilinear interpolation.

To create such a distance field from the sketch 702 in the sketch plane 700 takes two steps. First, a set of closed loops (outlines) 870 is found in the sketch 702 then the closed loops 870 are used to generate the distance field.

1. Finding Closed Loops

To find a single closed loop 870 in the sketch 702 one piece of geometry $G_{start}$ in the sketch 702 is selected at random and added to the list of geometry in the proposed closed loop. The rest of the geometry in the sketch 702 is searched for another piece of geometry $G_{next}$ such that the endpoint of $G_{start}$ matches either the startpoint or the endpoint of $G_{next}$. If $G_{next}$ cannot be found then the method fails. If $G_{next}$ is found then it is added to the list of geometry in the prospective closed loop and the method is repeated with $G_{start}=G_{next}$ until the endpoint of $G_{next}$ matches the startpoint of the original $G_{start}$ at which point a closed loop 870 has been found.

To find the set of closed loops 870 in a sketch 702 a single loop 870 is found, the geometry in the loop is removed from the sketch 702 and the method is repeated on the remaining geometry until there is no geometry left or no additional closed loop 870 cannot be found from the remaining geometry. If no closed loops are found, an error situation is reported to the user and she has the opportunity to correct the sketch.

2. Converting Loops to a Distance Field

The distance field value is computed in three stages. First the sign of the distance is computed at each point by deriving a bitmap showing object inclusion for each pixel value. Then absolute (unsigned) floating point distance is found. These values are combined into a signed distance, which is then scaled to the 0 to 255 byte values stored for the virtual object 26.

Algorithms for determining the interior and exterior of a set of closed loops in terms of a bitmask are well known to those skilled in the art. The typical approach is to use a winding rule algorithm to determine in the inside/outside state for each pixel in the bitmask. The inside/outside information is then readily converted to a sign of the distance for each pixel in the bitmask.

Next the method determines the unsigned floating point distance value. For each segment in each loop 870, the method identifies the shortest distance from the pixel to that segment. This nearest point may lay along the line segment, or at either end point. The minimum of all these per-segment distances gives the global minimum distance from the pixel to the outline set.

Multiplying the sign and value for each pixel gives a signed distance from each pixel to the outline set. Since the volume values are unsigned bytes, these floating point values must then be scaled to fit the range 0-255. This is done by linear scaling and clamping.

Generation of Single Stack Cut Volume

In one embodiment, the cut virtual object 704 for a stack axis 703 is generated by creating slices of it along its z-axis. In other embodiments, the x-axis or y-axis is used. In other embodiments, arbitrarily oriented axes are used. The z-axis of the cut virtual object 704 is set (via a coordinate system transformation) to coincide with the axis 703 of the plane stack 718. The slices are created either directly from the distance field of a sketch 702 or by interpolating between the distance fields of two different sketches 702. To create a virtual object 26 slice from a distance field is straightforward as long as the dimensions of the grid representing the distance field match the dimensions of the grid representing the volume slice. In one embodiment, all that needs to be done is to scale the values at the grid locations of the distance field into the appropriate range for the voxels in the virtual object 26.

First the distance fields generated from the sketches 702 in this stack are sorted by the offset along the z-axis of the plane stack 718 of the associated sketch plane 700. If there are no sketches 702 in this plane stack 718 then the cut virtual object 704 is "full." In one embodiment, every voxel is set to its maximum value. Otherwise the first distance field is converted into a virtual object 26 slice and copied into the virtual object 26 for each slice with a z coordinate less than or equal to that of the distance fields sketch plane 700. Then the last distance field is converted into a virtual object 26 slice and copied into the virtual object 26 for each slice with a z coordinate greater than or equal to that of the distance fields sketch plane 700. Finally, for each consecutive pair of distance fields d1 and d2 with z coordinates z1 and z2 respectively the slices of the cut virtual object 704 with z coordinate such that z1≤z≤z2 are set by linearly interpolating between the two distance fields. Specifically the slice with z coordinate z will be the linear interpolation of d1 and d2 with weights (1−t) and t respectively where t=(z−z1)/(z2−z1). Linear interpolation of the distance fields is done by linearly interpolating the corresponding scalar at the grid locations. Planes 700 with no sketch 702 on them are ignored during virtual object 26 generation.

FIG. 39 is a pictorial representation showing the interpolation process between a point $V_0$ on a sketch plane 880 and a point $V_1$ on a sketch plane 882 resulting in a new point $V_N$, with an interpolated valued derived from the values of $V_0$ and $V_1$, on an intermediate plane 884. $D_0$ represents the distance from sketch plane 880 to intermediate plane 884, and $D_1$ represents the distance from sketch plane 882 to intermediate plane 884. In one embodiment, the value of $V_N$ is determined by $$V_N = \frac{D_0 * V_1 + D_1 * V_0}{D_0 + D_1}$$

Typically, $V_0$ and $V_1$ represent the same point in the grid on each sketch plane 880, 882. In one embodiment the values of $V_0$ and $V_1$ represent the values on the density fields on each sketch plane 880, 882, as described above, that is, positive values if inside a closed loop 870 and negative values if outside of a closed loop 870. Thus if $V_N$ has a positive value, it is within a closed loop 870 on plane 884, and if $V_N$ has a negative value, it is outside of a close loop 870 on plane 884. If $V_N$ has a value of zero, then it is on a closed loop 870 in plane 884.

Combining a Starter Shape and a Cut Virtual Object Into Final Modified Virtual Object The starter shape 701 and cut virtual objects, such as 704, are basically combined by boolean intersection. For example, see FIGS. 29A and 29B. Since the scalar values of the virtual objects 26 are not limited to boolean values, however, the method uses a minimum operator instead of boolean AND. The process works as follows: First the current virtual object 26 is reset to that of the starter shape 701. Next each cut virtual object, such as 704, is intersected with the starter shape 701. For each grid location in the current volume $V_m$ the method finds the corresponding point in the local coordinate system of the cut volume $V_c$. Trilinear interpolation is used to find the scalar value of the cut volume at $V_c$ and finally $V_m$ is set to the minimum of the two values; that is, val($V_m$)=min(val($V_m$), val($V_c$)). This is done for each of the cut virtual objects 704 and the final result is what is left in the current virtual object 26.

Virtual Object Manipulation

In one embodiment, there are three ways to manipulate (rotate, translate and scale) the virtual object 26 and the sketch planes 700, based on a virtual hand tool, virtual object 26 manipulation with the mouse, and virtual object 26 manipulation with the keyboard, as discussed below.

In other embodiments, the axis of the plane stack is not confined to be a straight line (allowed to be a 3-D space curve). In other embodiments, any number of axes can be combined into a single user operation.

After the modified virtual object is produced, further modifications are possible. Further modifications include another application of the 3-D sketch operation, a mirroring operation, sculpting operations, change of orientation operations, or other operations applicable to the virtual object representation chosen.

Virtual Object Manipulation with Mouse

The mouse can be used to rotate, translate and scale the virtual object 26 and the sketch planes 700. When the user holds down the left button and the mouse moves, the virtual object 26 is rotated about the x and y axes. The difference in the last mouse location and the current mouse location is calculated. The virtual object 26 is rotated by some constant times the x component of the difference in mouse locations about the y-axis, and then rotated by the y component of the difference in mouse locations about the x-axis. When the user depresses the CONTROL key while simultaneously holding down the left mouse button, the virtual object 26 is rotated about the z axis by the x component of the difference in locations. When the user holds down the right mouse button, the virtual object 26 is translated in the x and z axes. When the user depresses the CONTROL key while simultaneously holding down the right mouse button, the virtual object 26 is translated in the z axis by the y component of the differences in mouse locations. When the user holds down the middle mouse button, the virtual object 26 is scaled up or down by a factor of some constant times the y component of the difference in locations. Typically, the user is performing these mouse functions with his non-dominant hand (e.g. the left hand for a right handed user), while using the force reflecting haptic interface in the dominant hand. In another embodiment, the user may hold a second force reflecting haptic interface, rather than a mouse, in the non-dominant hand to achieve these object manipulations more intuitively.

All of the mouse events are processed in the graphics thread but the virtual object 26 is transformed in the servo thread. The graphics thread stores the transformation to be done, and signals the servo loop that it needs to be done.

Virtual Object Manipulation with the Keyboard

The keyboard manipulation is implemented the same way as for the mouse. Instead of looking at the current and last mouse locations, pressing a key rotates/translates/scales the object by some fixed amount. As with the mouse, the key events are handled in the graphics thread and the transformations are carried out in the servo thread.

Import of Surface Objects

In one embodiment, in addition to reading in starter shapes 701 represented in the voxel format, the system has the ability to read in objects represented as polygonal meshes and convert them into GHOST, volumes to be used as initial or a starter shapes 701.

The first part of import is triangularization. The surface must be converted into a collection of triangles. Currently supported such as STL (stereolithography) are triangle-based to start with, so the files can be imported with appropriate readers. For curved objects such as NURBS, a discrete set of approximating triangles have to be generated.

In one embodiment, once the collection of triangles has been defined, it is converted into a 3-D signed distance virtual object 26. This is conceptually similar to the loop rasterizing discussed above, but the more complex primitives (triangles vs. line segments) and need for greater optimization make the algorithm considerably more involved. For a detailed discussion, see Bradley Payne and Arthur W. Toga, *Distance Field Manipulation of Surface Models*, IEEE Computer Graphics and Applications, Vol. 12, No. 1, January 1992, pp. 65-71. A brief overview will be given here. As in the 2D case, the algorithm works by combining a sign only volume (bitmask) with an undersigned absolute value distance to obtain a signed distance.

Bitmask Computation

In one embodiment, the bitmask classifies each point in the voxel grid as inside or outside the object. The method does not have to be concerned about the case of a point lying exactly on the surface, since the bitmask just determines the sign of the distance, and +0 and −0 are the same value. The bitmask is computed slice by slice, where each slice in the volume is a 2-D image. For each of these images, the plane of the image is intersected with the surface model. Since the surface model is a collection of triangles, each triangle can produce point, line segment, triangle or the empty set when cut by a plane. The triangle case only arises when the image plane is coincident with the triangle plane, so the method rules out this degenerate case by perturbing the vertex locations very slightly as needed so none lie exactly on the image planes. The remaining allowed intersections give a collection of closed loops 870 exactly equivalent to the ones used for 2-D distance field computation described above. The method derives the bitmask from the loops 870 the same way as described above.

Distance Computation

In principle, the absolute distance could also be found analogously to the 2-D case: for each triangle, the method finds the minimum distance from the triangle to the voxel location. The method takes the minimum of all these minima as the absolute minimum distance. In practice, this would be slow, so several optimizations are implemented.

Bounding Box Hierarchy

By storing the triangles in a tree of bounding boxes, the method avoids unnecessary computation. The method refine a list of boxes to include only the ones which could potentially include the nearest point, then "open" (that is, inspect the triangles) only for those boxes which survive this initial pruning.

Precomputation

Since the same triangles will be dealt with over and over, the method precomputes as much as possible of the information which will be used to get the point-to-triangle distance.

Minimal Computation

In one embodiment, since the 3-D distance field will ultimately be stored as byte values with values of 0 or 255 for all locations a substantial distance from the isosurface 86, the method can use the bitmask volume to identify only those voxels near enough to the surface to have a meaningful distance field value. The method computes only those distances, and assigns 0 or 255 directly to values which would be clamped anyway.

Mirroring

Using mirroring, the user can create virtual objects 26 that are symmetric about a plane. Since most modeled virtual objects 26 are at least partially symmetrical, this capability is frequently useful. The stages of mirroring are selecting the mirror plane, editing in mirror preview mode (soft mirroring), and executing the mirror operation (hard mirroring), as discussed in more detail below.

Mirror plane selection involves choosing a plane in space and an orientation, where the orientation specifies which side of the plane is considered primary and which is the mirror image. Such an oriented plane can be specified as a 4-tuple (a, b, c, d) such that $a*x+b*y+c*z+d=0$ on the plane, exceeds zero for the primary half-space, and is less than zero in the mirror image half-space. A plane selection tool is provided. When this tool is active, the user can use the plane selection tool to determine the orientation of the mirror plane interactively by fitting a plane through the tool position with the normal along the orientation of the stylus of the haptic interface device 10. The position of the plane is optionally displayed visually by a grid, and can be inferred from the of the virtual object 26 appearance in a preview mode. After the plane is selected, the corresponding transformation is derived. This transformation is the matrix which maps any point in space in the primary half-space to its mirror image point on the other side of the plane.

Mirror preview mode allows interactive sculpting with the appearance of real-time mirroring. In this mode, the virtual object 26 itself is unmodified; only the visual rendering of the virtual object 26 changes. During sculpting operations in this mode, the sculpting tools 28 interact with the underlying virtual object 26 in their usual manner. When the scene is drawn, the portion of the virtual object 26 lying in the primary half-space is shown in the normal (e.g., gray) color. Rendering of this portion is clipped against the mirror plane. The mirror matrix is then used while drawing the virtual object 26 a second time in the mirror image half-space, clipping rendering to the other side of the mirror plane. The object color is also modified (e.g., blue) during this operation. The effect is the appearance of real-time object mirroring. Each sculpt operation occurring in the primary half-space is visible at its point of application and again in the reflected object. During mirror previewing, the scene shown is always completely symmetrical about the mirror plane.

Mirror previewing can be ended by disabling the mirror or by executing the mirror. If the user disables the mirror, the true underlying virtual object 26 is shown again and the mirrored area disappears. If the user executes the mirror, the virtual object 26 itself is modified to reflect the desired symmetry.

Hard mirroring is the execution of mirroring inside the virtual object 26. Each voxel in the mirror image half-space is replaced by a voxel derived from its reflected point in the primary half-space. Since the reflected point does not in general lie on the voxel grid, the value is derived by trilinear interpolation from the adjacent voxels. Surface information is then recomputed for the modified portion of the virtual object 26. After hard mirroring, the plane is inactive and no longer displayed (however, its last known position is remembered for subsequent mirroring operations if desired); the virtual object 26 is symmetrical about the plane unless additional, non-mirrored sculpting is done subsequently.

Glossary

Constraint
An imposed limitation on the motion of the virtual tool 28.

Density
A scalar property of each single voxel 78, used for defining the shape of a virtual object 26 in one embodiment.

Density Threshold Value
In one embodiment, the density value which defines the isosurface 86 which represents the virtual surface 25. Voxels 78 with densities above this value represent interior points on the virtual object 26. Voxels 78 with densities below this value represent points outside the virtual object 26.

Edge
A temporary geometric construct representing a potentially viable move direction when the virtual tool 28 is contacting the virtual object 26 in more than one place.

Gradient
The rate of change of the density values of the voxels 78 along a given vector in one embodiment.

Haptic Interface Location
The location in the virtual environment which corresponds to the key position of the haptic interface device 10 in the real-world space.

Haptic Rendering Process
The process responsible for generating objects 26 in the haptic virtual environment and producing high-fidelity force-feedback to the user in real world space.

Haptic Virtual Environment
A computer representation of a space where a user can interact with virtual objects 26 through the sense of touch.

Interaction Modes
Settings which alter the interaction between the virtual tool 28 and the virtual object 26.

Isosurface
A theoretical surface 86 defined by the locus of identical voxel density values.

Panic Escape
A method of extracting the virtual tool 28 from a trapped condition.

Ramp Length
In one embodiment, the number of voxels 78 over which density values go from their minimum (0) to their maximum (255).

Real World Space
The true three-dimensional physical world in which people live and interact.

Surface Direction Vector
A vector 101 evaluated at a point in relation to a virtual surface 25. If the point is at the virtual surface 25, this vector 101 is the normal to the surface 25 at that point. If the point is not on the surface 25, the vector 101 represents the approximate shortest distance to the surface 25 and is also the approximate surface normal at the point where the vector 101 would intersect the surface 25.

Tool Surface Contact Point
A location on the virtual surface 25 where the virtual tool 28 is in contact with the virtual surface 25.

Trilinear Interpolation
In one embodiment, a technique for interpolating the densities of nearby voxels 78 to derive the density at a location that lies between the discrete voxel locations.

Virtual Object Modification Process
The process responsible for making changes to the virtual object 26.

Virtual Object
A computer representation of an object.

Virtual Surface
A computer representation of the "skin" of a virtual object 26.

Virtual Tool
A computer representation of a tool which the user uses to interact with the virtual environment.

Virtual Tool Origin
The location on the virtual tool 28 which strives to be coincident with the haptic interface location 98.

Voxels
A set of locations in the virtual environment, each storing information used in defining the shape of a virtual object 26 in one embodiment.

Having described the preferred embodiments of the invention, it will now become apparent to one of skill in the art that other embodiments incorporating the concepts may be used. It is felt, therefore, that the invention should not be limited to disclosed embodiments, but rather should be limited only by the spirit and scope of the following claims.

what is claimed is:

1. A method for interfacing with a virtual object in a haptic virtual environment, the method comprising:

generating, by a processor of a computing device, the virtual object comprising a first plurality of discrete points in the haptic virtual environment, wherein the virtual object comprises a virtual surface, wherein voxel density values associated with the first plurality of discrete points define a shape of the virtual object, and wherein each discrete point of the first plurality of distinct points having a density value greater than a density threshold is determined to be inside the virtual object;

identifying a first location of a user in real space;

determining, by the processor, a virtual tool comprising a second plurality of discrete points for use by the user in the haptic virtual environment;

responsive to identifying the first location of the user in real space, determining, by the processor, a first haptic interface location in the haptic virtual environment;

receiving information regarding a movement of the user to a second location in real space;

responsive to the movement, determining, by the processor, a second haptic interface location in the haptic virtual environment;

determining, by the processor, a proposed movement of the virtual tool towards the virtual surface of the virtual object responsive to the second haptic interface location;

responsive to the proposed movement of the virtual tool, determining, by the processor, penetration of one or more discrete points of the second plurality of discrete points of the virtual tool into the virtual surface of the virtual object;

calculating, by the processor, a force feedback as a function of the second haptic interface location, wherein
the force feedback corresponds to a resistance of the proposed movement of the virtual tool into the virtual object, and
the force feedback is calculated based in part upon a determination that at least one of the one or more discrete points of the second plurality of discrete points of the virtual tool has encountered a discrete point of the first plurality of discrete points of the virtual object having a voxel density value greater than the density threshold; and
causing, by the processor, a haptic interface device to provide the force feedback to the user.

2. The method of claim 1, further comprising:
responsive to the proposed movement, determining, by the processor, an updated position of the virtual tool within the virtual environment, wherein
determining the updated position comprises determining the updated position based in part upon the force feedback, wherein
the force feedback allows the user to move the virtual tool along the virtual surface in a manner that minimizes a spring distance between the virtual tool and the second haptic interface location.

3. The method of claim 1, wherein calculating the force feedback comprises determining a surface direction vector.

4. The method of claim 1, further comprising:
responsive to the proposed movement, determining, by the processor, an updated position of the virtual tool within the virtual environment, wherein
determining the updated position comprises moving the virtual tool as close as possible to the second haptic interface location, without crossing the virtual surface.

5. The method of claim 1, further comprising:
determining a tool origin of the virtual tool in the haptic virtual environment, wherein
the virtual tool is blocked from penetrating the virtual surface of the virtual object, and
calculating the force feedback comprises calculating the force feedback based at least in part on a connection between the tool origin and the haptic interface location.

6. The method of claim 5, wherein the connection comprises a virtual spring.

7. The method of claim 5, wherein the connection comprises a virtual dash-pot.

8. The method of claim 5, wherein the tool origin corresponds to a first point on the virtual tool, wherein the one or more discrete points of the second plurality of discrete points comprise the first point.

9. A system for interfacing with a virtual object in a haptic virtual environment, the system comprising:
a haptic interface device, wherein the haptic interface device is configured to sense a current location of a user in real space; and
a modeling application for modeling
the virtual object comprising a first plurality of discrete points, wherein the virtual object comprises a virtual surface, wherein voxel density values associated with the first plurality of discrete points define a shape of the virtual object, and wherein each discrete point of the first plurality of distinct points having a density value greater than a density threshold is determined to be inside the virtual object, and
a virtual tool comprising a second plurality of discrete points for use by the user in the haptic virtual environment,
wherein the modeling application is configured, when executed by a processor of a computing device, to:
determine a haptic interface location in the haptic virtual environment corresponding to the current location of the user in real space,
receive, from the haptic interface device, information identifying a movement to an updated current location of the user in real space,
determine, based upon the information, a second haptic interface location in the haptic virtual environment,
responsive to the second haptic interface location, determine a proposed movement of the virtual tool towards the virtual surface of the virtual object,
responsive to the proposed movement of the virtual tool, determine penetration of one or more discrete points of the second plurality of discrete points of the virtual tool into the virtual surface of the virtual object,
calculate a force feedback as a function of the second haptic interface location, wherein
the force feedback corresponds to a resistance of the movement of the virtual tool into the virtual object, and
the force feedback is calculated based in part upon a determination that at least one of the one or more discrete points of the second plurality of discrete points of the virtual tool has encountered a discrete point of the first plurality of discrete points of the virtual object having a voxel density value greater than the density threshold, and
cause the haptic interface device to provide the force feedback to the user.

10. The system of claim 9, wherein the modeling application is configured to:
responsive to the proposed movement, determine an updated position of the virtual tool within the virtual environment, wherein
determining the updated position comprises determining the updated position based in part upon the force feedback, wherein
the force feedback allows the user to move the virtual tool along the virtual surface in a manner that minimizes a spring distance between the virtual tool and the second haptic interface location.

11. The system of claim 9, wherein calculating the force feedback comprises determining a surface direction vector.

12. The system of claim 9, wherein the modeling application is configured to, responsive to the proposed movement:
determine an updated position of the virtual tool within the virtual environment, wherein
determining the updated position comprises moving the virtual tool as close as possible to the haptic interface location, without crossing the virtual surface.

13. The system of claim 12, wherein:
the modeling application is configured to determine a tool origin of the virtual tool in the haptic virtual environment, wherein,
the modeling application is configured to avoid penetration of the virtual tool into the virtual surface of the virtual object, and calculating the force feedback comprises calculating the force feedback based at least in part on a connection between the tool origin and the second haptic interface location.

14. The system of claim 13, wherein the connection comprises a virtual spring.

15. The system of claim 13, wherein the connection comprises a virtual dash-pot.

16. The system of claim 13, wherein the tool origin corresponds to a first point on the virtual tool, wherein the one or more discrete points of the second plurality of discrete points comprise the first point.

17. The method of claim 1, wherein the second haptic interface location penetrates the virtual surface of the virtual object.

18. The system of claim 9, wherein the second haptic interface location penetrates the virtual surface of the virtual object.

19. The method of claim 1, wherein the volume of the virtual object is defined by a gradient of voxel density values that range from a minimum density value to a maximum density value.

20. The method of claim 1, further comprising:
calculating the voxel density values for a plurality of points of the virtual tool;
identifying a preset number of points of the virtual tool with the highest voxel density values upon calculating voxel density values for the plurality of points, wherein the preset number of points is less than all points of the virtual tool; and
detecting collision between the virtual tool and the virtual object by evaluating the identified preset number of points with respect to the first plurality of discrete points associated with the virtual object.

* * * * *